(12) United States Patent
Ikriannikov et al.

(10) Patent No.: US 12,519,391 B2
(45) Date of Patent: Jan. 6, 2026

(54) SWITCHING POWER CONVERTERS INCLUDING BOOSTED COUPLED INDUCTORS AND INJECTION STAGES, AND ASSOCIATED METHODS

(71) Applicant: Maxim Integrated Products, Inc., San Jose, CA (US)

(72) Inventors: Alexandr Ikriannikov, San Jose, CA (US); Alberto Giovanni Viviani, Mountain View, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 325 days.

(21) Appl. No.: 18/310,076

(22) Filed: May 1, 2023

(65) Prior Publication Data

US 2023/0369977 A1   Nov. 16, 2023

Related U.S. Application Data

(60) Provisional application No. 63/364,555, filed on May 11, 2022.

(51) Int. Cl.
| | |
|---|---|
| *H02M 1/00* | (2007.01) |
| *H02M 1/14* | (2006.01) |
| *H02M 3/158* | (2006.01) |

(52) U.S. Cl.
CPC ....... *H02M 3/1582* (2013.01); *H02M 1/0019* (2021.05); *H02M 1/007* (2021.05); *H02M 1/143* (2013.01)

(58) Field of Classification Search
CPC .......... H02M 1/14; H02M 1/143; H02M 1/15; H02M 3/335; H02M 3/33507; H02M 3/33569; H02M 3/33573; H02M 3/33576; H02M 3/33592
See application file for complete search history.

(56) References Cited

U.S. PATENT DOCUMENTS

| | | | | |
|---|---|---|---|---|
| RE36,040 E | * | 1/1999 | Ou | H02M 3/33523 363/133 |
| 5,982,645 A | * | 11/1999 | Levran | H01F 27/306 363/71 |
| 6,388,898 B1 | * | 5/2002 | Fan | H02M 3/33561 363/20 |

(Continued)

FOREIGN PATENT DOCUMENTS

| | | |
|---|---|---|
| CN | 117060696 A | 11/2023 |
| DE | 102023112293 A1 | 11/2023 |

*Primary Examiner* — Sean Kayes
*Assistant Examiner* — Nusrat Quddus
(74) *Attorney, Agent, or Firm* — Schwegman Lundberg & Woessner, P.A.

(57) ABSTRACT

A method for operating a switching power converter to reduce ripple current magnitude includes (1) controlling duty cycle of a plurality power stages of the switching power converter to regulate at least one parameter of the switching power converter, each power stage including a respective power transfer winding, and (2) controlling an injection stage of the switching power converter to reduce voltage across leakage inductance of each power transfer winding, the injection stage of the switching power converter including a boost winding forming at least one turn around a respective leakage magnetic flux path of each power transfer winding.

20 Claims, 42 Drawing Sheets

(56) References Cited

U.S. PATENT DOCUMENTS

| | | | | |
|---|---|---|---|---|
| 6,549,436 B1* | 4/2003 | Sun | | H02M 3/33571 363/44 |
| 7,149,096 B2* | 12/2006 | Batarseh | | H02M 7/23 363/16 |
| 7,239,530 B1* | 7/2007 | Djekic | | H02M 3/33592 363/16 |
| 8,068,355 B1* | 11/2011 | Ikriannikov | | H02M 3/285 363/16 |
| 8,320,142 B2* | 11/2012 | Mulcahy | | H02M 3/285 363/69 |
| 8,502,520 B2* | 8/2013 | Chandrasekaran | | H01F 27/38 336/212 |
| 8,929,104 B2* | 1/2015 | Mou | | G05D 7/0635 363/25 |
| 8,963,521 B2* | 2/2015 | Wei | | H02M 3/1584 323/272 |
| 9,130,462 B2* | 9/2015 | Hu | | H02M 3/28 |
| 9,691,538 B1* | 6/2017 | Ikriannikov | | H02M 3/155 |
| 10,050,559 B2* | 8/2018 | Li | | H02M 3/1584 |
| 10,396,673 B1* | 8/2019 | Presti | | H02M 1/38 |
| 11,165,347 B2* | 11/2021 | Leong | | H02M 3/158 |
| 11,303,204 B1* | 4/2022 | Zhao | | H02M 3/1588 |
| 11,472,767 B2* | 10/2022 | Stéphan | | C07C 233/69 |
| 11,742,767 B2* | 8/2023 | Lipcsei | | H02M 1/32 363/16 |
| 11,876,445 B2* | 1/2024 | Zhou | | H02M 3/155 |
| 11,948,722 B2* | 4/2024 | Lai | | H01F 27/40 |
| 12,015,340 B2* | 6/2024 | Ahmed | | H02M 3/08 |
| 12,294,309 B2* | 5/2025 | Huang | | H02M 1/0043 |
| 2002/0053858 A1* | 5/2002 | Hayashi | | H02N 2/147 310/316.01 |
| 2008/0205098 A1* | 8/2008 | Xu | | H02M 3/1584 363/45 |
| 2008/0303495 A1* | 12/2008 | Wei | | H02M 7/003 323/272 |
| 2010/0026095 A1* | 2/2010 | Phadke | | H02M 3/285 307/31 |
| 2012/0075051 A1* | 3/2012 | Petter | | H01F 37/00 336/220 |
| 2013/0127434 A1* | 5/2013 | Ikriannikov | | H01F 19/04 323/283 |
| 2014/0152350 A1* | 6/2014 | Ikriannikov | | H02M 3/1582 327/109 |
| 2014/0266086 A1* | 9/2014 | Ikriannikov | | H01F 30/12 336/5 |
| 2016/0172976 A1* | 6/2016 | Mu | | H02M 1/0043 323/271 |
| 2020/0313567 A1* | 10/2020 | Porter, Jr. | | H02M 3/1584 |
| 2021/0151249 A1* | 5/2021 | Boys | | B60L 53/12 |
| 2021/0327634 A1* | 10/2021 | Liang | | H01F 29/025 |
| 2021/0398743 A1* | 12/2021 | Yao | | H02M 3/1566 |
| 2022/0247321 A1* | 8/2022 | Genova | | H02M 1/0064 |
| 2022/0368214 A1* | 11/2022 | Ikriannikov | | H02M 3/1584 |
| 2022/0376600 A1* | 11/2022 | Jong | | H02M 3/1582 |
| 2023/0299687 A1* | 9/2023 | Shao | | H02M 3/1586 |
| 2023/0318430 A1* | 10/2023 | Chen | | H02M 3/1586 323/271 |
| 2023/0378874 A1* | 11/2023 | Ikriannikov | | H02M 1/0064 |
| 2023/0412087 A1* | 12/2023 | Preindl | | H02M 7/483 |
| 2024/0120847 A1* | 4/2024 | Jiang | | H02M 3/33571 |
| 2024/0266104 A1* | 8/2024 | Zhang | | H01F 27/38 |
| 2024/0322694 A1* | 9/2024 | Ikriannikov | | H02M 1/14 |
| 2024/0396433 A1* | 11/2024 | Ikriannikov | | H02M 1/143 |
| 2024/0396448 A1* | 11/2024 | Ikriannikov | | H02M 3/155 |
| 2024/0405659 A1* | 12/2024 | Ahmed | | H02M 3/1586 |
| 2024/0405678 A1* | 12/2024 | Nishimoto | | H02M 3/158 |
| 2025/0055365 A1* | 2/2025 | Zhu | | H01F 27/306 |
| 2025/0062700 A1* | 2/2025 | Ahmed | | H02M 3/1584 |
| 2025/0093392 A1* | 3/2025 | Rizzolatti | | H02M 1/32 |
| 2025/0111991 A1* | 4/2025 | Peluso | | H05K 1/18 |

* cited by examiner

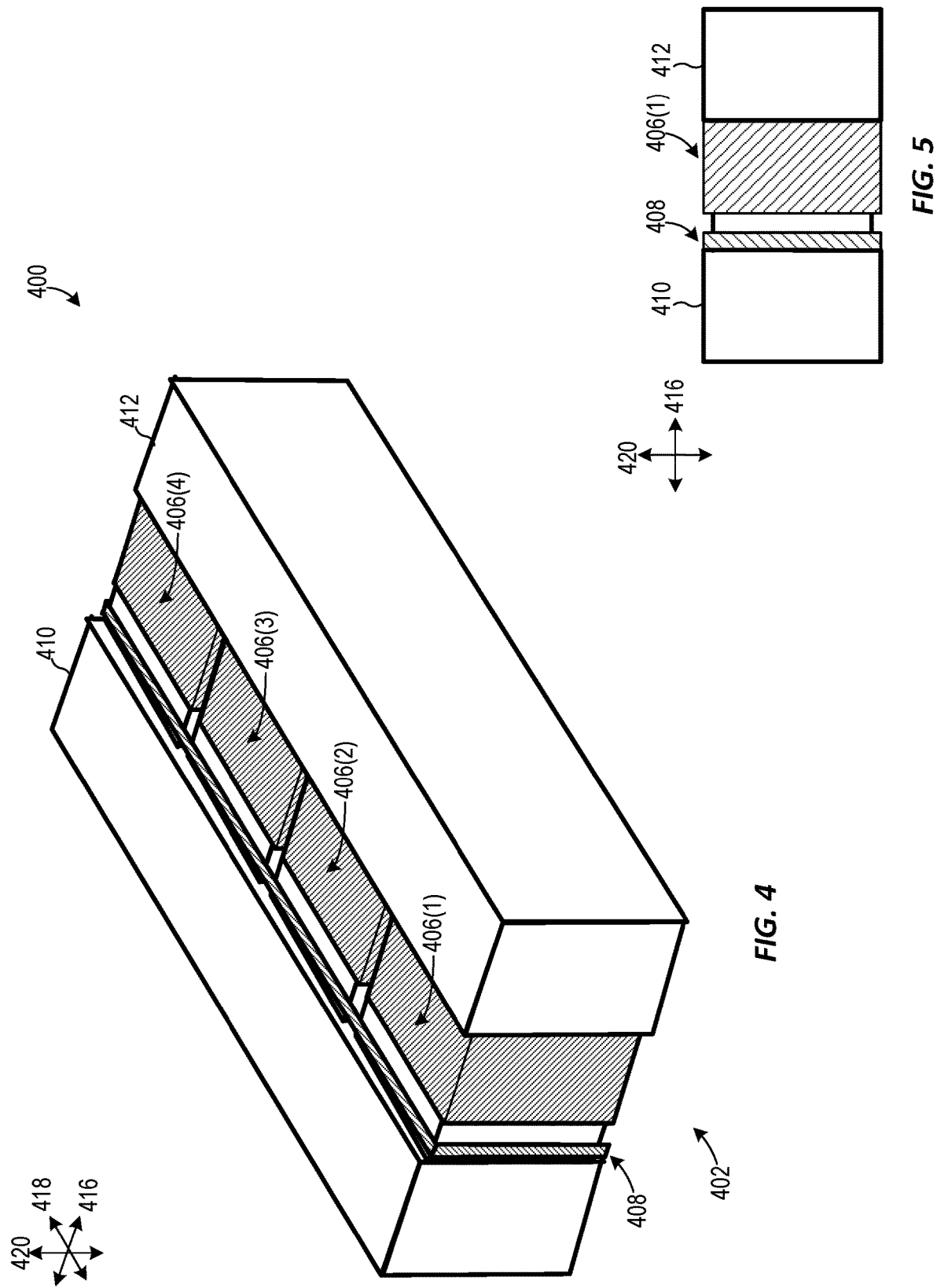

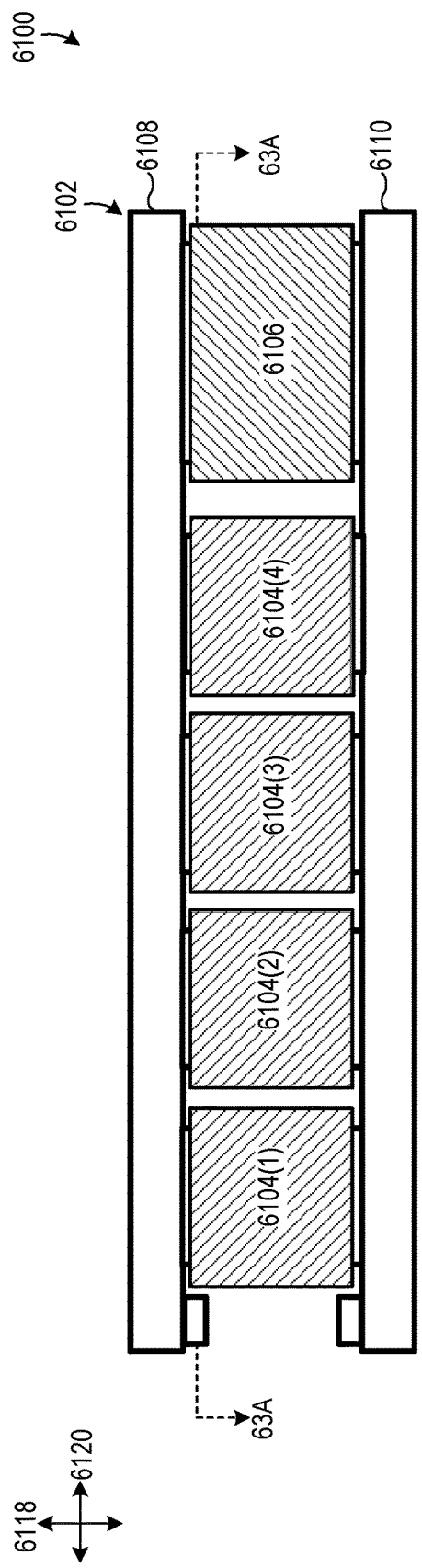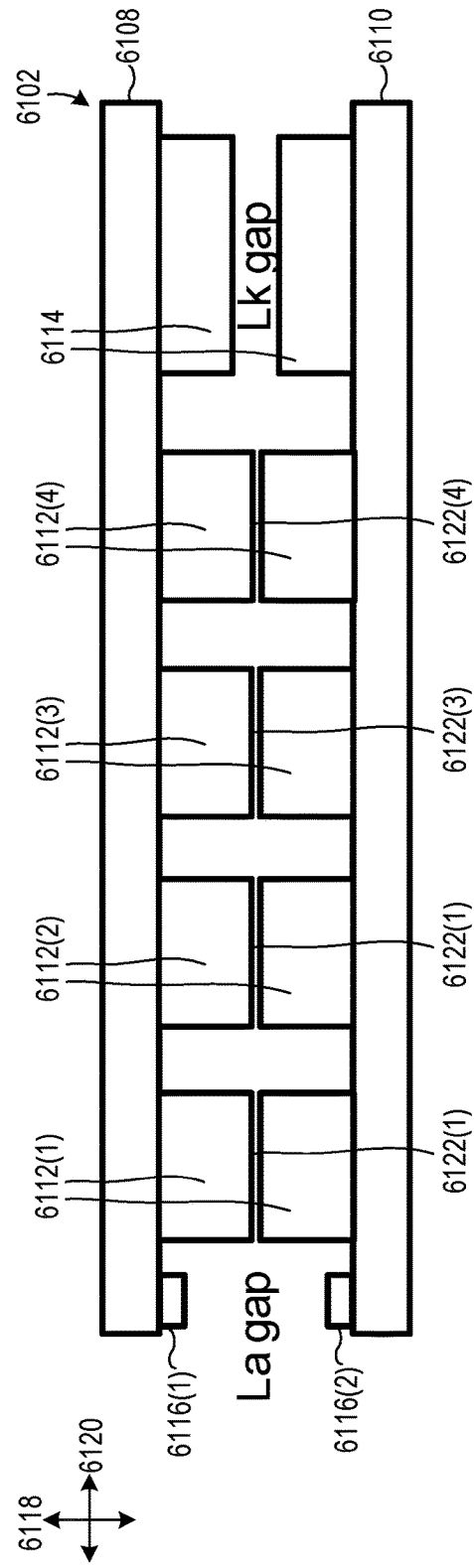
FIG. 61
FIG. 62

SWITCHING POWER CONVERTERS INCLUDING BOOSTED COUPLED INDUCTORS AND INJECTION STAGES, AND ASSOCIATED METHODS

RELATED APPLICATIONS

This application claims benefit of priority to U.S. Provisional Patent Application No. 63/364,555, filed on May 11, 2022, which is incorporated herein by reference.

BACKGROUND

Inductors are commonly used for energy storage in switching power converters. Some switching power converters include one or more discrete inductors, where a discrete inductor is an inductor that is not magnetically coupled to any other inductor. Other switching power converters include one or more coupled inductors, where a coupled inductor is a device including two or more inductors that are magnetically coupled. A coupled inductor exhibits magnetizing inductance, which is inductance associated with magnetic flux linking the windings of the coupled inductor. Additionally, each winding of a coupled inductor exhibits leakage inductance, which is inductance associated with magnetic flux that flows only around the particular winding, i.e., magnetic flux that does not couple to any other winding. As known in the art, use of a coupled inductor in place of two or more discrete inductors in a switching power converter can achieve significant advantages, such as reduced ripple current magnitude and/or improved transient response.

BRIEF DESCRIPTION OF THE DRAWINGS

FIG. 4 is a perspective view of a boosted coupled inductor, according to an embodiment.

FIG. 5 is an elevational view of a side of the FIG. 4 boosted coupled inductor.

FIG. 61 illustrates another embodiment of a boosted coupled inductor including stray inductance teeth, according to an embodiment.

FIG. 62 illustrates the FIG. 61 boosted coupled inductor with windings omitted, to further show features of a magnetic core of the boosted coupled inductor.

DETAILED DESCRIPTION OF THE EMBODIMENTS

Figure 1:
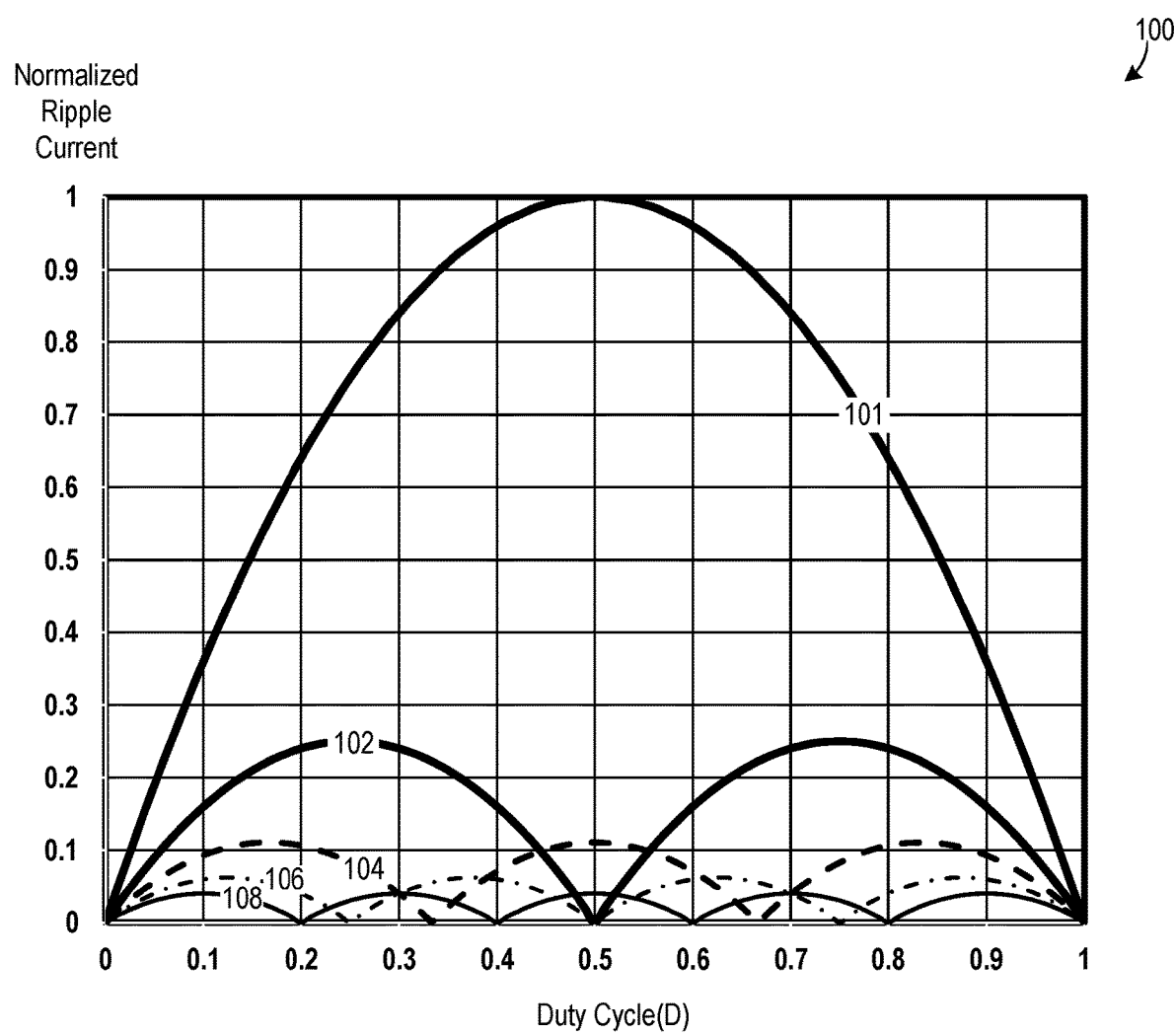
FIG. 1 is a graph of normalized ripple current magnitude versus duty cycle for five different switching power converters.

A multiphase switching power converter including a coupled inductor can operate in a manner which minimizes, or even essentially eliminates, ripple current magnitude. For example, FIG. 1 is a graph 100 of normalized ripple current magnitude in one phase versus duty cycle for five switching power converters. Curve 101 corresponds to a single-phase switching power converter, curve 102 corresponds to a two-phase switching power converter, curve 104 corresponds to a three-phase switching power converter, curve 106 corresponds to a four-phase switching power converter, and curve 108 corresponds to a five-phase switching power converter. The single-phase switching power converter includes a discrete inductor. Each of the multi-phase switching power converters includes a coupled inductor with leakage inductance values equal to an inductance value of the discrete inductor of the single-phase switching power converter. Ripple current magnitude is normalized relative to a maximum ripple current magnitude of the single-phase switching power converter (which occurs at a duty cycle of 0.5). Graph 100 assumes that the coupled inductor of each multi-phase switching power converter has essentially ideal magnetic coupling, i.e., magnetizing inductance is infinitely greater than leakage inductance of any one winding. All switching power converters of the FIG. 1 graph are assumed to operate at a common switching frequency.

As evident from FIG. 1, each switching power converter has one or more operating points where ripple current magnitude is essentially zero. For example, ripple current magnitude in the two-phase switching power converter is essentially zero when operating at 50 percent duty cycle, and ripple current magnitude in the three-phase switching power converter is essentially zero when operating at either 33 percent duty cycle or 66 percent duty cycle. However, each switching power converter also has operating points where ripple current magnitude is large, especially if the number of phases is small. For example, the two-phase switching power converter will have large ripple current magnitude when duty cycle is approximately either 25 percent or 75 percent, and the switching power converter with discrete inductors will have a large ripple current magnitude except when operating around zero duty cycle or around one hundred percent duty cycle.

Disclosed herein are switching power converters including boosted coupled inductors and injection stages which at least partially overcome the above-discussed drawbacks of conventional switching power converters. For example, certain embodiments of the new switching power converters have small ripple current magnitude at essentially any duty cycle, instead of at only certain duty cycles. Consequently, the new switching power converters may incur smaller losses than otherwise similar conventional switching power converters, due to their ability to operate at low ripple current magnitude over a wide range of duty cycles. Alternatively, switching frequency of such converters can be significantly decreased while still keeping the current ripple acceptably low, which decreases different switching losses and increases efficiency. Additionally, the low ripple current magnitude of the new switching power converters promotes low ripple voltage magnitude, thereby potentially enabling relaxed filtering requirements relative to conventional switching power converters. Furthermore, in particular embodiments, ripple current magnitude is determined by magnetizing inductance instead of by leakage inductances. Consequently, magnetizing inductance can be made large to minimize ripple current magnitude, without negatively impacting transient response, because magnetizing inductance does not impair transient response. In a conventional switching power converter, in contrast, ripple current magnitude is determined primarily by leakage inductance (or by discrete inductance if the converter does not include a coupled inductor). Ripple current magnitude can be decreased in a conventional switching power converter by increasing leakage/discrete inductance, but doing so degrades transient response.

Moreover, the new switching power converters are resistant to magnetic saturation in injection magnetic flux paths, due to use of boost windings with injection stages. Since the boost winding is magnetically coupled to the main windings, it will not have any direct current (DC) component transferred from any phase of the converter, so no DC bias will be induced in the injection stage. The boost windings are configured such that they are magnetically coupled with leakage inductance of power transfer windings of the switching power converters. Stated differently, the boost windings are configured such that they form at least one turn around a respective leakage magnetic flux path of each power transfer winding. Additionally, the boost windings are configured such that they "see" essentially zero net mutual magnetic flux during steady state operation of the switching power converters, which helps minimize risk of a magnetic saturation from mutual magnetic flux within an injection magnetic flux path. For example, in certain embodiments, a boost winding is configured to form one or more turns such that mutual magnetic flux associated with each power transfer winding flows through one or more turns of the boost winding, which causes net mutual magnetic flux within the turns of the boost winding to be essentially zero during steady stage switching power converter operation. As another example, in certain other embodiments, a boost winding configured to be within leakage magnetic flux paths but outside of mutual magnetic flux paths, such that the boost winding is magnetically coupled to leakage inductance of power transfer windings without being subjected to mutual magnetic flux.

Figure 2:
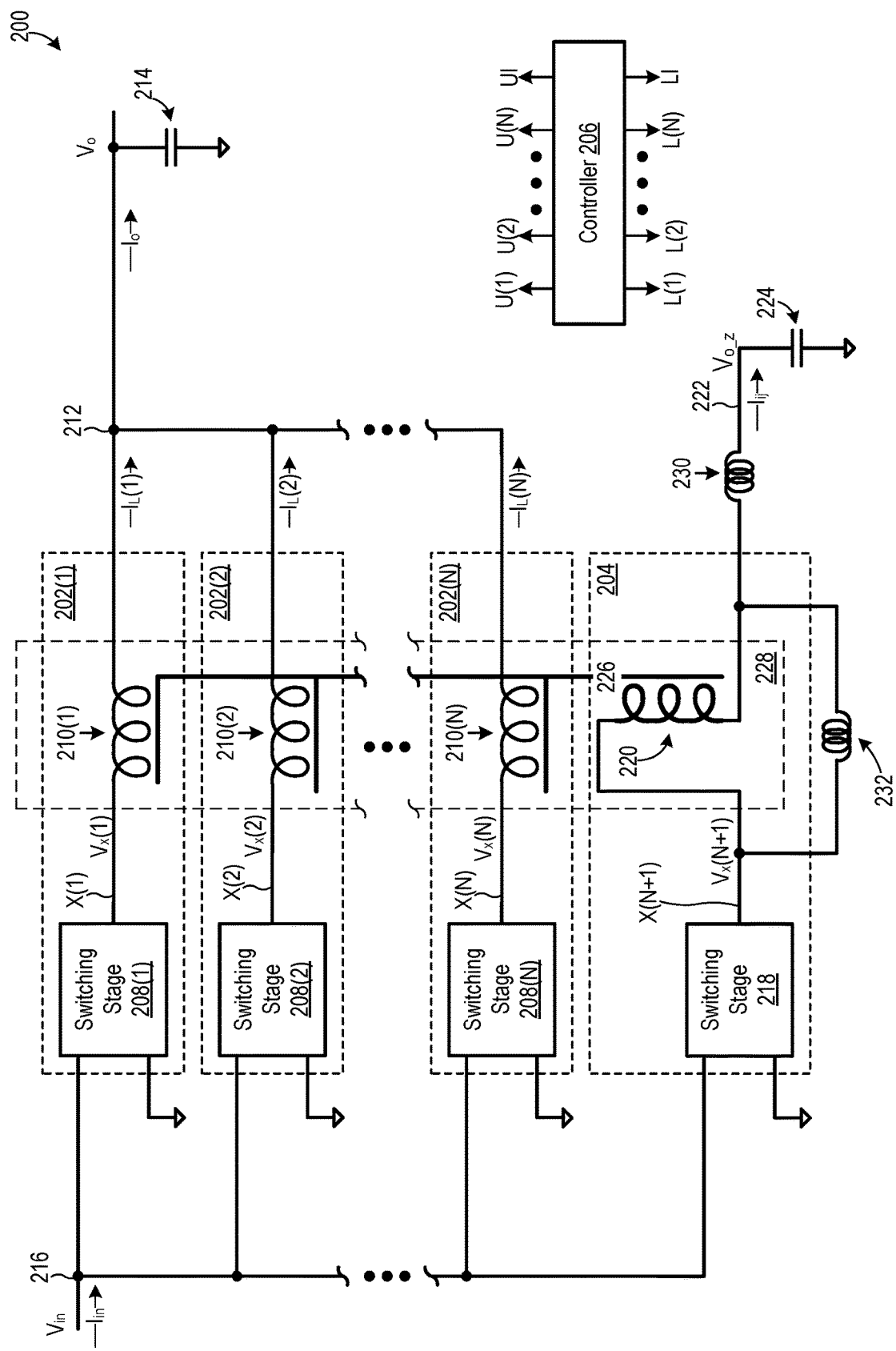
FIG. 2 is a schematic diagram of a multi-phase switching power converter including a boosted coupled inductor and an injection stage, according to an embodiment.

FIG. 2 is a schematic diagram of a multi-phase switching power converter 200, which is one embodiment of the new switching power converters including boosted coupled inductors and injection stages. Switching power converter 200 includes N power stages 202, an injection stage 204, and a controller 206, where N is an integer greater than one. In this document, specific instances of an item may be referred to by use of a numeral in parentheses (e.g., power stage 202(1)) while numerals without parentheses refer to any such item (e.g., power stages 202). Each power stage 202 corresponds to a respective phase of switching power converter 200, such that switching power converter 200 is an N-phase switching power converter.

Each power stage 202 includes a power switching stage 208 electrically coupled to a power transfer winding 210 at a switching node X. Each power transfer winding 210 is electrically coupled between the switching node X of its respective power stage 202 and a common output node 212. For example, power transfer winding 210(1) is electrically coupled between switching node X(1) and output node 212, and power transfer winding 210(2) is electrically coupled between switching node X(2) and output node 212. Output node 212 has a voltage $V_o$, and an output current $I_o$ flows to a load (not shown) electrically coupled to output node 212. Output current $I_o$ could have a negative polarity without departing from the scope hereof. One or more capacitors 214 are optionally electrically coupled to output node 212.

Each power switching stage 208 is configured to repeatedly switch the switching node X of its power stage 202 between an input power node 216 and ground, in response to control signals U and L generated by controller 206. Specifically, power switching stage 208(1) is configured to repeatedly switch node X(1) between input power node 216 and ground in response to control signals U(1) and L(1), power switching stage 208(2) is configured to repeatedly switch node X(2) between input power node 216 and ground in response to control signals U(2) and L(2), and so on. Input power node 216 is at a voltage $V_{in}$, and each power switching stage 208 accordingly repeatedly switches node X of its power stage 202 between voltage $V_{in}$ and zero volts relative to ground. In this document, the term "ground" refers to an electrical reference node which need not be at the same electrical potential as earth ground. An input current $I_{in}$ flows from an electrical power source (not shown) to switching power converter 200 via input power node 216. Input current $I_{in}$ could have a negative polarity without departing from the scope hereof. A given power transfer winding 210 in converter 200 is driven "high" when its respective switching node X is at voltage $V_{in}$, and the power transfer winding 210 is driven "low" when its respective switching node X is at zero volts relative to ground. For example, power transfer winding 210(1) is driven high when switching node X(1) is at voltage $V_{in}$, and power transfer winding 210(1) is driven low when switching node X(1) is at zero volts relative to ground.

Injection stage 204 includes an injection switching stage 218 electrically coupled to a boost winding 220 at a switching node X(N+1). Boost winding 220 is electrically coupled between switching node X(N+1) and injection output node 222. Injection output node 222, which is separate from output power node 212, is at a voltage $V_{o\_2}$, and one or more capacitors 224 are electrically coupled to injection output node 222, such that each capacitor 224 is electrically coupled in series with boost winding 220. A first tuning inductor 230 is electrically coupled in series with boost winding 220. Although first tuning inductor 230 is illustrated as being electrically coupled between boost winding 220 and capacitor 224, first tuning inductor 230 could be at a different topological location as long as it is electrically coupled in series with boost winding 220. For example, first tuning inductor 230 could alternately be electrically coupled between injection switching stage 218 and boost winding 220. First tuning inductor 230 is omitted in some alternate embodiments of switching power converter 200, such as in embodiments where a circuit including boost winding 220 has sufficient inductance such that first tuning inductor 230 is not required. Switching power converter 200 optionally further includes a second tuning inductor 232 electrically coupled in parallel with boost winding 220. Second tuning inductor 232, when present, typically has a relatively large inductance value.

Injection switching stage 218 is configured to repeatedly switch switching node X(N+1) between input power node 216 and ground in response to control signals UI and LI. Similar to power transfer windings 210, boost winding 220 is driven high when switching node X(N+1) is at voltage $V_{in}$, and boost winding 220 is driven low when switching node X(N+1) is at zero volts relative to ground. Injection stage 204 does not handle a direct current (DC) component of output current $I_o$. Instead, controller 206 controls injection stage 204 to reduce, or even essentially eliminate, alternating current (AC) voltage across leakage inductances of power transfer windings 210, as discussed below, thereby reducing magnitude of ripple current flowing through power transfer windings 210, as well as reducing magnitude of ripple in output current $I_o$.

Figure 3:
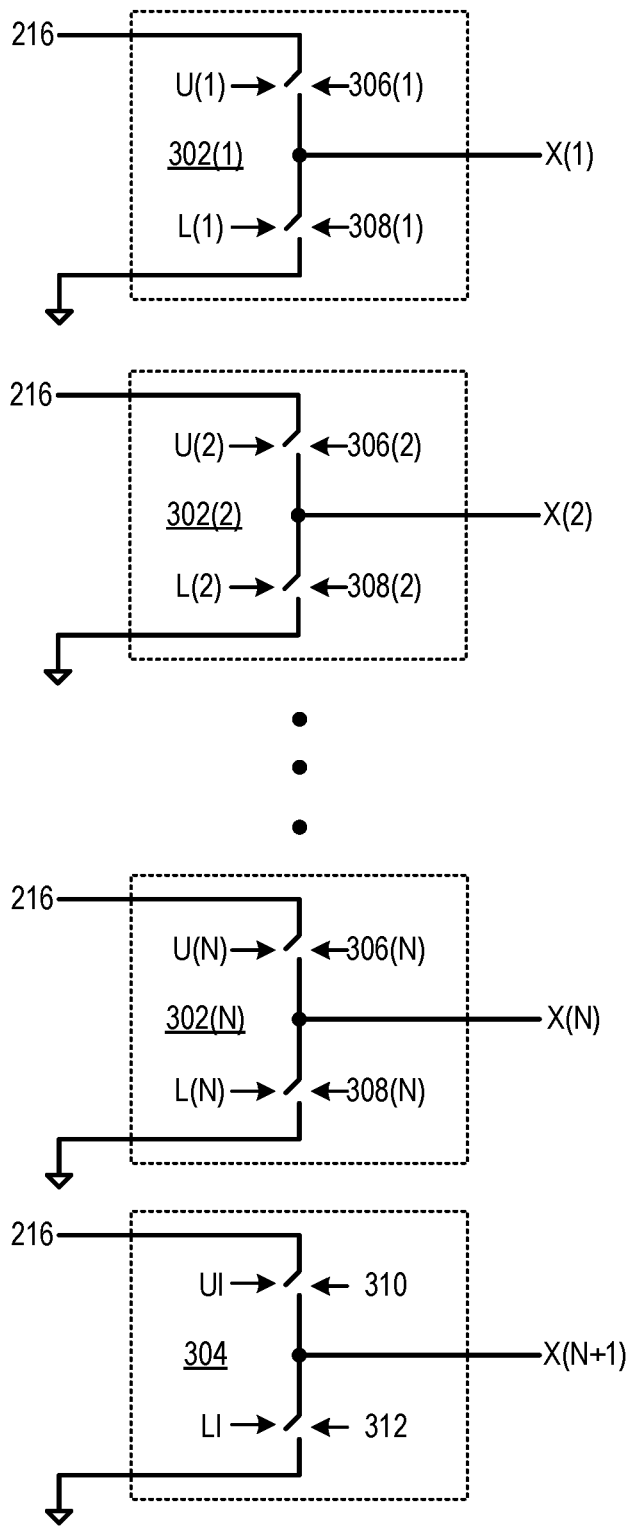
FIG. 3 is a schematic diagram of one possible implementation of switching power stages of the FIG. 2 switching power converter.

FIG. 3 illustrates one possible implementation of the switching stages of switching power converter 200. Specifically, FIG. 3 is a schematic diagram of N power switching stages 302 and an injection switching stage 304, where (a) power switching stages 302 are an embodiment of power switching stages 208 and (b) injection switching stage 304 is an embodiment of injection switching stage 218. Each power switching stage 302 includes an upper switching device 306 and a lower switching device 308. Each upper switching device 306 is electrically coupled between input power node 216 and the switching node X of its respective power stage. Each lower switching device 308 is electrically coupled between the switching node X of its respective power stage and ground. For example, upper switching device 306(1) is electrically coupled between input power node 216 and switching node X(1), and lower switching device 308(1) is electrically coupled between switching node X(1) and ground. Each upper switching device 306 switches in response to a respective control signal U from controller 206, and each lower switching device 308 switches in response to a respective control signal L from controller 206. For example, in some embodiments, each upper switching device 306 operates in its on (conductive) state when its respective control signal U is asserted, and the switching device operates in its off (non-conductive state) when its respective control signal U is de-asserted. Similarly, in some embodiments, each lower switching device 308 operates in its on (conductive) state when its respective control signal L is asserted, and the switching device operates in its off (non-conductive state) when its respective control signal L is de-asserted. Each switching device 306 and 308 includes, for example, one or more transistors.

Injection switching stage 304 includes an upper switching device 310 and a lower switching device 312. Upper switching device 310 is electrically coupled between input power node 216 and switching node X(N+1), and lower switching device 312 is electrically coupled between switching node X(N+1) and ground. Upper switching device 310 switches in response to control signal UI from controller 206, and lower switching device 312 switches in response to control signal LI from controller 206. For example, in certain embodiments, upper switching device 310 operates in its on (conductive) state when control signal UI is asserted, and the switching device operates in its off (non-conductive state) when its control signal UI is de-asserted. Similarly, in some embodiments, lower switching device 312 operates in its on (conductive) state when control signal LI is asserted, and the switching device operates in its off (non-conductive state) when control signal LI is de-asserted. Each switching device 310 and 312 includes, for example, one or more transistors. In some embodiments, upper switching device 310 has a smaller current carrying capability than each upper switching device 306, and lower switching device 312 has a smaller current carrying capability than each lower switching device 308, due to injection stage 204 not needing to handle the DC component of output current $I_o$.

Referring again to FIG. 2, power transfer windings 210 are magnetically coupled by a magnetic core 226. Boost winding 220 is magnetically coupled to a leakage component (not illustrated in FIG. 2) of each power transfer winding 210 by magnetic core 226. In particular, boost winding 220 is configured such that it forms at least one turn around a respective leakage magnetic flux path of each power transfer winding 210. Importantly, boost winding 220 is additionally configured such that net mutual magnetic flux within the turns of the boost winding is essentially zero during steady state operation of switching power converter 200. Such configuration of boost winding 220 advantageously helps minimize risk of a magnetic saturation from mutual magnetic flux within a magnetic flux path of boost winding 220 while enabling injection stage 204 to reduce ripple current magnitude in switching power converter 200. In this document, a winding forming a turn around an element need not completely surround the element. For example, a winding forming a turn around a leg of a magnetic core need not completely surround the leg. As another example, a winding forming a turn around a magnetic flux path need not completely surround the magnetic flux path.

Power transfer windings 210, boost winding 220, and magnetic core 226 are part of a boosted coupled inductor 228. Magnetic core 226 is formed, for example, of a ferrite magnetic material or an iron powder magnetic material. However, magnetic core 226 could alternately be an "air core," or in other words, magnetic core 226 could be implemented by placing windings 210 and 220, or breaking these windings in sections and placing these sections in pairs in sufficient proximity, to achieve magnetic coupling without use of a tangible magnetic coupling structure. Boost winding 220 is drawn with a heavier line weight than power transfer windings 210 to help a viewer distinguish boost winding 220 from power transfer windings 210. This difference in line weight should not be construed to imply that boost winding 220 is necessarily formed of a thicker conductor material than power transfer windings 210. Boost winding 220 could actually be implemented with a smaller amount of conductor material because it carries only AC ripple and does not carry any load current.

Discussed below with respect to FIGS. 4-24 and 43-63 are several example embodiments of boosted coupled inductor 228. It is understood, however, that boosted coupled inductor 228 is not limited to these example embodiments.

Figure 6:
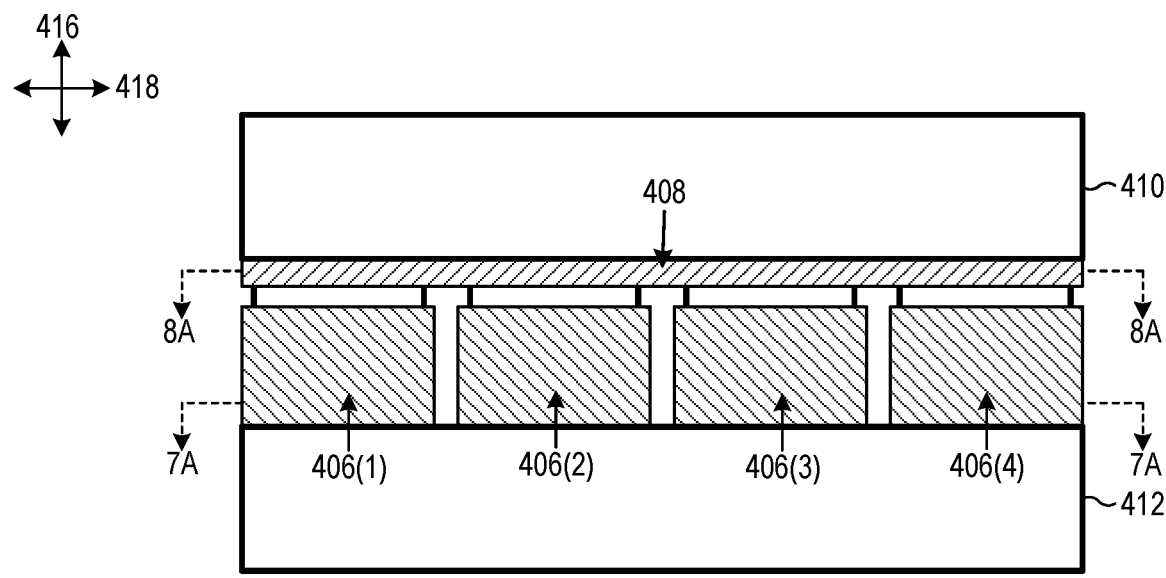
FIG. 6 is a top plan view of the FIG. 4 boosted coupled inductor.
Figure 7:
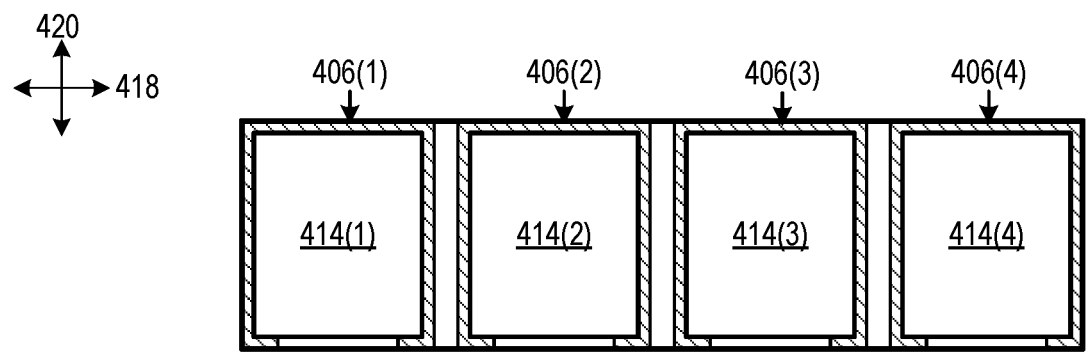
FIG. 7 is a cross-sectional view of the FIG. 4 boosted coupled inductor.
Figure 8:
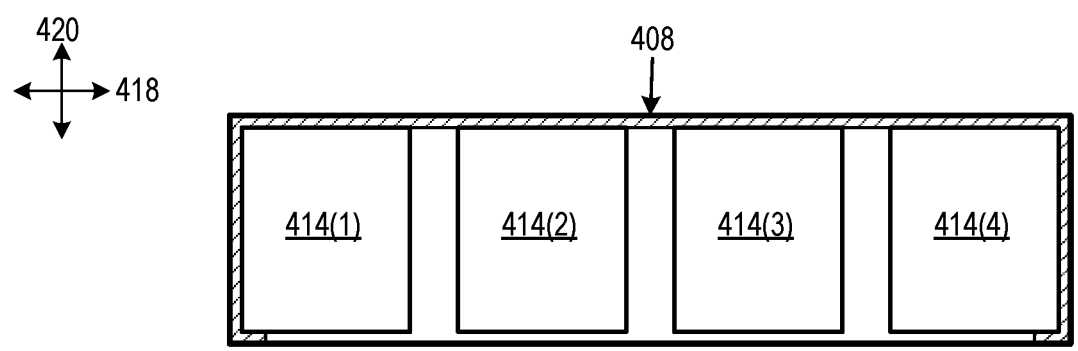
FIG. 8 is another cross-sectional view of the FIG. 4 boosted coupled inductor.
Figure 9:
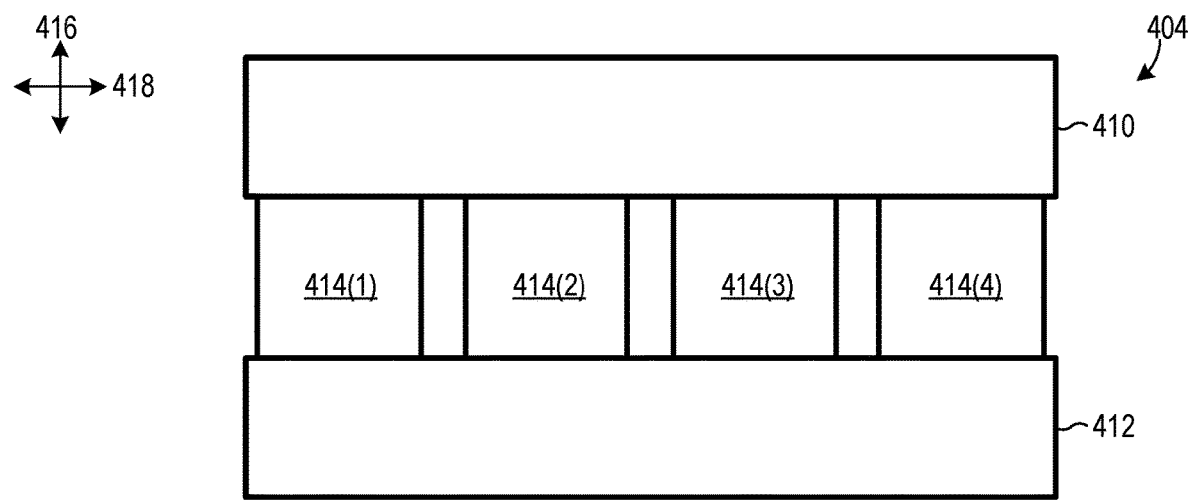
FIG. 9 is a top plan view of the FIG. 4 boosted coupled inductor with windings omitted.

FIG. 4 is a perspective view of a boosted coupled inductor 400, which is one possible embodiment of boosted coupled inductor 228 where N is equal to 4. FIG. 5 is an elevational view of a side 402 of boosted coupled inductor 400, FIG. 6 is a top plan view of boosted coupled inductor 400, FIG. 7 is a cross-sectional view of boosted coupled inductor 400 taken along line 7A-7A of FIG. 6, and FIG. 8 is a cross-sectional view of boosted coupled inductor 400 taken along line 8A-8A of FIG. 6. FIG. 9 is a top plan view of boosted coupled inductor 400 with windings omitted, to further show a magnetic core of the boosted coupled inductor.

Boosted coupled inductor 400 includes a magnetic core 404 (see FIG. 9), a plurality of power transfer windings 406, and a boost winding 408. Power transfer windings 406 are embodiments of power transfer windings 210, and boost winding 408 is an embodiment of boost winding 220. Magnetic core 404 is formed, for example, of a ferrite magnetic material or a powdered iron magnetic material. Magnetic core 404 includes a first rail 410, a second rail 412, and a plurality of legs 414. Although magnetic core 404 is illustrated as including four legs 414, the number of legs 414 of magnetic core 404 will vary with the number of phases supported by boosted coupled inductor 400. For example, in embodiments of boosted coupled inductor 400 intended for use with three phases, i.e., with N=3, boosted coupled inductor 400 will have three legs 414 instead of four legs 414. First rail 410 and second rail 412 are separated from each other in a direction 416, and legs 414 are disposed between first rail 410 and second rail 412 in direction 416.

Legs 414 are separated from each other in a direction 418, where direction 418 is orthogonal to direction 416. FIGS. 4, 5, 7, and 8 further show a third direction 420 which is orthogonal to each of directions 416 and 418. In some embodiments, legs 414 join first and second rails 410 and 412 in direction 416, and in some other embodiments, legs 414 are separated from first rail 410 and/or second rail 412 by a respective gap (not shown), such as to help prevent saturation of magnetic core 404. Each leg 414 optionally also forms a respective gap (not shown) along direction 418, such that the leg is broken into two or more portions separated from each other in direction 416 by the gap.

A respective power transfer winding 406 is wound at least partially around each leg 414, and boost winding 408 is wound at least partially around all legs 414, such that boost winding 408 forms a common turn around all legs 414. Accordingly, boost winding 408 is strongly magnetically coupled to each power transfer winding 404. Boost winding 408 is electrically isolated from power transfer windings 406. Although each power transfer winding 406 and boost winding 408 is depicted as being a single-turn winding formed of electrically conductive foil, such as copper foil, the configurations of power transfer windings 406 and boost winding 408 may vary. For example, one or more of these windings may form a plurality of turns, and/or one or more of these windings may be formed of wire instead of electrically conductive foil.

Figure 10:
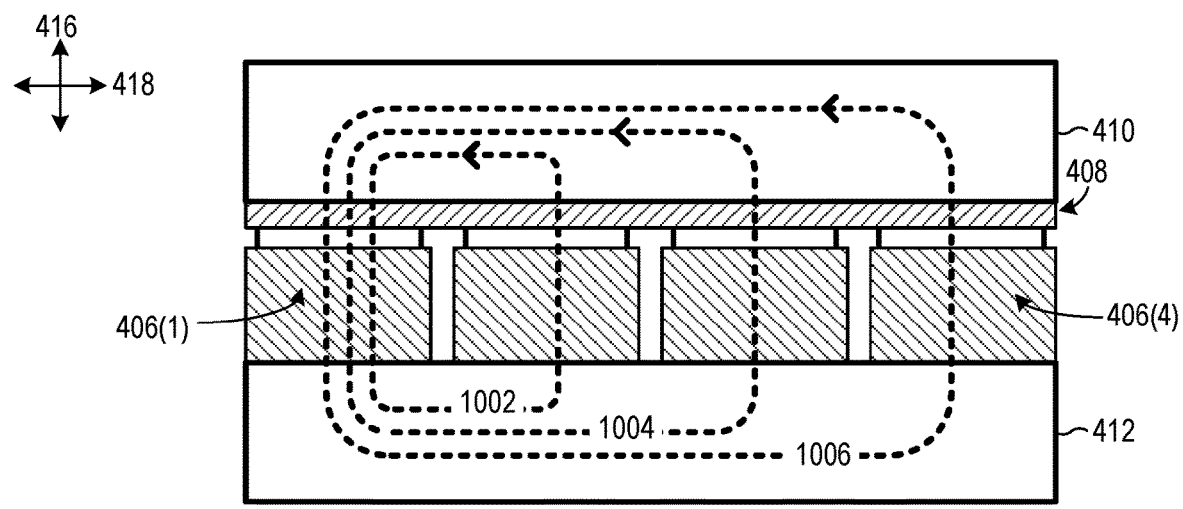
FIG. 10 is a top plan view of the FIG. 4 boosted coupled inductor that is marked up to show several example mutual magnetic flux paths.

FIG. 10 is a top plan view that is similar to FIG. 6 and is marked-up to symbolically show several mutual magnetic flux paths in boosted coupled inductor 400. Lines 1002, 1004, and 1006 represent mutual magnetic flux flowing from power transfer winding 406(1) to power transfer windings 406(2), 406(3), and 406(4), respectively. While not shown in FIG. 10, there are additional mutual magnetic flux paths between other power transfer winding 406 instances that pass through the turn formed by boost winding 408. As can be appreciated from FIG. 10, although mutual magnetic flux from each power transfer winding 406 flows through the turn of boost winding 408, net mutual magnetic flux flowing through boost winding 408 may be zero in some applications, e.g., mutual magnetic flux from power transfer winding 406(1) may cancel itself because all return paths of such flux are also included under the boost winding 408, leading to the net zero flux. The same is true for the mutual magnetic flux from any other power transfer windings 406 in boost winding 408, such that boost winding 408 "sees" zero mutual magnetic flux.

Figure 11:
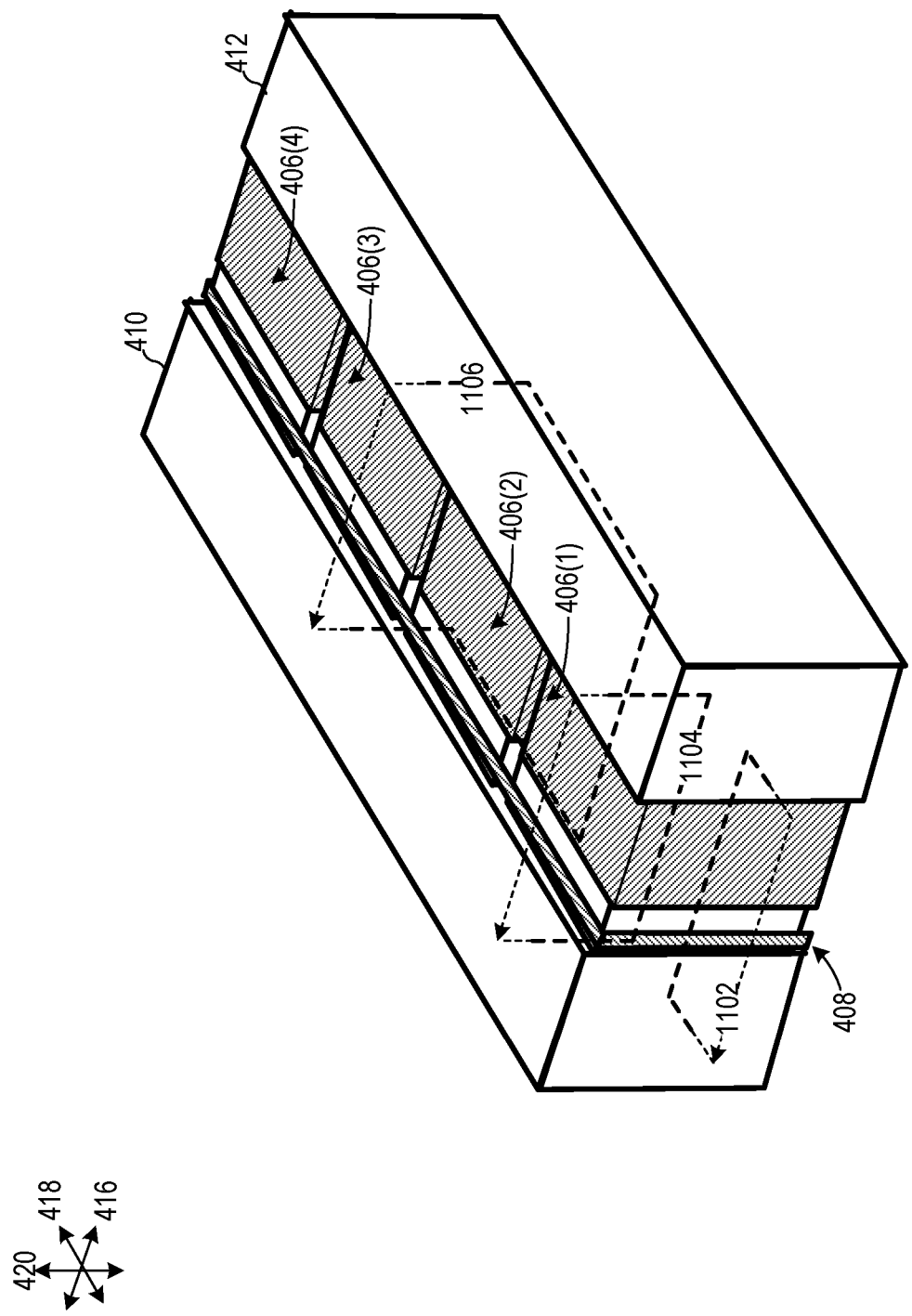
FIG. 11 is a perspective view of the FIG. 4 boosted coupled inductor that is marked up to show a few examples of leakage magnetic flux paths.

Additionally, leakage magnetic flux generally flows through the turn of boost winding 408, such that boost winding 408 is strongly magnetically coupled to leakage magnetic flux associated with power transfer windings 406. For example, FIG. 11 is a perspective view that is similar to FIG. 4 and is marked-up to symbolically show a few example leakage magnetic flux paths in boosted coupled inductor 400. In particular, FIG. 11 illustrates three example leakage magnetic flux paths 1102, 1104, and 1106 associated with power transfer winding 406(1). It should be noted that all shown leakage magnetic flux paths 1102, 1104, and 1106 pass through the turn formed by boost winding 408. The thick dashed lines of FIG. 11 represent leakage magnetic flux flowing internal to magnetic core 404, while the thin dashed lines of FIG. 11 represent leakage magnetic flux flowing external to magnetic core 404. Additionally, while not shown in FIG. 11, there are additional leakage magnetic flux paths for power transfer winding 406(1), as well as leakage magnetic flux paths for power transfer windings 406(2)-406(4), which pass through the turn formed by boost winding 408. Accordingly, boost winding 408 forms a turn around respective leakage magnetic flux paths for each power transfer winding 406. The fact that boost winding 408 is within mutual magnetic flux paths helps maximize leakage magnetic flux coupling to boost winding 408, by reducing potential for leakage magnetic flux to escape from magnetic core 404 before coupling to boost winding 408. Nevertheless, some leakage magnetic flux associated with power transfer windings 406(1)-406(4) does not pass through the turn formed by boost winding 408.

Figure 12:
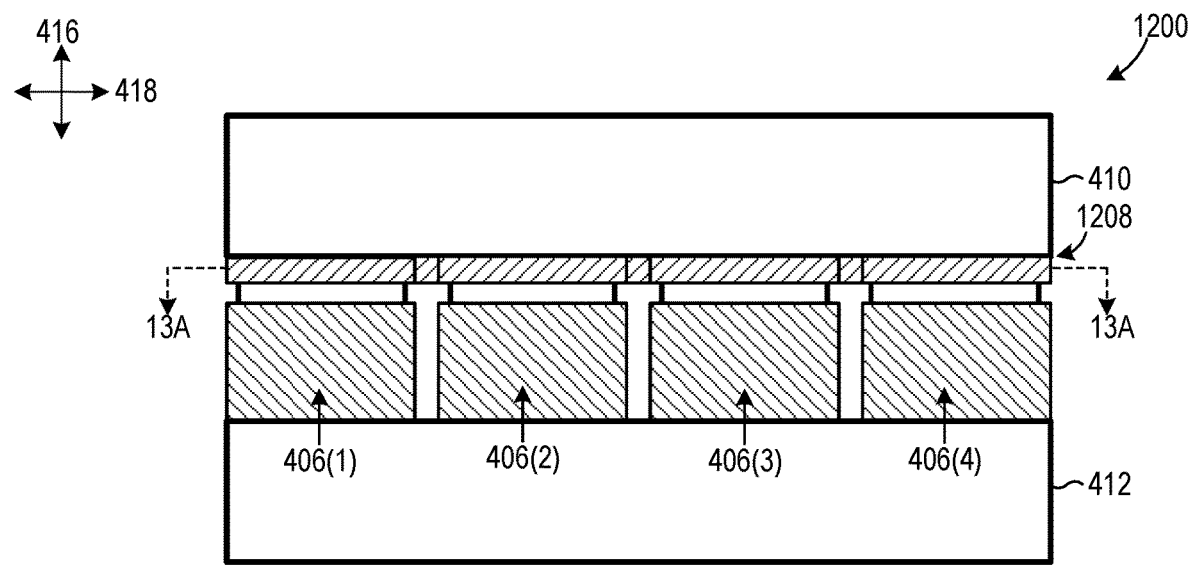
FIG. 12 is a top plan view of an alternate embodiment of the FIG. 4 boosted coupled inductor.
Figure 13:
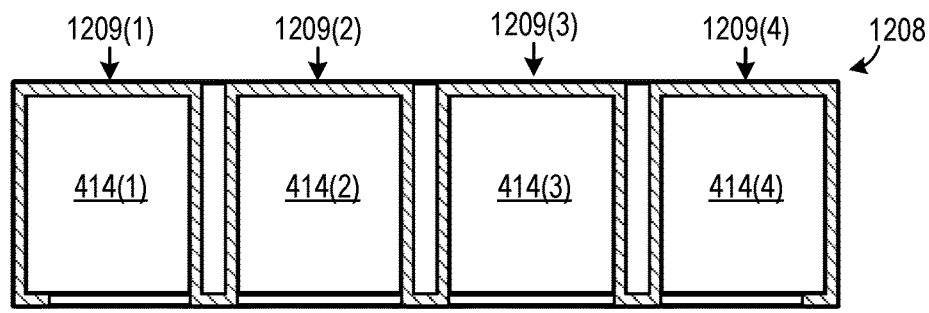
FIG. 13 is a cross-sectional view of the FIG. 12 boosted coupled inductor.

Boost winding 408 forms a common turn around all legs 414, such as illustrated in FIG. 8. However, boost winding 408 could be modified to form a respective turn around each leg 414, with all of the turns electrically coupled in series. For example, FIG. 12 is a top plan view of a boosted coupled inductor 1200, and FIG. 13 is a cross-sectional view of boosted coupled inductor 1200 taken along line 13A-13A of FIG. 12. Boosted coupled inductor 1200 is an alternate embodiment of boosted coupled inductor 1200 where boost winding 408 is replaced with a boost winding 1208 forming a respective turn 1209 around each leg 414. Turns 1209 are electrically coupled in series. Accordingly, boost winding 1208 has similar electrical properties to boost winding 408. For example, boost winding 1208 is strongly magnetically coupled to leakage elements of power transfer windings 406, and boosted coupled inductor 1200 is capable of being operated such that net mutual magnetic flux flowing through boost winding 1208 is essentially zero.

Boosted coupled inductors 400 and 1200 are configured to minimize leakage inductance of power transfer windings 406. As discussed below, switching power converter 200 leverages magnetizing inductance, instead of leakage inductance, to reduce ripple current magnitude, and a large leakage inductance is therefore not required to achieve small leakage current magnitude in switching power converter 200. Additionally, small leakage inductance values promote good transient response of switching power converter 200. Nevertheless, should larger leakage inductance be desired or required, boosted coupled inductors 400 and 1200 could be modified to include features for increasing leakage inductance, such as one or more magnetic elements configured to provide a leakage magnetic flux path between first rail 410 and second rail 412.

Figure 14:
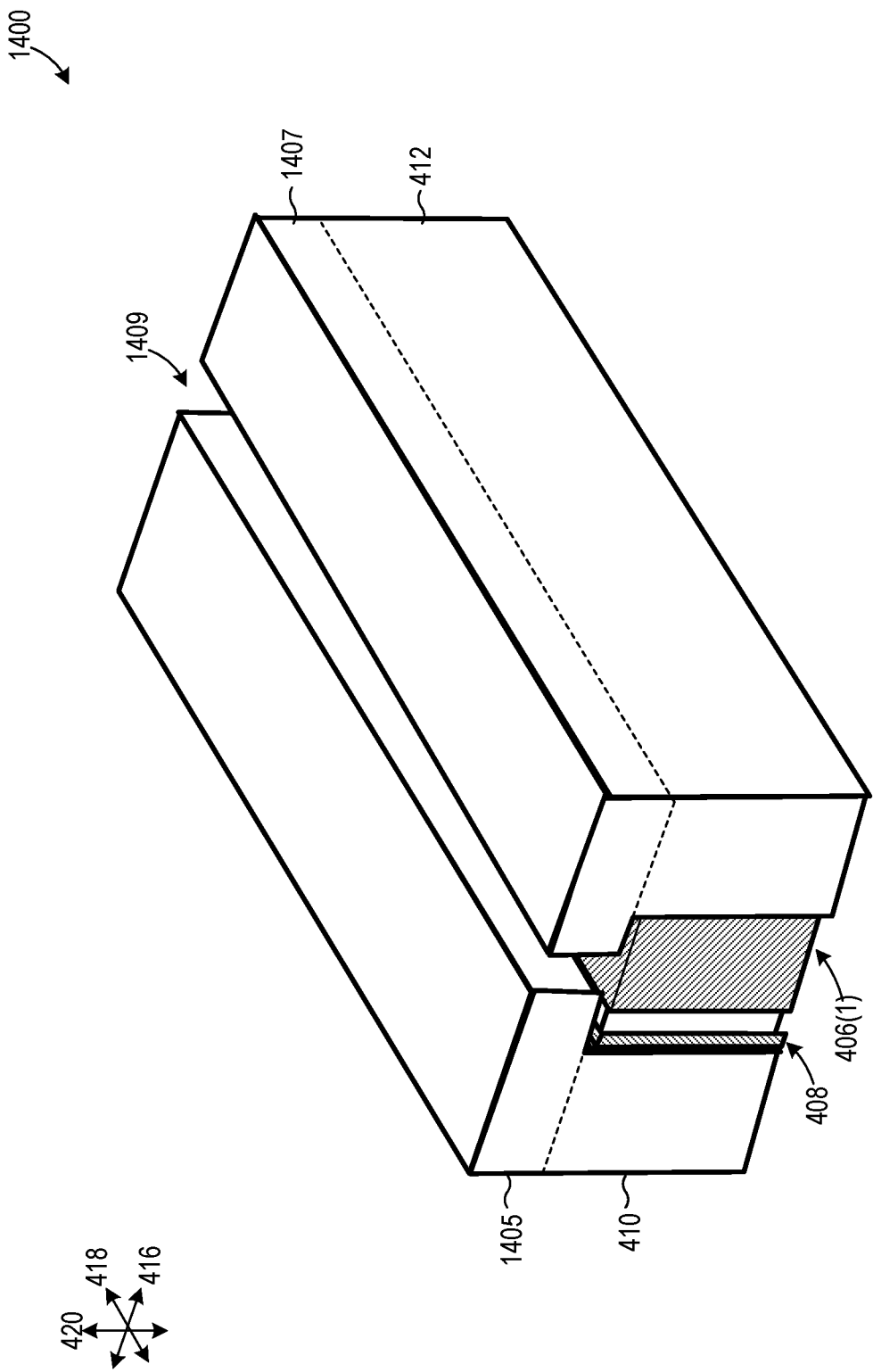
FIG. 14 is a perspective view of an alternate embodiment of the FIG. 4 boosted coupled inductor further including leakage elements.

For example, FIG. 14 is a perspective view of a boosted coupled inductor 1400, which is an alternate embodiment of boosted coupled inductor 400 further including leakage elements 1405 and 1407. Leakage element 1405 is joined to rail 410, and leakage element 1407 is joined to rail 412. Leakage elements 1405 and 1407 are formed of a magnetic material, such as a ferrite magnetic material or a powdered iron magnetic material. Leakage elements 1405 and 1407 extend towards each other in direction 416 to provide a relatively low reluctance path for leakage magnetic flux to flow between rails 110 and 412. Leakage elements 1405 and 1407 are optionally separated by a gap 1409 in direction 416 where gap 1409 is filled with, for example, air, paper, plastic, adhesive, and/or a magnetic material having a lower magnetic permeability that magnetic material forming leakage elements 1405 and 1407. Gap 409 can be split into two or more smaller gaps to decrease the fringing flux. The dotted lines delineating leakage elements 1405 and 1407 from rails 410 and 412, respectively, are to assist a viewer in distinguishing features of boosted coupled inductor 1400, and these lines do not necessarily represent discontinuities in boosted coupled inductor 1400.

Figure 15:
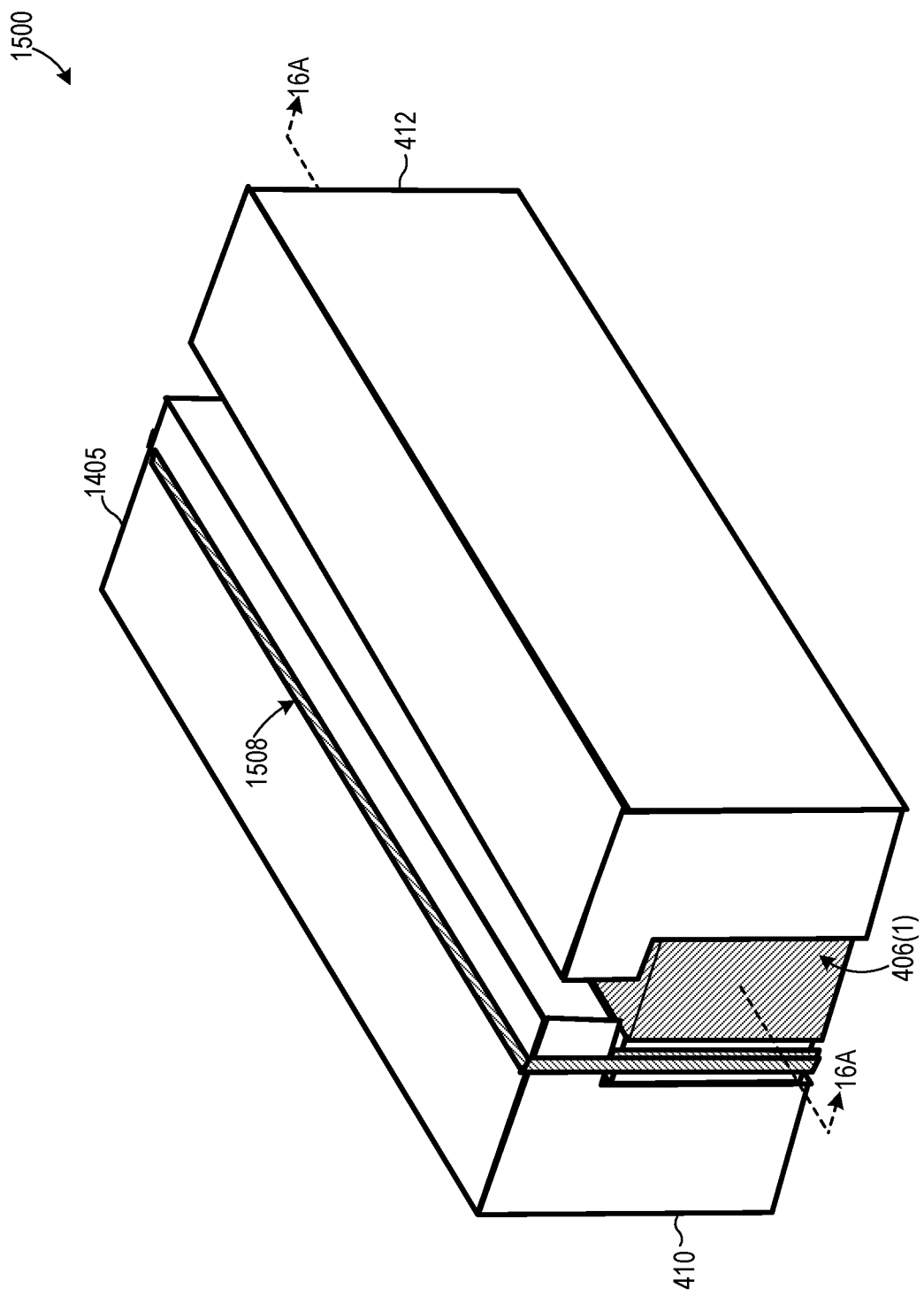
FIG. 15 is a perspective view of an alternate embodiment of the FIG. 14 boosted coupled inductor.
Figure 16:
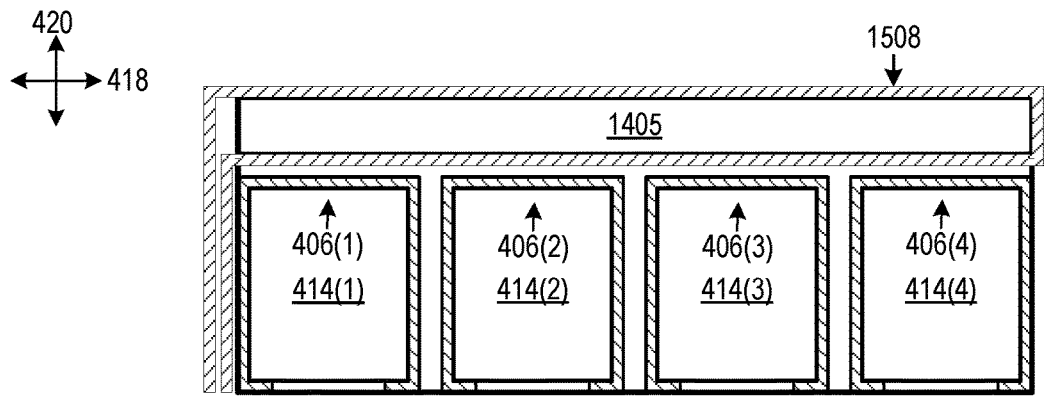
FIG. 16 is a cross-sectional view of the FIG. 15 boosted coupled inductor.

Boosted coupled inductor 1400 could be modified so that its boost winding is wound around one or more leakage elements 1405 and 1407, instead of being wound around legs 414. For example, FIG. 15 is a perspective view of a boosted coupled inductor 1500, and FIG. 16 is a cross-sectional view of boosted coupled inductor 1500 taken along a line 16A-16A of FIG. 15. Boosted coupled inductor 1500 is an alternate embodiment of boosted coupled inductor 1400 where boost winding 408 is replaced with a boost winding 1508, where boost winding 1508 is another embodiment of boost winding 220. Boost winding 1508 forms a turn around leakage element 1405, which results in boost winding 1508 forming a turn around leakage magnetic flux paths of each power transfer winding 406. Additionally, boost winding 1508 is outside of mutual magnetic flux paths of power transfer windings 406. Consequently, mutual magnetic flux does not flow through the turn of boost winding 1508, and net mutual magnetic flux flowing though boost winding 1508 is accordingly zero.

Figure 17:
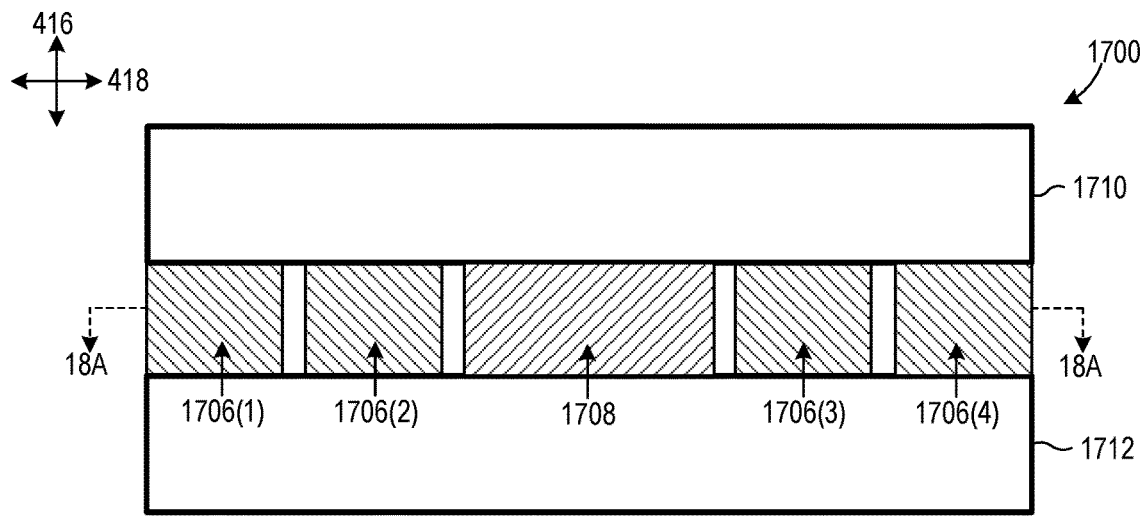
FIG. 17 is a top plan view of an alternate embodiment of the FIG. 15 boosted coupled inductor.
Figure 18:
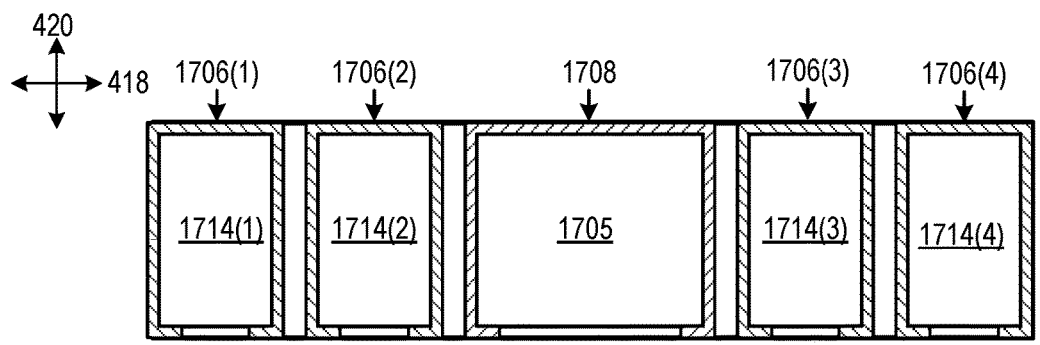
FIG. 18 is a cross-sectional view of the FIG. 17 boosted coupled inductor.
Figure 19:
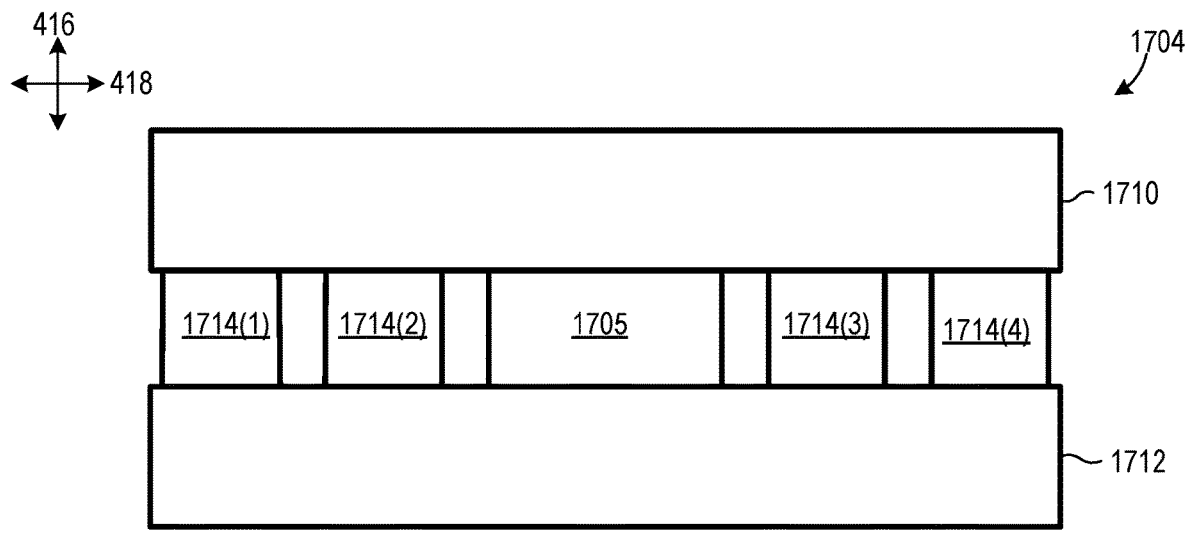
FIG. 19 is a top plan view of the FIG. 17 boosted coupled inductor with windings omitted.

Boosted coupled inductor 1500 could be modified to have a different leakage element configuration. For example, FIG. 17 is a top plan view of a boosted coupled inductor 1700, and FIG. 18 is a cross-sectional view of boosted coupled inductor 1700 taken long line 18A-18A of FIG. 17, where boosted coupled inductor 1700 is an alternate embodiment of boosted coupled inductor 1500 with a different leakage element configuration. FIG. 19 is a top plan view of boosted coupled inductor 1700 with windings omitted, to further show a magnetic core of the boosted coupled inductor.

Boosted coupled inductor 1700 includes a magnetic core 1704 (see FIG. 19), a plurality of power transfer windings 1706, and a boost winding 1708. Power transfer windings 1706 are embodiments of power transfer windings 210, and boost winding 1708 is an embodiment of boost winding 220. Magnetic core 1704 is formed, for example, of a ferrite magnetic material or a powdered iron magnetic material. Magnetic core 1704 includes a first rail 1710, a second rail 1712, and a plurality of legs 1714. Although magnetic core 1704 is illustrated as including four legs 1714, the number of legs 1714 of magnetic core 1704 will vary with the number of phases supported by boosted coupled inductor 1700. First rail 1710 and second rail 1712 are separated from each other in direction 416, and legs 1714 are disposed between first rail 1710 and second rail 1712 in direction 416. Legs 1714 are separated from each other in direction 418. In some embodiments, legs 1714 join first and second rails 1710 and 1712 in direction 416, and in some other embodiments, legs 1714 are separated from first rail 1710 and/or second rail 1712 by a respective gap (not shown), such as to help prevent saturation of magnetic core 1704. Each leg 1714 optionally also forms a respective gap (not shown) along direction 418, such that the leg is broken into two portions separated from each other in direction 416 by the gap.

Magnetic core 1704 further includes a leakage element 1705 disposed between first rail 1710 and second rail 1712 in direction 416. In some embodiments, leakage element 1705 is separated from first rail 1710 and/or second rail 1712 by a respective gap (not shown). Leakage element 1705 optionally also forms a gap (not shown) along direction 416, such that the leakage element is broken into two or more portions separated from each other in direction 416 by the gap. While FIGS. 17-19 depict leakage element 1705 being disposed between legs 1714(2) and 1714(3) in direction 418 so that the leakage element is centrally located with respect to legs 1714, location of leakage element 1705 could vary as long as it is disposed between first rail 1710 and second rail 1712 in direction 416. For example, leakage element 1705 could alternately be disposed between legs 1714(1) and 1714(2) in direction 418. While not required, it is anticipated that leakage element 1705 will typically have a larger cross-sectional area (in directions 418 and 420) than each leg 1714, such as illustrated in FIG. 18, because leakage element 1705 sees leakage magnetic flux from each leg 1714. Additionally, while not required, it is anticipated that a gap in leakage element 1705, when present, will be larger than gaps in the legs 1714, when present, so that the leakage inductance value will be lower than the magnetizing inductance values of power transfer windings 1706.

A respective power transfer winding 1706 is wound at least partially around each leg 1714. Additionally, boost winding 1708 is wound at least partially around leakage element 1705, which results in boost winding 1708 forming a turn around leakage magnetic flux paths of each power transfer winding 1706. Additionally, boost winding 1708 is outside of mutual magnetic flux paths of power transfer windings 1706. Consequently, mutual magnetic flux does not flow through the turn of boost winding 1708, and net mutual magnetic flux flowing though boost winding 1708 is accordingly zero. Boost winding 1708 is electrically isolated from power transfer windings 1706. Although each power transfer winding 1706 and boost winding 1708 is depicted as being a single-turn winding formed of electrically conductive foil, such as copper foil, the configurations of power transfer windings 1706 and boost winding 1708 may vary. For example, one or more of these windings may form a plurality of turns, and/or one or more of these windings may be formed of wire instead of electrically conductive foil.

Figure 20:
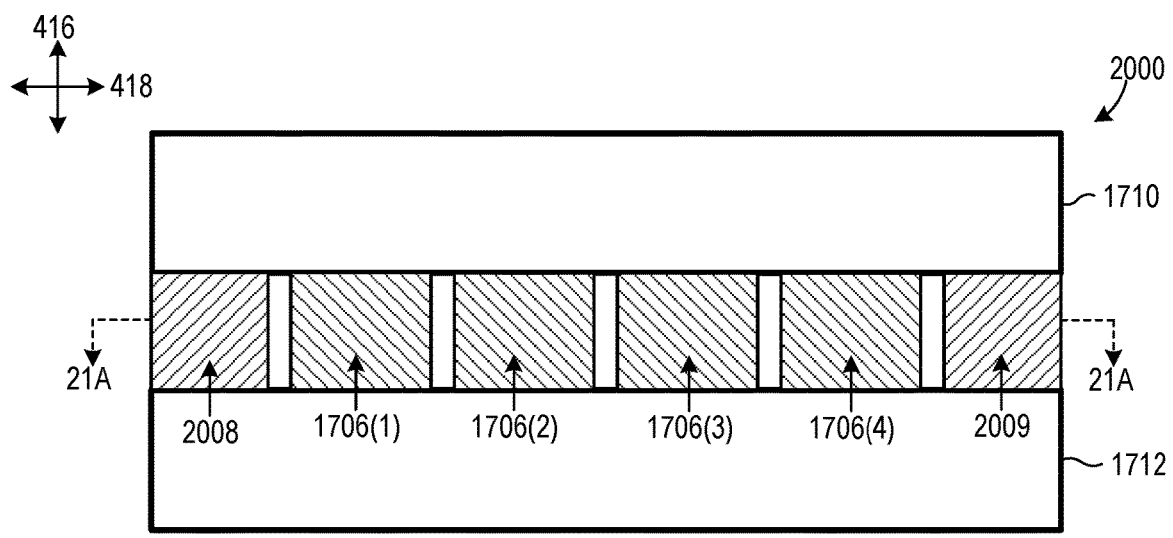
FIG. 20 is a top plan view of the FIG. 17 boosted coupled inductor including two leakage elements.
Figure 21:
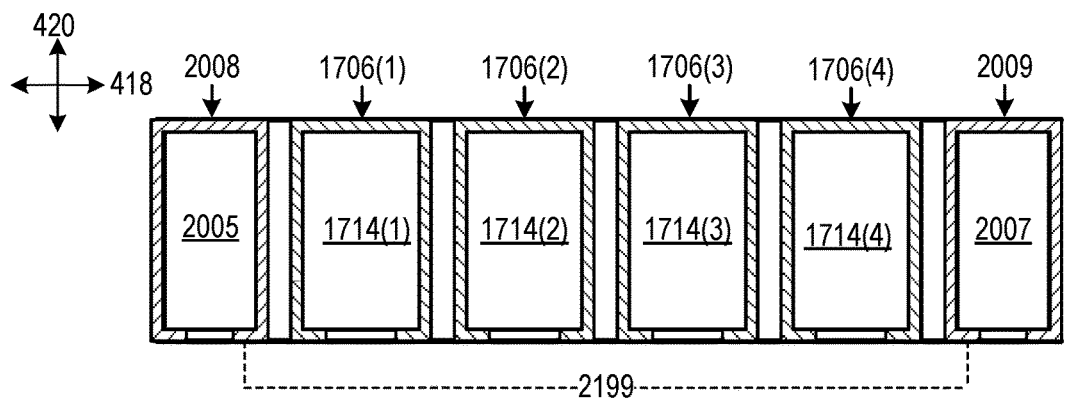
FIG. 21 is a cross-sectional view of the FIG. 20 boosted coupled inductor.
Figure 22:
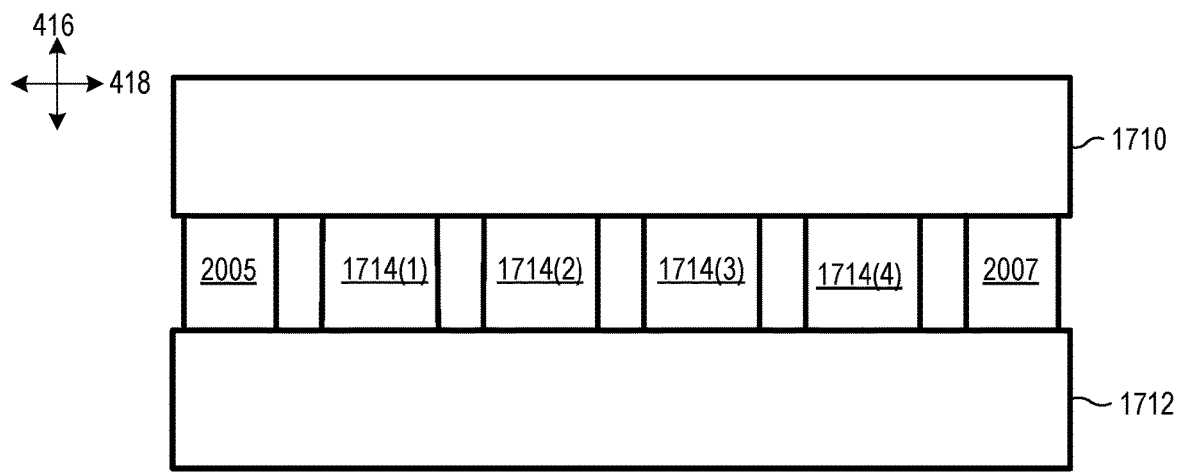
FIG. 22 is a top plan view of the FIG. 20 boosted coupled inductor with windings omitted.

Leakage element 1705 and boost winding 1708 could be replaced with two or more leakage elements and boost windings, respectively. For example, FIG. 20 is a top plan view of a boosted coupled inductor 2000, and FIG. 21 is a cross-sectional view of boosted coupled inductor 2000 taken long line 21A-21A of FIG. 20. Boosted coupled inductor 2000 is an alternate embodiment of boosted coupled inductor 1700 (a) where leakage element 1705 is replaced with two leakage elements 2005 and 2007 and (b) boost winding 1708 is replaced with two boost windings 2008 and 2009, where boost windings 2008 and 2009 are collectively an embodiment of boost winding 220. FIG. 22 is a top plan view of boosted coupled inductor 2000 with windings omitted, to further show the magnetic core of the boosted coupled inductor.

Each leakage element 2005 and 2007 is disposed between first rail 1710 and second rail 1712 in direction 416, and leakage elements 2005 and 2007 are separated from each other in direction 418. While FIGS. 20-22 depict leakage elements 2005 and 2007 being disposed at opposing ends of boosted coupled inductor 2000, the location of leakage elements 2005 and 2007 may vary, as long as each leakage elements is disposed between first rail 1710 and second rail 1712 in direction 416. Leakage elements 2005 and 2007 optionally also form a gap (not shown), such that the leakage element is broken into two or more portions separated from each other in direction 416 by the gap. Boost winding 2008 is wound around leakage element 2005, and boost winding 2009 is wound around leakage element 2007. As such, each boost winding 2008 and 2009 forms a respective turn around leakage magnetic flux paths of each power transfer winding 1706. Additionally, each boost winding 2008 and 2009 is outside of mutual magnetic flux paths of power transfer windings 1706. Consequently, mutual magnetic flux does not flow through the respective turns of boost windings 2008 and 2009, and net mutual magnetic flux flowing through each boost winding 2008 and 2009 is accordingly zero.

Boost windings 2008 and 2009 will typically be electrically coupled in series, as symbolically shown by a dashed line 2199 in FIG. 21. For example, boosted coupled inductor 2000 may include an electrical conductor (not shown) electrically coupling boost windings 2008 and 2009 in series. As another example, boost windings 2008 and 2009 may be electrically coupled in series external to boosted coupled inductor 2000, such as by a printed circuit board (PCB) (not shown) supporting boosted coupled inductor 2000.

Figure 23:
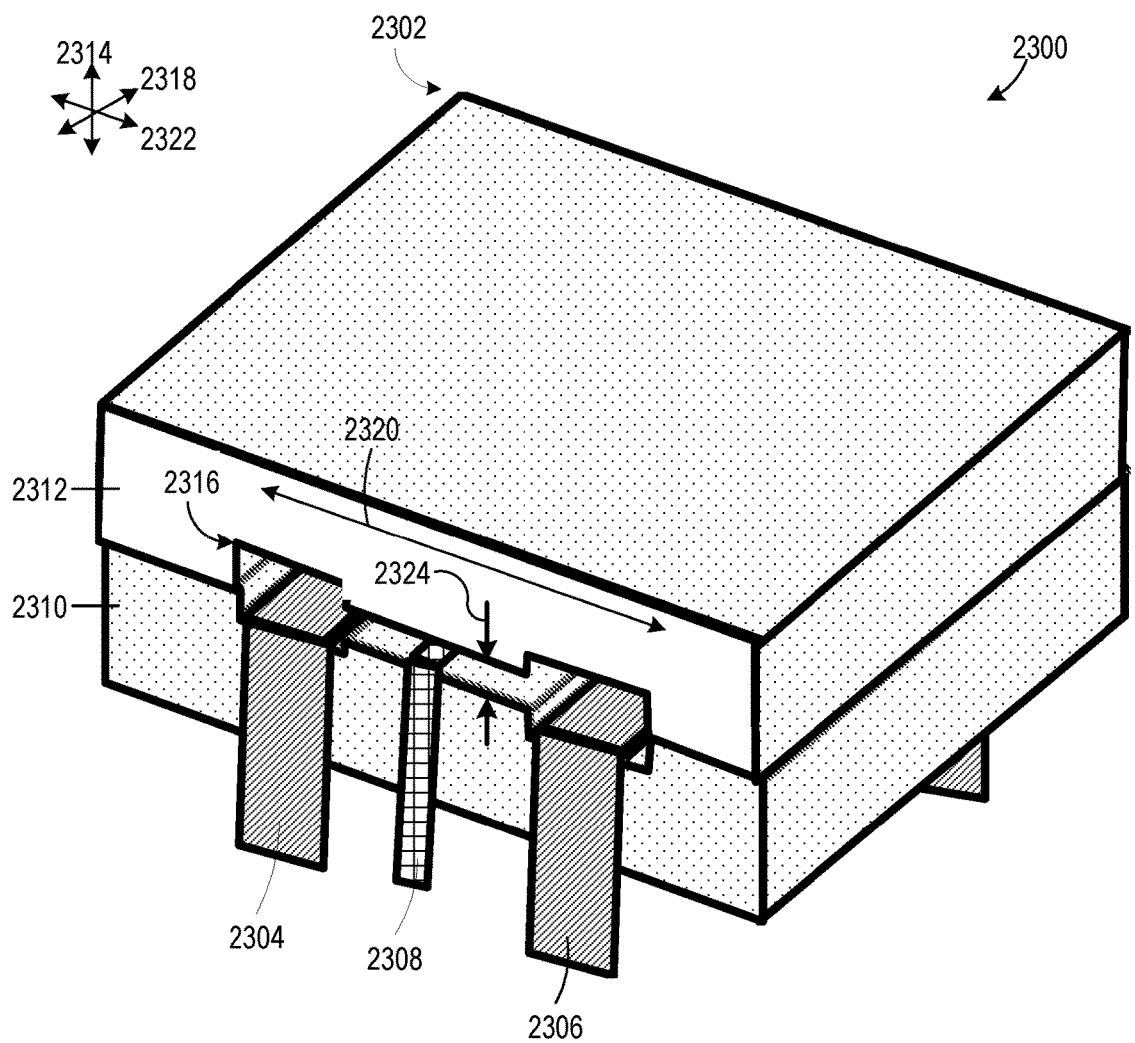
FIG. 23 is a perspective view of a non-scalable boosted coupled inductor, according to an embodiment.

Boosted coupled inductors 400, 1200, 1400, 1700, and 2000 are scalable in that they can be configured to support any number of phases by adjusting the number of legs 414 and power transfer windings 406. However, boosted coupled inductor 228 of FIG. 2 could also be a non-scalable boosted coupled inductor in embodiments of switching power converter 200 where N is equal to two. For example, FIG. 23 is a perspective view of a boosted coupled inductor 2300, which is another possible embodiment boosted coupled inductor 228 where N is equal to two. Boosted coupled inductor 2300 includes a magnetic core 2302, a first power transfer winding 2304, a second power transfer winding 2306, and a boost winding 2308. Power transfer windings 2304 and 2306 are each an embodiment of a power transfer winding 210, and boost winding 2308 is an embodiment of boost winding 220.

Figure 24:
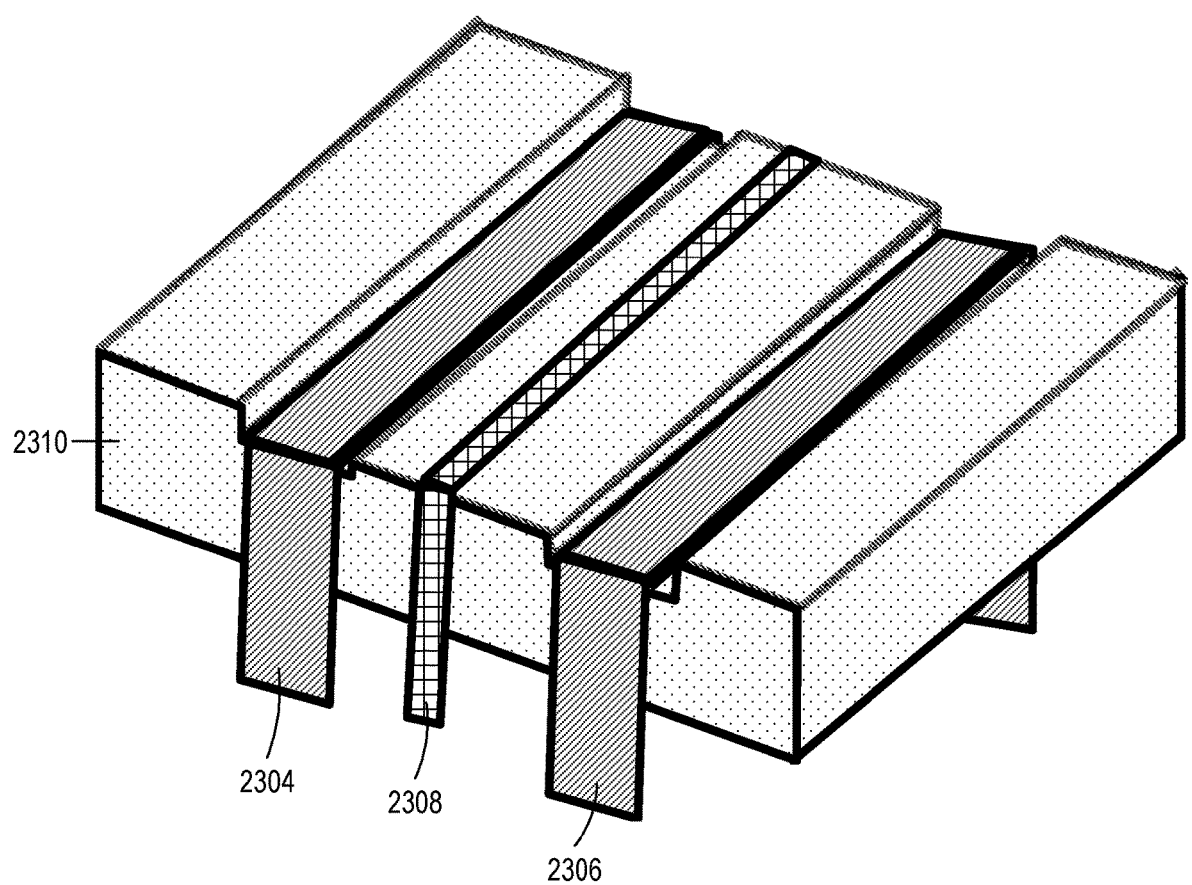
FIG. 24 is a perspective view of the FIG. 23 boosted coupled inductor with a magnetic element removed to show an interior of the boosted coupled inductor.

Magnetic core 2302 is formed, for example, of a ferrite magnetic material or a powdered iron magnetic material. Magnetic core 2302 includes a first element 2310 and a second element 2312 stacked in a direction 2314. FIG. 24 is a perspective view of boosted coupled inductor 2300 with second element 2312 removed to show an interior of boosted coupled inductor 2300. Magnetic core 2302 forms a passageway 2316 extending through magnetic core 2302 in a direction 2318, where direction 2318 is orthogonal to direction 2314. Passageway 2316 has a width 2320 in a direction 2322, where direction 2322 is orthogonal to each of directions 2314 and 2318. Magnetic core 2302 could be formed of a single element, or magnetic core 2302 could be formed of three of more elements, without departing from the scope hereof.

Each of first power transfer winding 2304, second power transfer winding 2306, and boost winding 2308 are wound through passageway 2316. Second power transfer winding 2306 is separated from first power transfer winding 2304 in direction 2322, and boost winding 2308 is disposed between first power transfer winding 2304 and second power transfer winding 2306 in direction 2322. In some embodiments, each of first power transfer winding 2304, second power transfer winding 2306, and boost winding 2308 is a staple style winding. Passageway 2316 has a height 2324 in direction 2314. In some embodiments, height 2324 varies along width 2320. For example, in certain embodiments, height 2324 at the boost winding 2308 is less than height 2324 at each of the first and second power transfer windings 2304 and 2306, to achieve requisite leakage inductance values. The configuration of boosted coupled inductor 2300 enables boost winding 2308 be strongly magnetically coupled to leakage elements of power transfer windings 2304 and 2306. In particular, boost winding 2308 forms a turn around leakage magnetic flux paths of power transfer windings 2304 and 2306. Additionally, boosted coupled inductor 2300 is capable of being operated such that net mutual magnetic flux flowing through the turn of boost winding 2308 is essentially zero.

Referring again to FIG. 2, controller 206 is implemented, for example, by analog and/or electronic circuitry. In some embodiments, controller 206 is at least partially implemented by a processor (not shown) executing instructions in the form of software and/or firmware stored in a memory (not shown). Although controller 206 is depicted as a discrete element for illustrative simplicity, controller 206 could be partially or fully integrated with one or more other elements of switching power converter 200. For example, some subsystems of controller 206 could be incorporated in one or more of power switching stages 208 and/or injection switching stage 218. Additionally, FIG. 2 should not be construed to require that there be a separate control bus for each control signal. For example, controller 206 could be implemented by a combination of a central integrated circuit and local control logic integrated in each switching stage 208 and 218, with a single control bus running from the central integrated circuit to each switching stage 208 and 218. Furthermore, controller 206 could be configured to derive control signal UI and LI from one or more of control signals U and L, such as by using logic circuitry, instead of by independently generating control signals UI and LI. Moreover, controller 206 may include multiple constituent elements that need not be co-packaged over even disposed at a common location.

Controller 206 is configured to generate control signals U and L to control duty cycle (D) of power stages 202, where duty cycle is a portion of a switching cycle that a power transfer winding 210 is driven high, to regulate at least one parameter of switching power converter 200. In some embodiments, controller 206 is configured to control duty cycle of power stages 202 using pulse width modulation (PWM) and/or pulse frequency modulation (PFM). Examples of possible regulated parameters include, but are not limited, magnitude of input voltage $V_{in}$, magnitude of input current $I_{in}$, magnitude of output voltage $V_o$, and magnitude of output current $I_o$. For example, in some embodiments, controller 206 is configured to generate control signals U and L to regulate magnitude of output voltage $V_o$, and controller 206 accordingly generates control signals U and L during continuous conduction operation of switching power converter 200 such that duty cycle of power stages 202 is equal to a ratio of output voltage magnitude $V_o$ over input voltage magnitude $V_{in}$. For example, if output voltage $V_o$ is to be regulated to two volts and input voltage $V_{in}$ is eight volts, controller 206 would generate control signals U and L such that duty cycle of power stages 202 is 0.25. Controller 206 is optionally configured to generate control signals U and L such that power stages 202 switch out-of-phase with each other. For example, in some embodiments, controller 206 is configured to generate control signals U and L such that each power stage 202 switches 360/N degrees out of phase with an adjacent power stage 202 in the phase domain.

Controller 206 is further configured to generate control signals UI and LI to control injection stage 204 such that the injection stage injects magnetic flux in magnetic core 226 in a manner which reduces voltage across leakage inductances of power transfer windings 210. Such reduction in voltage across leakage inductance of power transfer windings 210 advantageously reduces, or even essentially eliminates, magnitude of ripple current associated with charging and discharging of the leakage inductance, thereby reducing magnitude of ripple current flowing through power transfer windings 210, as well as reducing magnitude of ripple in output current $I_o$. To help appreciate this feature, refer to FIG. 25, which is an approximate electrical model 2500 of boosted coupled inductor 228, connected to injection stage 204. Model 2500 includes N ideal transformers 2502, N ideal transformers 2504, N inductors 2506, N inductors 2508, and N inductors 2510. Primary windings P of ideal transformers 2502 are electrically coupled in series, and the secondary winding S of each ideal transformer 2502 is electrically coupled between a respective switching node X and a respective inductor 2508. Additionally, a respective inductor 2506 is electrically coupled in parallel with the secondary winding S of each ideal transformer 2502, and each inductor 2506 has an inductance value equal to $L_m*N/(N-1)$, where $L_m$ is magnetizing inductance of boosted coupled inductor 228.

Each inductor 2508 is electrically coupled between the secondary winding S of a respective ideal transformer 2502 and a respective inductor 2510. Each inductor 2508 has an inductance value $L_a$ which represents a portion of a total leakage inductance $L_k$ of a respective power transfer winding 210 corresponding to leakage magnetic flux that does not couple to boost winding 220. Accordingly, $L_a$ may also be referred to as stray inductance. Each inductor 2510 is electrically coupled between a respective inductor 2508 and output node 212. Each inductor 2510 has an inductance equal to $L_k-L_a$, which represents a portion of a total leakage inductance $L_k$ of a respective power transfer winding 210 corresponding to leakage magnetic flux that does couple to boost winding 220. A primary winding P of a respective ideal transformer 2504 is electrically coupled in parallel with each inductor 2510. Secondary windings S of ideal transformers 2504 are electrically coupled in series between switching node X(N+1) and injection output node 222.

Figure 26A:
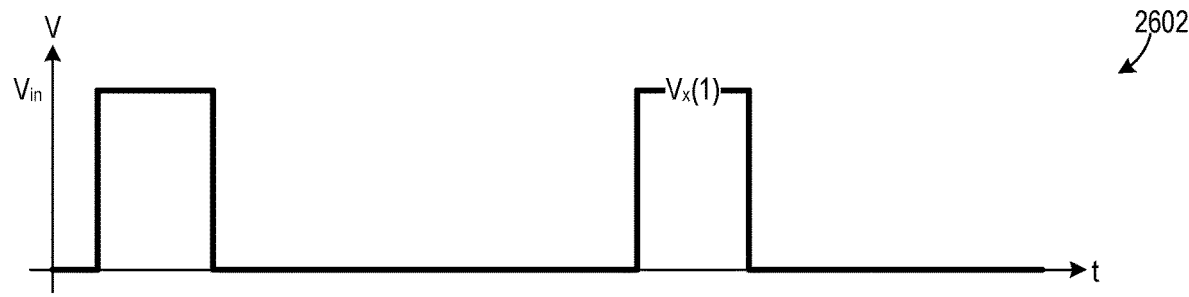
FIGS. 26A-26D are graphs collectively illustrating one example of operation of the FIG. 2 switching power converter.
Figure 26B:
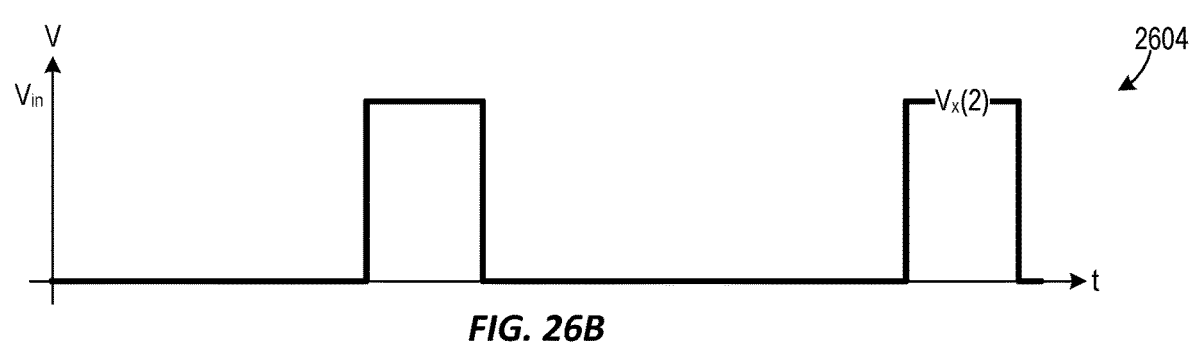
Figure 26C:
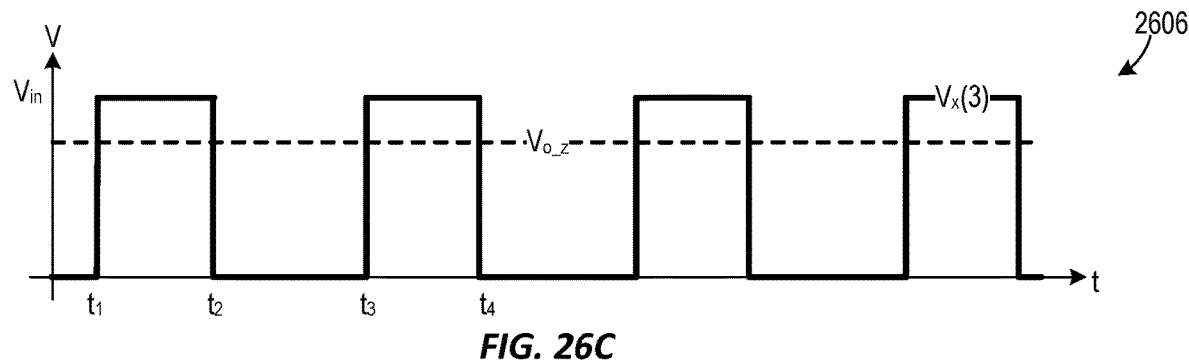
Figure 26D:
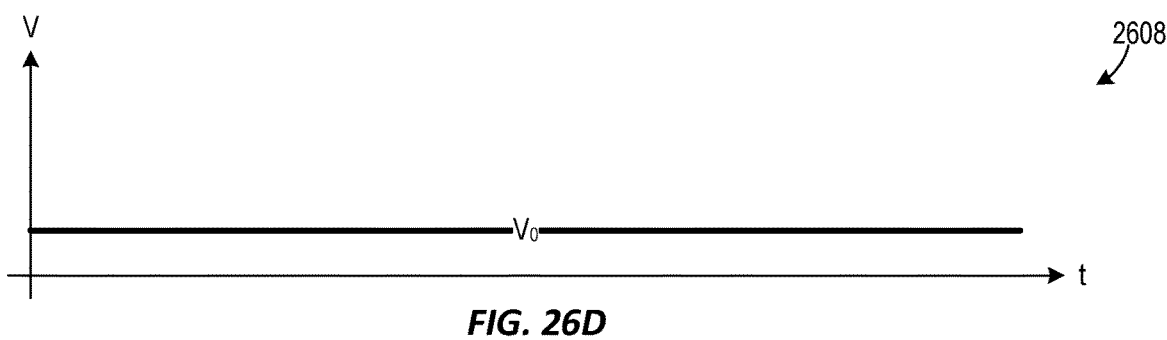

Particular embodiments of controller 206 are configured to generate control signals UI and LI to operate injection stage 204 in a manner that reduces voltage across leakage inductance of power transfer windings 210, i.e., by reducing voltages $V_a$ across inductors 2508, to reduce ripple current magnitude, thereby reducing magnitude of ripple current flowing through power transfer windings 210, as well as reducing magnitude of ripple in output current $I_o$. For example, FIGS. 26A-26D are graphs collectively illustrating one example of operation of an embodiment of switching power converter 200 where N is equal to two, such that switching power converter 200 includes two power stages 202 and one injection stage 204. Graphs 26A-26D also assume that the magnetizing inductance value of boosted coupled inductor 228 is much greater than any leakage inductance value of boosted coupled inductor 228. Graph 2602 is a graph of switching node voltage $V_x(1)$ versus time, and graph 2604 is a graph of switching node voltage $V_x(2)$ versus time. As illustrated in FIGS. 26A and 26B, each switching node X(1) and X(2) is repeatedly driven high and low between $V_{in}$ and zero volts, respectively, and the switching nodes are driven high and low out-of-phase with each other. FIG. 26C is a graph 2606 including a curve representing voltage at the injection switching node X(N+1), which is node X(3) because N is equal to two in this example. FIG. 26C also includes a curve representing voltage $V_{o\_z}$ at injection output node 222. FIG. 26D is a graph 2608 of output voltage $V_o$.

In the example of FIGS. 26A-26D, controller 206 controls injection stage 204 so that injection stage 204 switches in unison with power stages 202. Specifically, boost winding 220 is driven high in response to any power transfer winding 210 being driven high, and boost winding 220 is driven low in response to any power transfer winding 210 being driven low, as illustrated in FIGS. 26A-26C. For example, boost winding 220 is driven high at time $t_1$ in response to power transfer winding 210(1) being driven high, and boost winding 220 is driven low at time $t_2$ in response to power transfer winding 210(1) being driven low. As another example, boost winding 220 is driven high at time $t_3$ in response to power transfer winding 210(2) being driven high, and boost winding 220 is driven low at time $t_4$ in response to power transfer winding 210(2) being driven low. Consequently, voltages on both sides of each inductor 2508 are largely identical. Therefore, voltages $V_a$ across inductors 2508 remain at a small value even as power transfer windings 210 are repeatedly driven between high and low states to regulate one or more parameters of switching power converter 200. As a result, there is relatively little ripple current associated with leakage inductance of boosted coupled inductor 228, irrespective of operating duty cycle of switching power converter 200.

It should be noted that there will be ripple current associated with charge and discharge of magnetizing inductance $L_m$ of boosted coupled inductor 228. However, such ripple current magnitude will be small if magnetizing inductance $L_m$ is large. Additionally, as discussed above, increasing magnetizing inductance $L_m$ does not degrade transient response. In a conventional switching power converter with a coupled inductor, in contrast, ripple current magnitude while operating at a certain and fixed duty cycle can be decreased mainly by increasing leakage inductance values and/or switching frequency, both of which have drawbacks. Specifically, increasing leakage inductance values impairs transient response, and increasing switching frequency increases switching power loss. Ripple current magnitude in a conventional coupled inductor can also be decreased by increasing magnetizing inductance $L_m$, but improvement will be limited and soon achieve diminishing returns. Accordingly, switching power converter 200 can achieve low ripple current magnitude without the drawbacks of achieving low ripple current magnitude in a conventional switching power converter.

The example of FIGS. 26A-26D assumes two phase operation and would look similar for infinite coupling or for cases with relatively low magnetizing inductances $L_m$. Nevertheless, injection stage 204 may significantly reduce voltages $V_a$, such that injection stage 204 may significantly reduce ripple current magnitude, even if low $L_m$ or non-ideal coupling of boosted coupled inductor 228, or other non-idealities of the circuit, prevent injection stage 204 from completely eliminating ripple current associated with leakage inductance of boosted coupled inductor 228. Additionally, FIGS. 26A-26D assume ideal timing, i.e., that injection stage 204 switches in synchronicity with power stages 202. While such synchronicity may be desired, it is not required for acceptable operation of switching power converter 200.

Figure 27A:
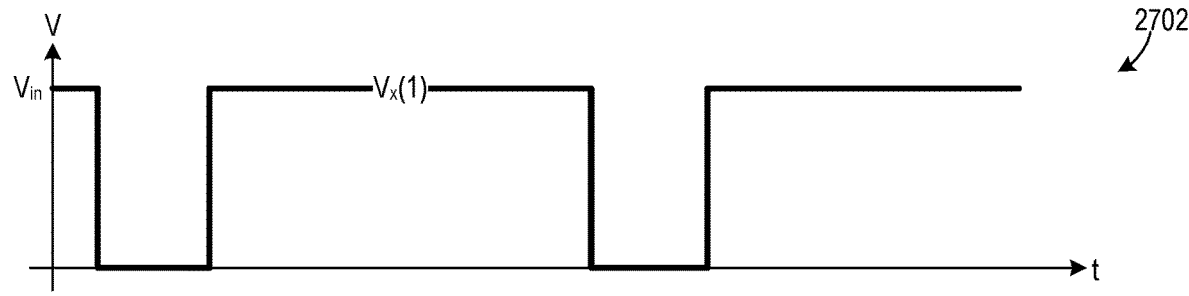
FIGS. 27A-27D are graphs collectively illustrating another example of operation of the FIG. 2 switching power converter.
Figure 27B:
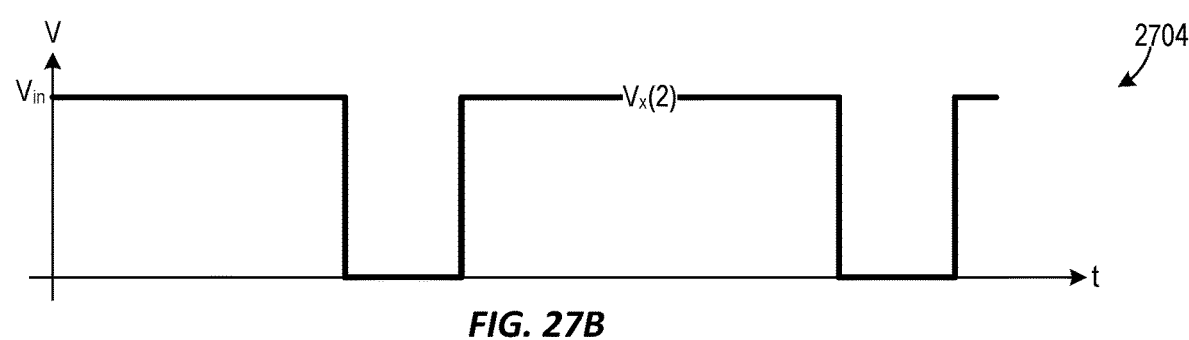
Figure 27C:
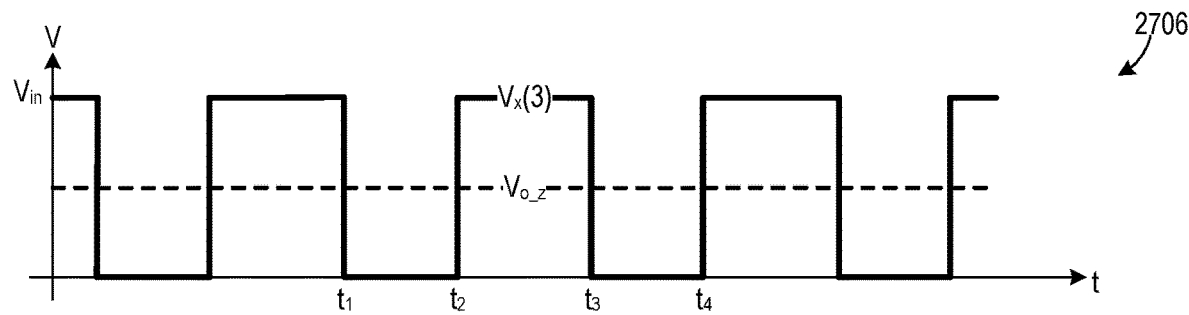
Figure 27D:
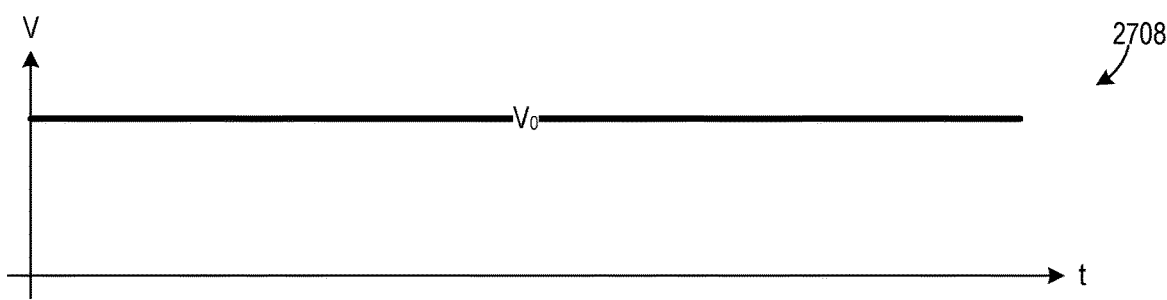

The example of FIGS. 26A-26D assumes that power stages 202 are driven high in a non-overlapping manner, or in other words, that no more than one power stage 202 is driven high at any given time. However, switching power converter 200 is not limited to non-overlapping operation. For example, FIGS. 27A-27D are graphs collectively illustrating one example of operation of an embodiment of switching power converter 200 where N is equal to two, such that switching power converter 200 includes two power stages 202 and one injection stage 204. Graphs 27A-27D also assume that the magnetizing inductance value of boosted coupled inductor 228 is much greater than any leakage inductance value of boosted coupled inductor 228. Graph 2702 is a graph of switching node voltage $V_x(1)$ versus time, and graph 2704 is a graph of switching node voltage $V_x(2)$ versus time. As illustrated in FIGS. 27A and 27B, each of switching node X(1) and X(2) is repeatedly driven high and low between $V_{in}$ and zero volts, respectively, and the switching nodes are driven high and low out-of-phase with each other. Additionally, switching node voltages X(1) and X(2) overlap in that the two switching nodes may be driven high at the same time. FIG. 27C is a graph 2706 including a curve representing voltage at the injection switching node X(N+1), which is node X(3) because N is equal to two in this example. FIG. 27C also includes a curve representing voltage $V_{o\_z}$ at injection output node 222. FIG. 27D is a graph 2708 of output voltage $V_o$.

In the example of FIGS. 27A-27D, controller 206 controls injection stage 204 so that injection stage 204 switches in unison with power stages 202. Specifically, boost winding 220 is driven high in response to any power transfer winding 210 being driven high, and boost winding 220 is driven low in response to any power transfer winding 210 being driven low, as illustrated in FIGS. 27A-27C. For example, boost winding 220 is driven low at time $t_1$ in response to power transfer winding 210(2) being driven low, and boost winding 220 is driven high at time $t_2$ in response to power transfer winding 210(2) being driven high. As another example, boost winding 220 is driven low at time $t_3$ in response to power transfer winding 210(1) being driven low, and boost winding 220 is driven high at time $t_4$ in response to power transfer winding 210(1) being driven high. Consequently, voltages on both sides of each inductor 2508 are largely identical. Therefore, voltages $V_a$ across inductors 2508 remain at a small value even as power transfer windings 210 are repeatedly driven between high and low states to regulate one or more parameters of switching power converter 200. As a result, there is relatively little ripple current associated with leakage inductance of boosted coupled inductor 228, irrespective of operating duty cycle of switching power converter 200.

Figure 28:
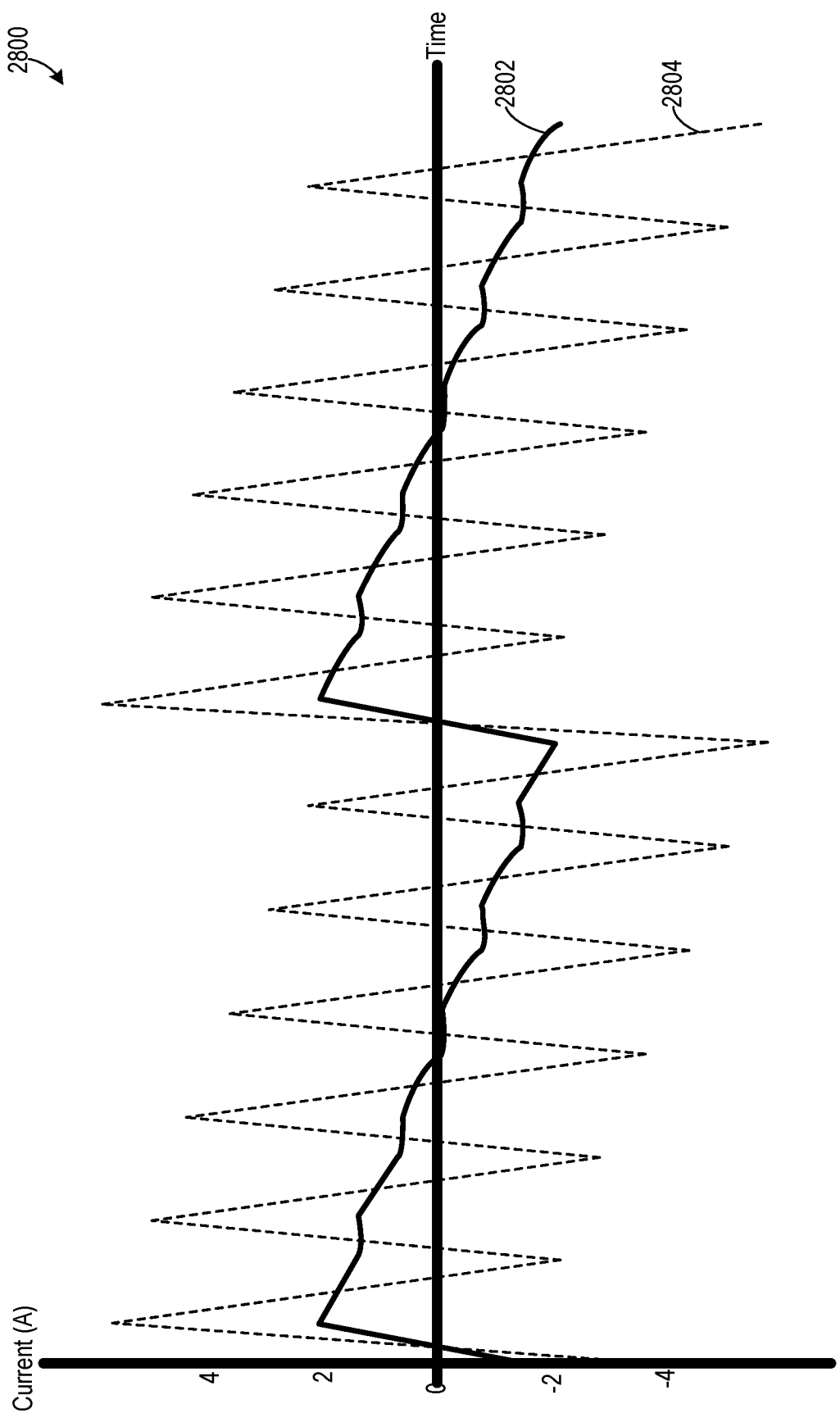
FIG. 28 is a graph illustrating simulated experimental results of an embodiment of the FIG. 2 switching power converter.

FIG. 28 is a graph of current in amperes (A) versus time illustrating simulated experimental results of an embodiment of switching power converter 200. Each of curves 2802 and 2804 represents simulated current $I_L(1)$ through power transfer winding 210(1) in an embodiment of switching power converter 200 where (a) N is equal 6, (b) switching frequency is 400 kilohertz (KHz), (c) $V_{in}$ is 12 volts, and (d) $V_o$ is 0.8 volt. Curve 2802 corresponds to injection stage 204 operating as discussed above, and curve 2804 corresponds to injection stage 204 being disabled. As evident when comparing curves 2802 and 2804, use of injection stage 204 significantly reduces peak-to-peak ripple current magnitude from 11.6 amperes to 4.2 amperes, thereby showing potential effectiveness of injection stage 204 including boost winding 220. Additionally, the large N*Fs harmonic is essentially eliminated in curve 2802, compared to curve 2804, which is significant for reduction of core loss and winding loss because these losses are typically worse at higher frequencies. Lowering the high frequency content in all power transfer windings may also be beneficial for reducing potential for electromagnetic interference (EMI).

Referring again to FIG. 25, controller 206 could alternately be configured to control switching of injection stage 204 such that voltages $V_b$ across inductors 2510 are substantially zero. However, such configuration would not reduce ripple in total current flowing through power transfer windings 210, and such configuration may actually increase total peak-to-peak ripple current magnitude. Accordingly, controller 206 should be configured to control injection stages 204 such that voltage $V_a$, instead of voltages $V_b$, are small.

Referring again to FIG. 2, injection stage 204 is powered from input power node 216, which enables injection stage 204 to properly operate with boosted coupled inductor 228 being symmetrical, e.g., boost winding 220 forms the same number of turns as each power transfer winding 210. Switching power converter 200 could be modified so that injection stage 204 is powered from a node having a voltage different from $V_{in}$ with appropriate changes to boosted coupled inductor 228 so that the boosted coupled inductor is no longer symmetrical.

Figure 29:
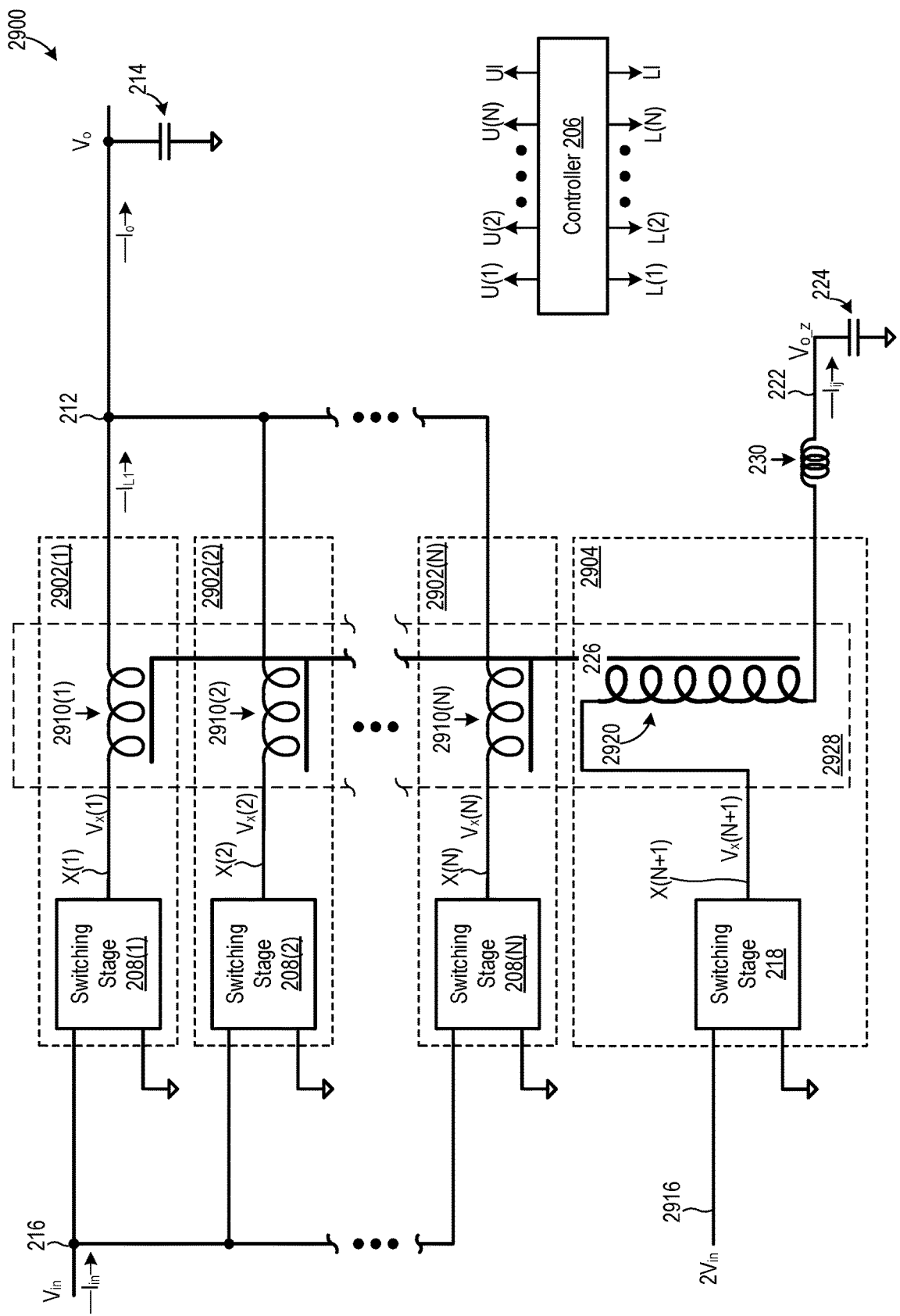
FIG. 29 is a schematic diagram of an alternate embodiment of the FIG. 2 switching power converter including an asymmetric boosted coupled inductor.

For example, FIG. 29 is a schematic diagram of a switching power converter 2900, which is an alternate embodiment of switching power converter 200 where injection stage 204 is replaced with an injection stage 2904 powered from an input power node 2916 and power stages 202 are replaced with power stages 2902. Input power node 2916 is at twice the voltage of input power node 216, i.e., input power node 2916 is at voltage $2V_{in}$. Boosted coupled inductor 2928 includes N power transfer windings 2910 and one boost winding 2920, where power transfer windings 2910 are alternate embodiments of power transfer windings 210 and boost winding 2920 is an alternate embodiment of boost winding 220. Boosted coupled inductor 2928 is modified in that boost winding 2920 forms twice the number of turns as each power transfer winding 2910, to compensate for the input voltage to injection stage 2904 being twice the input voltage to each power transfer stage 2902. Optional second tuning inductor 232 is not shown in FIG. 29 for illustrative clarity.

Boosted coupled inductor 2928 could be modified so that it is asymmetrical in magnetic flux path reluctance, instead of in number of winding turns. For example, boosted coupled inductor 2928 could be replaced with an asymmetrical boosted coupled inductor where all windings form the same number of turns, but where a magnetic flux path between the boost winding and any one power transfer winding has twice the reluctance of a magnetic flux path between any two power transfer windings.

Figure 30:
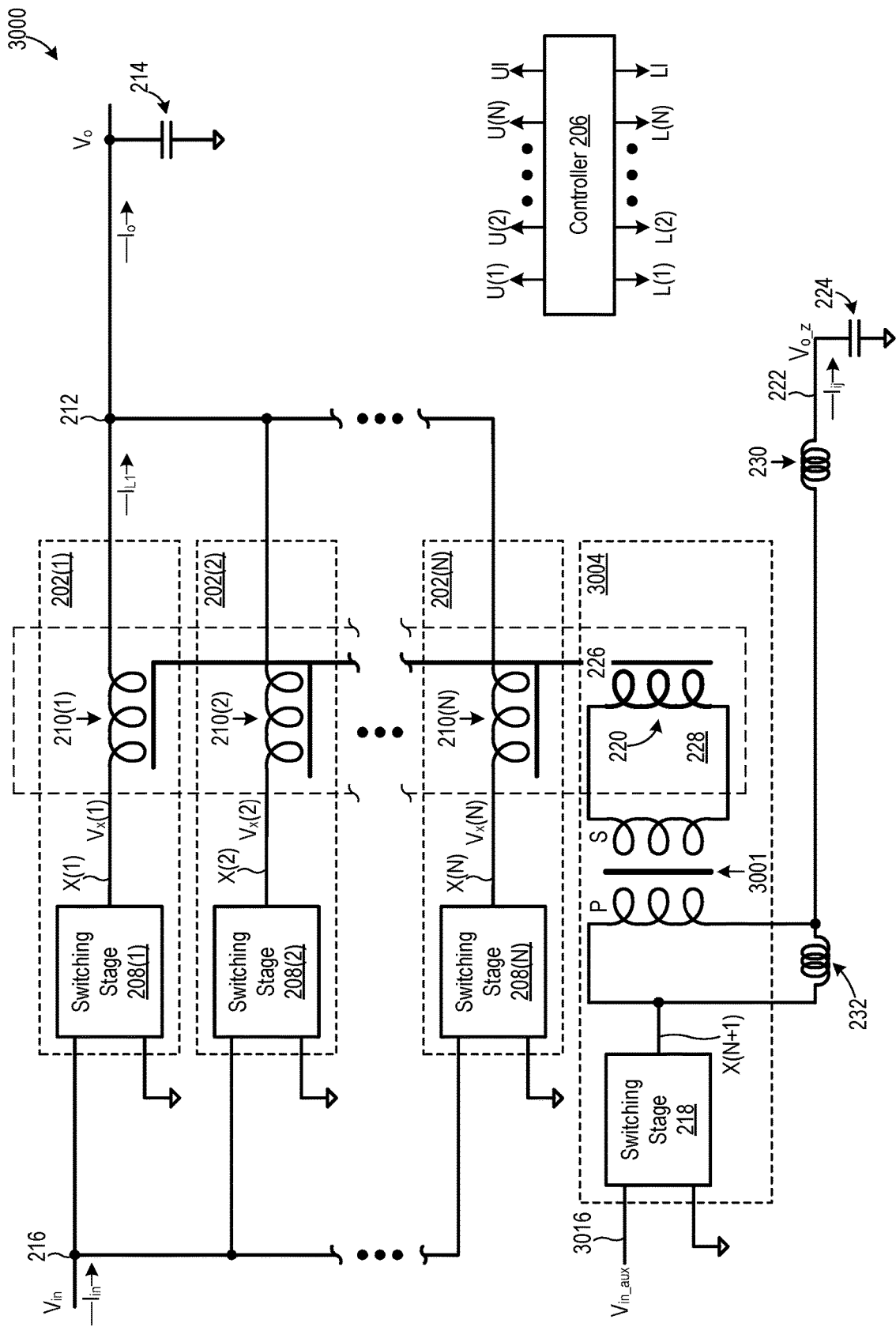
FIG. 30 is a schematic diagram of an alternate embodiment of the FIG. 2 switching power converter including an injection stage with a transformer.

The switching power converters disclosed herein could also be configured to compensate for an injection stage operating a different input voltage than power stages through use of a transformer in an injection stage. For example, FIG. 30 is a schematic diagram of a switching power converter 3000, which is an alternate embodiment of switching power converter 200 where injection stage 204 is replaced with an injection stage 3004 including a transformer 3001 along with an instance of injection switching stage 218 and boost winding 220. Transformer 3001 includes a primary winding P and a secondary winding S. The primary winding P is electrically coupled in series between switching node X(N+1) and injection output node 222, and the secondary winding S is electrically coupled in parallel with boost winding 220. Switching stage 218 is configured to repeatedly switch switching node X(N+1) between an input power node 3016 and ground in response to control signals UI and LI. Input power node 3016 has a voltage $V_{in\_aux}$, and use of transformer 3001 enables voltage $V_{in\_aux}$ to be different than voltage $V_{in}$ of input power node 216 even when boosted coupled inductor 228 is symmetric. In particular, a turns ratio of transformer 3001 can be selected based on magnitude of voltage $V_{in\_aux}$ such that boost winding 220 is switched between the same voltages as each power transfer winding 210, thereby enabling voltage $V_{in\_aux}$ to be different than voltage $V_{in}$ even when boosted coupled inductor is symmetric.

Figure 31:
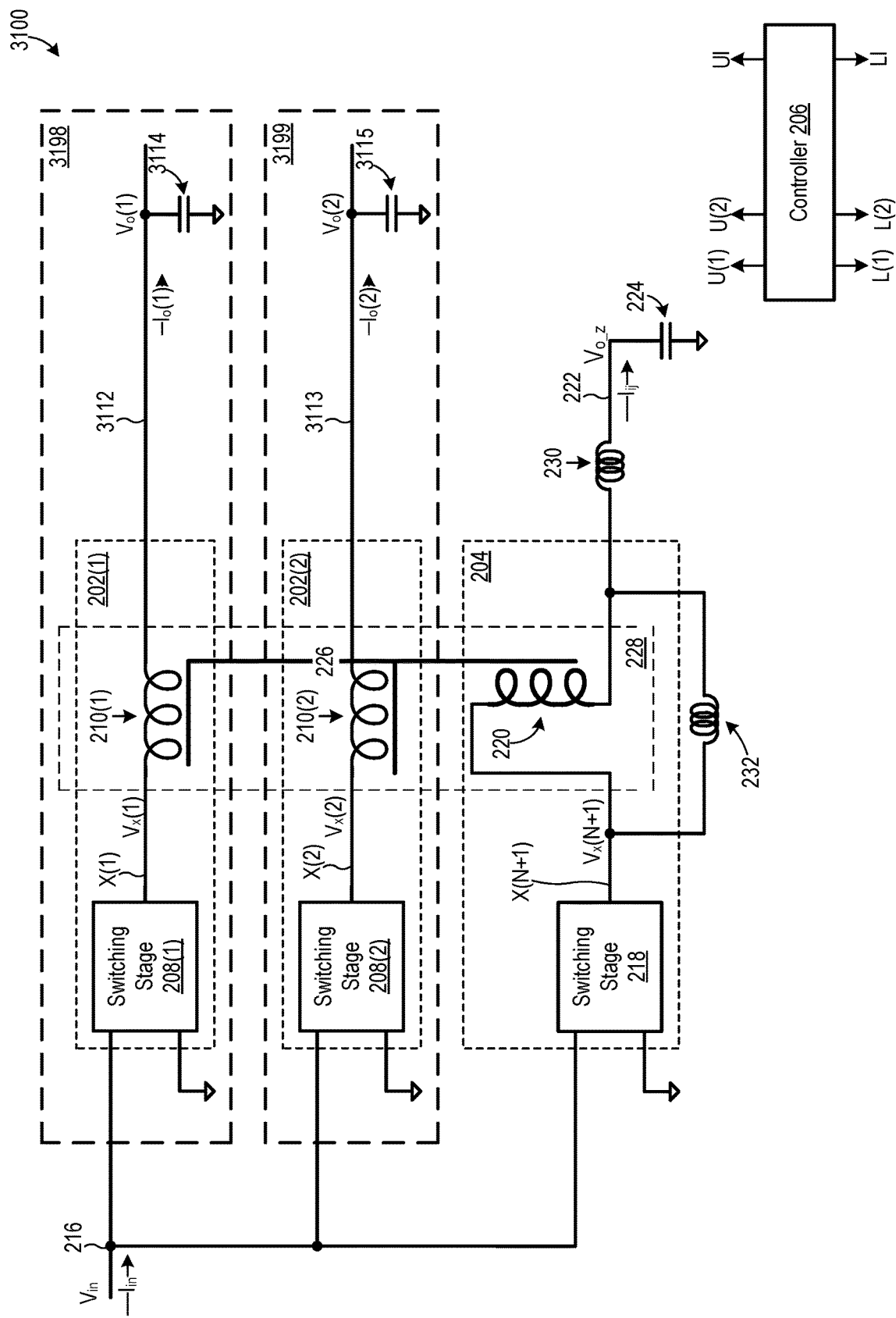
FIG. 31 is a schematic diagram of an alternate embodiment of the FIG. 2 switching power converter including two power sub-converters.

Any of the switching power converters disclosed herein could be modified so that at least two of the power stages are part of different respective power sub-converters. For example, FIG. 31 is a schematic diagram of a switching power converter 3100, which is an alternate embodiment of switching power converter 200 where N is equal to two and the switching power converter includes two power sub-converters 3198 and 3199. Power stage 202(1) is part of power sub-converter 3198, and this power stage is electrically coupled between input power node 216 and an output power node 3112 of power sub-converter 3198. Output power node 3112 is at a voltage $V_o(1)$, and one or more capacitors 3114 are optionally electrically coupled to output power node 3112. Power stage 202(2) is part of power sub-converter 3199, and the power stage is electrically coupled between input power node 216 and an output power node 3113 of power sub-converter 3199. Output power node 3113 is at a voltage $V_o(2)$ and one or more capacitors 3115 are optionally electrically coupled to output power node 3113. Voltages $V_o(1)$ and $V_o(2)$ need not be the same. Switching power converter 3100 could be modified so that one or more of power sub-converters 3198 and 3199 include a plurality of power stages 202, such as a plurality of power stages electrically coupled in parallel. Additionally, each power sub-converter 3198 and 3199 need not include the same quantity of power stages 202. Furthermore, two or more power sub-converters could be daisy chained, i.e., an output of one power sub-converter could be an input of another power sub-converter. The power sub-converters could also be of a different type, for example a buck power sub-converter could be coupled with a boost power sub-converter, etc. Furthermore, switching power converter 3100 could be modified to include additional switching power sub-converters.

Figure 32:
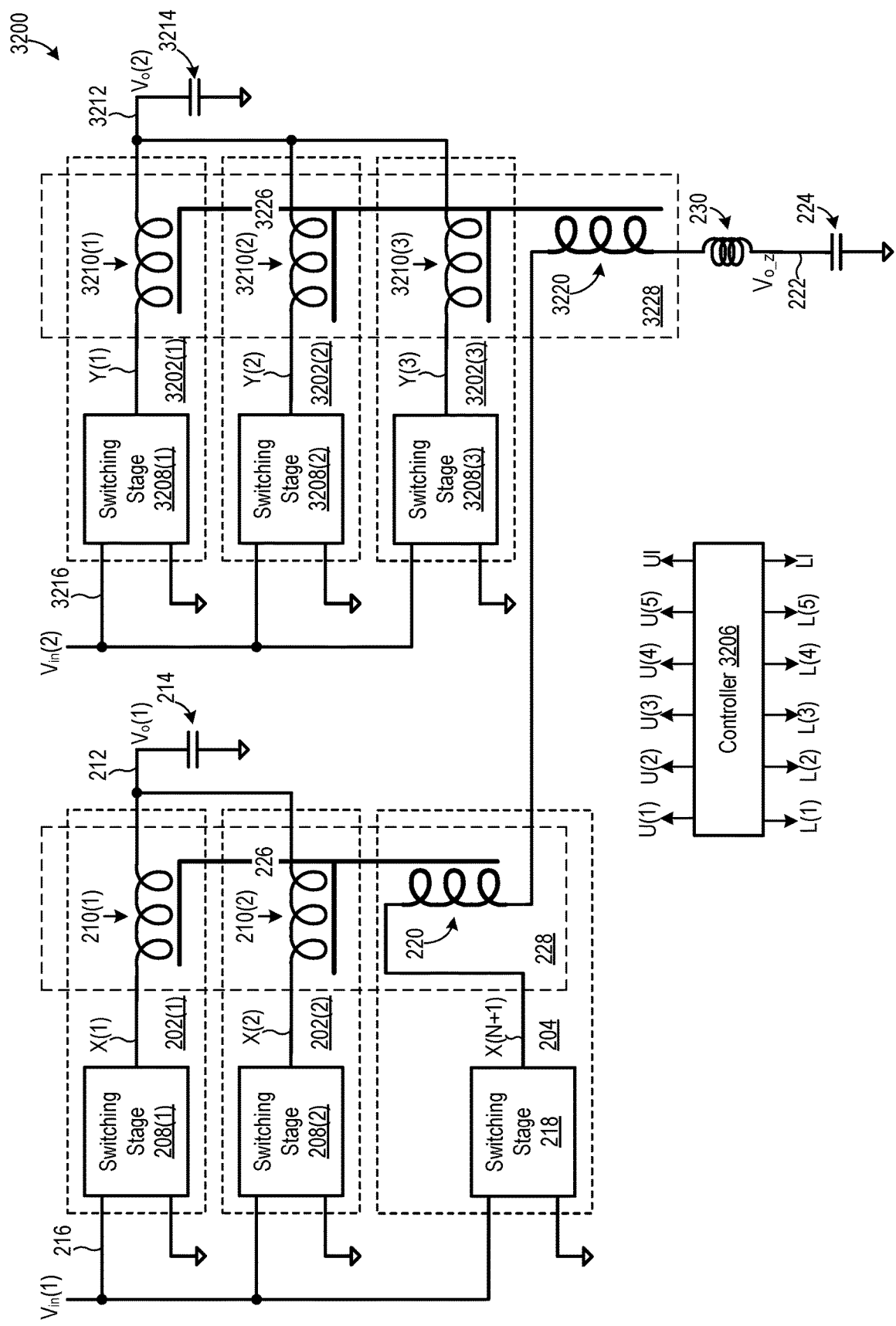
FIG. 32 is a schematic diagram of an alternate embodiment of the FIG. 2 switching power converter including two boosted coupled inductors.

Any of the switching power converters disclosed herein could be modified so that a single injection switching stage drives two or more boost windings. For example, FIG. 32 is a schematic diagram of a switching power converter 3200, which is an alternate embodiment of switching power converter 200 where coupled inductor 228 includes two power transfer windings 210 (and boost winding 220), and the switching power converter further includes a plurality of power stages 3202 that are partially implemented by a second boosted coupled inductor 3228.

Each power stage 3202 includes a power switching stage 3208 electrically coupled to a power transfer winding 3210 at a switching node Y. Each power transfer winding 3210 is electrically coupled between the switching node Y of its respective power stage 3202 and a common output node 3212. For example, power transfer winding 3210(1) is electrically coupled between switching node Y(1) and output node 3212, and power transfer winding 3210(2) is electrically coupled between switching node Y(2) and output node 3212. Output node 3212 has a voltage $V_o(2)$.

Power switching stages 3208 are analogous to power switching stages 208. Accordingly, each power switching stage 3208 is configured to repeatedly switch the switching node Y of its power stage 3202 between an input power node 3216 and ground, in response to control signals U and L generated by controller 206. Specifically, power switching stage 3208(1) is configured to repeatedly switch node Y(1) between input power node 3216 and ground in response to control signals U(3) and L(3), power switching stage 3208(2) is configured to repeatedly switch node Y(2) between input power node 3216 and ground in response to control signals U(4) and L(4), and power switching stage 3208(3) is configured to repeatedly switch node Y(3) between input power node 3216 and ground in response to control signals U(5) and L(5).

Power transfer windings 3210 are magnetically coupled by a magnetic core 3226. Boost winding 3220 is magnetically coupled to a leakage component (not illustrated in FIG. 32) of each power transfer winding 3210 by magnetic core 3226. Importantly, boost winding 3220 is configured such that (a) boost winding 3220 forms one or more turns around respective leakage magnetic flux paths of each power transfer winding 3210, and (b) net mutual magnetic flux within the one or more turns of boost winding 3220 is essentially zero during steady state operation of switching power converter 3200. Power transfer windings 3210, boost winding 3220, and magnetic core 3226 are part of a boosted coupled inductor 3228, which is analogous to boosted coupled inductor 228. Accordingly, some embodiments of boosted coupled inductor are implemented in a manner similar to that of boosted coupled inductor 400, 1200, 1400, 1500, 1700, or 2000 (discussed above).

Each of boost winding 220 and boost winding 3220 is electrically coupled in series between switching node X(N+1) and injection output node 222. Accordingly, injection switching stage 218 drives both of boost windings 220 and 3220. The topological location of first tuning inductor 230 may vary as long as it is electrically coupled in series with boost windings 220 and 3220. For example, in an alternate embodiment, first tuning inductor 230 is electrically coupled between boost winding 220 and boost winding 3220. Switching power converter 3200 optionally furthers include a second tuning inductor (not shown) electrically coupled in parallel with boost winding 220 and/or a third tuning inductor (not shown) electrically coupled in parallel with boost winding 3220.

Switching power converter 3200 includes a controller 3206 in place of controller 206. Controller 3206 is analogous to controller 206 except that controller 3206 is configured to generate signals for controlling power switching stages 3208 as well as signals for controlling power switching stages 208 and injection switching stage 218. For example, controller 3206 is configured to generate control signals U and L to control duty cycle of both power stages 202 and power stages 3202, e.g., to regulate magnitude of output voltages $V_o(1)$ and $V_o(2)$, respectively. In some embodiments, controller 3206 is configured to generate control signals U and L such that power stages 3202 may operate at a different duty cycle than power stages 202, such as to achieve a magnitude of output voltage $V_o(2)$ that is different from a magnitude of output voltage $V_o(1)$. Additionally, controller 3206 is further configured to generate control signals UI and LI to control injection stage 204 such that the injection stage injects magnetic flux in magnetic cores 226 and 3226 in a manner which (a) reduces voltage across leakage inductances of power transfer winding 210 and (b) reduces voltage across leakage inductances of power transfer winding 3210, such as in a manner similar to that discussed above with respect to FIGS. 25, 26A-26D, and 27A-27D. Such reduction in voltage across leakage inductance of power transfer windings 210 and 3210 advantageously reduces, or even essentially eliminates, magnitude of ripple current associated with charging and discharging of the leakage inductance, thereby reducing magnitude of current flowing through power transfer windings.

Different operating conditions of the different linked converters in FIG. 31 and FIG. 32 may lead to a more complicated and irregular current waveforms, so the proposed injection technique may lead to a smaller decrease in current ripple as compared to a case with a single multiphase converter where all the phases are identical and operate in the same conditions.

The example switching power converters discussed above have a multi-phase buck-type topology. However, the new switching power converters including boosted coupled inductors and injection stages are not limited to a buck-type topology but instead could have many alternate topologies. Two such alternative topologies are discussed below with respect to FIGS. 33 and 35, although it is understood that the switching power converters discussed above could have other alternative topologies.

Figure 33:
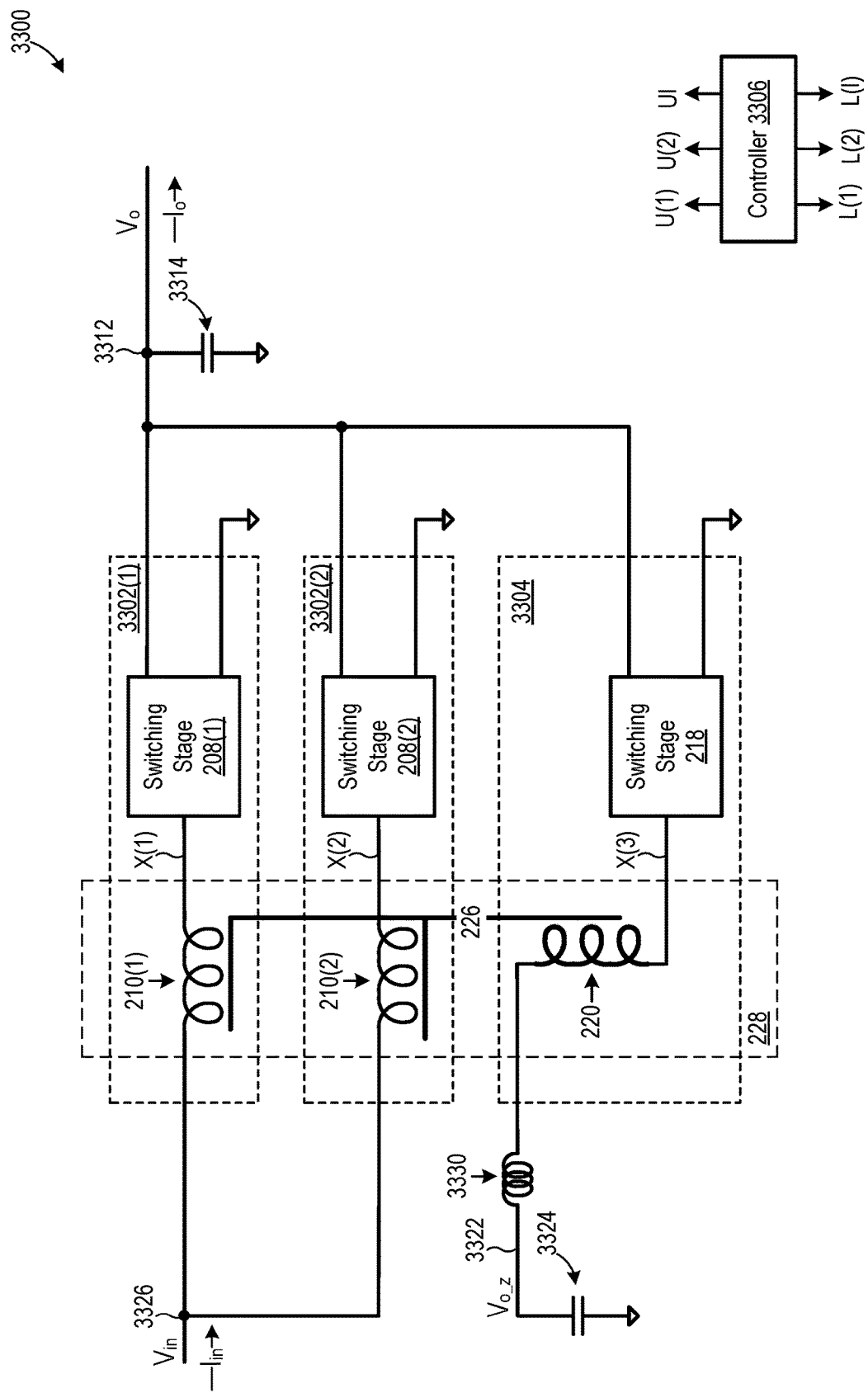
FIG. 33 is a schematic diagram of an alternate embodiment of the FIG. 2 switching power converter having a multi-phase boost type topology.

FIG. 33 is a schematic diagram of a switching power converter 3300 which is an alternate embodiment of switching power converter 200 having a multi-phase boost-type topology, where N is equal to two. Power stages 202 of switching power converter 200 are replaced with power stages 3302 in switching power converter 3300. Power stages 3302 include the same constituent elements as power stages 202, but with the elements configured in a different topology. Specifically, each power transfer winding 210 is electrically coupled between an input power node 3326 and a switching node X of the respective power stage 3302. The upper and lower switching devices of each power switching stage 208, e.g., switching devices 306 and 308 of FIG. 3, are electrically coupled in series between an output power node 3312 and ground. Accordingly, each power switching stage 208 is configured to repeatedly switch its respective switching node X between a voltage $V_o$ of output power node 3312 and ground. A given power transfer winding 210 in converter 3300 is driven high when its respective switching node X is at voltage $V_o$, and the power transfer winding 210 is driven low when its respective switching node X is at zero volts relative to ground. For example, power transfer winding 210(1) is driven high when switching node X(1) is at voltage $V_o$, and power transfer winding 210(1) is driven low when switching node X(1) is at zero volts relative to ground, in switching power converter 3300. One or more capacitors 3314 are optionally electrically coupled to output power node 3312.

Injection stage 204 of switching power converter 200 is replaced with an injection stage 3304 in switching power converter 3300. Injection stage 3304 includes the same constituent elements as injection stage 204 but with a different topology. Boost winding 220 is electrically coupled between injection switching node X(3) and an injection output node 3322, and a capacitor 3324 is electrically coupled to injection output node 3322. A first tuning inductor 3330 is electrically coupled in series with boost winding 220, and a second tuning inductor (not shown) is optionally electrically coupled in parallel with boost winding 220. The upper and lower switching devices of injection switching stage 218, e.g., switching devices 310 and 312 of FIG. 3, are electrically coupled in series between output power node 3312 and ground. Accordingly, injection switching stage 218 is configured to repeatedly switch switching node X(3) between voltage $V_o$ and ground. Boost winding 220 in converter 3300 is driven high when switching node X(3) is at voltage $V_o$, and the boost winding is driven low when switching node X(3) is at zero volts relative to ground.

Controller 3306, which is an embodiment of controller 206, is configured to generate control signals U and L to control duty cycle of power stages 3302 to regulate at least one parameter of switching power converter 3300. Examples of possible regulated parameters include, but are not limited, magnitude of input voltage $V_{in}$, magnitude of input current $I_{in}$, magnitude of output voltage $V_o$, and magnitude of output current $I_o$. Controller 3306 is optionally configured to generate control signals U and L such that power stages 3302 switch out-of-phase with each other. Controller 3306 is further configured to generate control signals UI and LI to control injection stage 3304 such that the injection stage injects magnetic flux in magnetic core 226 in a manner which reduces voltage across leakage inductance of power transfer winding 210, such as by driving boost winding high 220 each time a power transfer winding 210 is driven high and by driving boost winding 220 low each time a power transfer winding 210 is driven low.

Figure 34A:
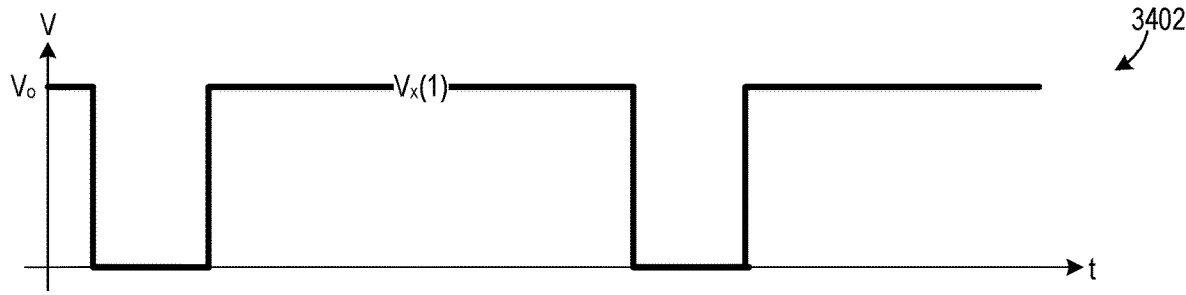
FIGS. 34A-34D are graphs collectively illustrating one example of operation of the FIG. 33 switching power converter.
Figure 34B:
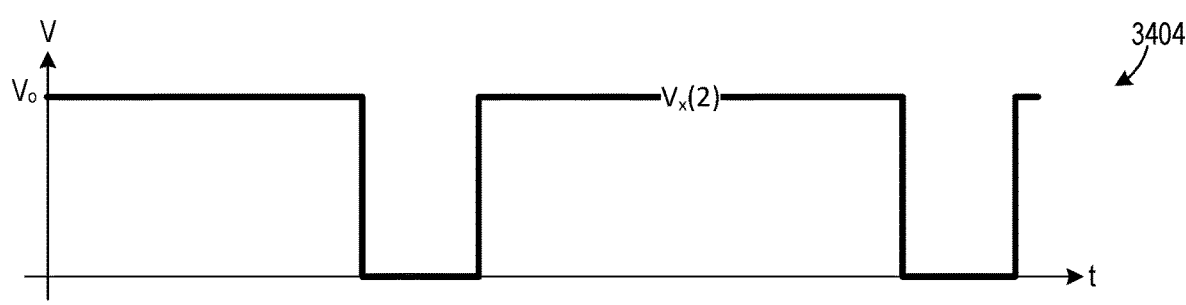
Figure 34C:
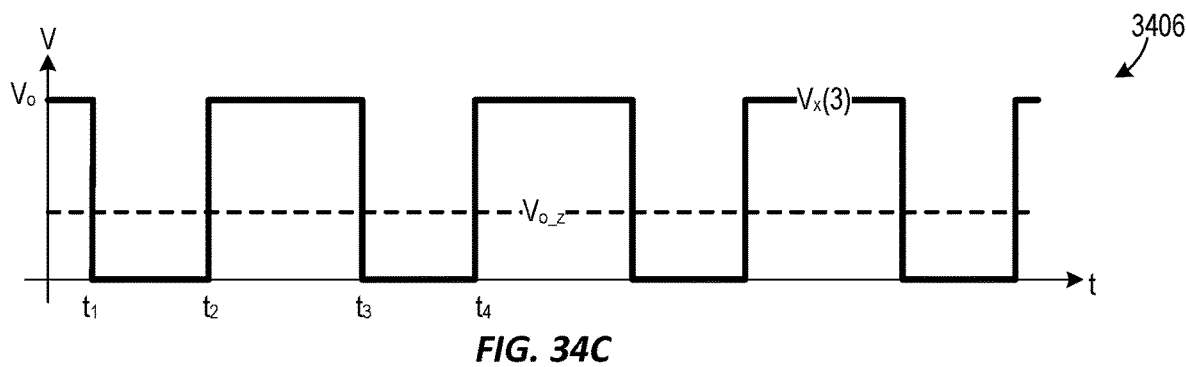
Figure 34D:
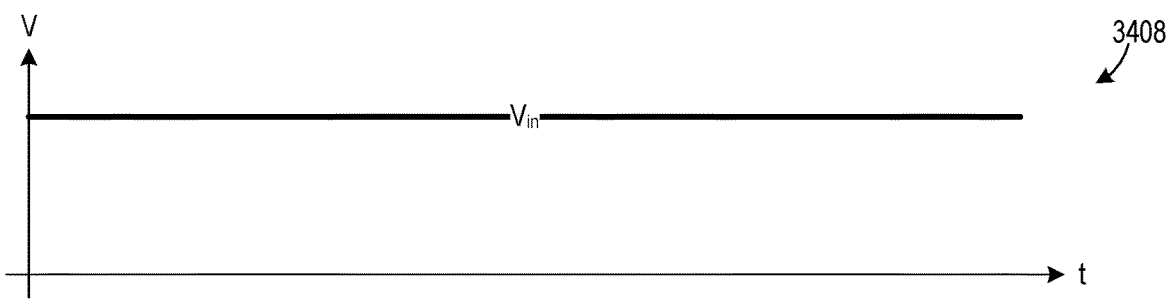

FIGS. 34A-34D are graphs collectively illustrating one example of operation of an embodiment of switching power converter 3300. Graph 3402 is a graph of switching node voltage $V_x(1)$ versus time, and graph 3404 is a graph of switching node voltage $V_x(2)$ versus time. As illustrated in FIGS. 34A and 34B, each switching node X(1) and X(2) is repeatedly driven high and low between $V_o$ and zero volts, respectively, and the switching nodes are driven high and low out-of-phase with each other. FIG. 34C is a graph 3406 including a curve representing voltage at the injection switching node X(N+1), which is node X(3) because N is equal to two in this example. FIG. 34C also includes a curve representing voltage $V_{o\_z}$ at injection output node 3322. FIG. 34D is a graph 3408 of output voltage $V_o$.

In the example of FIGS. 34A-34D, controller 3306 controls injection stage 3304 so that injection stage 3304 switches in unison with power stages 3302. Specifically, boost winding 220 is driven high in response to any power transfer winding 210 being driven high, and boost winding 220 is driven low in response to any power transfer winding 210 being driven low, as illustrated in FIGS. 34A-34C. For example, boost winding 220 is driven low at time $t_1$ in response to power transfer winding 210(1) being driven low, and boost winding 220 is driven high at time $t_2$ in response to power transfer winding 210(2) being driven high. As another example, boost winding 220 is driven low at time $t_3$ in response to power transfer winding 210(2) being driven low, and boost winding 220 is driven high at time $t_4$ in response to power transfer winding 210(2) being driven high. Consequently, voltages on both sides of each inductor 2508 (FIG. 25) are largely identical. Therefore, voltages $V_a$ across inductors 2508 remain at a small value even as power transfer windings 210 are repeatedly driven between high and low states to regulate one or more parameters of switching power converter 3300. As a result, there is relatively little ripple current associated with leakage inductance of boosted coupled inductor 228, irrespective of operating duty cycle of switching power converter 3300.

The example of FIGS. 34A-34D assumes essentially ideal magnetic coupling of the windings of boosted coupled inductor 228, i.e., that the magnetizing inductance value is much greater than any leakage inductance value. Such assumption may not hold true in practical implementations, and voltages $V_a$ will therefore not necessarily be small in practical implementations. Nevertheless, injection stage 3304 may significantly reduce voltages $V_a$, such that injection stage 3304 may significantly reduce ripple current magnitude, even if non-ideal coupling of coupled inductor 228 prevents injection stage 3304 from completely eliminating ripple current associated with leakage inductance of boosted coupled inductor 228. Additionally, FIGS. 34A-34D assume ideal timing, i.e., that injection stage 3304 switches in synchronicity with power stages 3302. While such synchronicity may be desired, it is not required for acceptable operation of switching power converter 3300.

Figure 35:
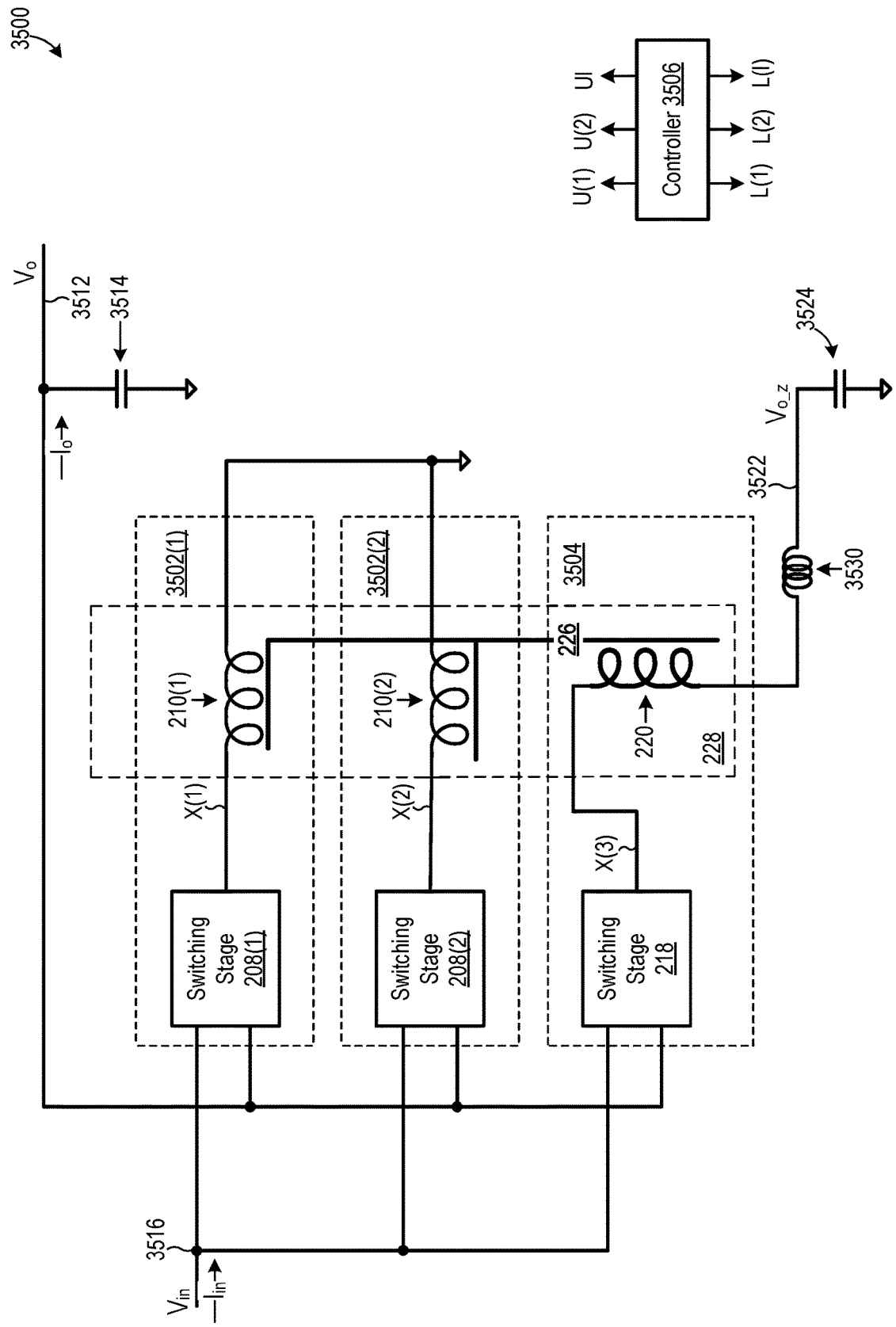
FIG. 35 is a schematic diagram of an alternate embodiment of the FIG. 2 switching power converter having a multi-phase buck-boost type topology.

FIG. 35 is a schematic diagram of a switching power converter 3500, which is an alternate embodiment of switching power converter 200 having a multi-phase buck-boost-type topology, where N is equal to two. Power stages 202 of switching power converter 200 are replaced with power stages 3502 in switching power converter 3500. Power stages 3502 include the same constituent elements as power stages 202, but with the elements configured in a different topology. Specifically, each power transfer winding 210 is electrically coupled between ground and a switching node X of the respective power stage 3502. The upper and lower switching devices of each power switching stage 208, e.g., switching devices 306 and 308 of FIG. 3, are electrically coupled in series between an input power node 3516 and an output power node 3512. Accordingly, each power switching stage 208 is configured to repeatedly switch its respective switching node X between a voltage $V_{in}$ of input power node 3516 a voltage $V_o$ of output power node 3512. A given power transfer winding 210 in switching power converter 3500 is driven high when its respective switching node X is at voltage $V_{in}$, and the power transfer winding 210 is driven low when its respective switching node X is at voltage $V_o$. For example, power transfer winding 210(1) is driven high when switching node X(1) is at voltage $V_{in}$, and power transfer winding 210(1) is driven low when switching node X(1) is at voltage $V_o$, in switching power converter 3500. One or more capacitors 3514 are optionally electrically coupled to output power node 3512.

Injection stage 204 of switching power converter 200 is replaced with an injection stage 3504 in switching power converter 3500. Injection stage 3504 includes the same constituent elements as injection stage 204 but with a different topology. Boost winding 220 is electrically coupled between injection switching node X(3) and an injection output node 3522, and a capacitor 3524 is electrically coupled to injection output node 3522. A first tuning inductor 3530 is electrically coupled in series with boost winding 220, and a second tuning inductor (not shown) is optionally electrically coupled in parallel with boost winding 220. The upper and lower switching devices of injection switching stage 218, e.g., switching devices 310 and 312 of FIG. 3, are electrically coupled in series between input power node 3516 and output power node 3512. Accordingly, injection switching stage 218 is configured to repeatedly switch switching node X(3) between voltage $V_{in}$ and $V_o$. Boost winding 220 in switching power converter 3500 is driven high when switching node X(3) is at voltage $V_{in}$, and the boost winding is driven low when switching node X(3) is at voltage $V_o$.

Controller 3506, which is another embodiment of controller 206, is configured to generate control signals U and L to control duty cycle of power stages 3502 to regulate at least one parameter of switching power converter 3500. Examples of possible regulated parameters include, but are not limited, magnitude of input voltage $V_{in}$, magnitude of input current $I_{in}$, magnitude of output voltage $V_o$, and magnitude of output current $I_o$. Controller 3506 is optionally configured to generate control signals U and L such that power stages 3502 switch out-of-phase with each other. Controller 3506 is further configured to generate control signals UI and LI to control injection stage 3504 such that the injection stage injects magnetic flux in magnetic core 226 in a manner which reduces voltage across leakage inductance of power transfer windings 210, such as by driving boost winding high 220 each time a power transfer winding 210 is driven high and by driving boost winding 220 low each time a power transfer winding 210 is driven low.

Figure 36A:
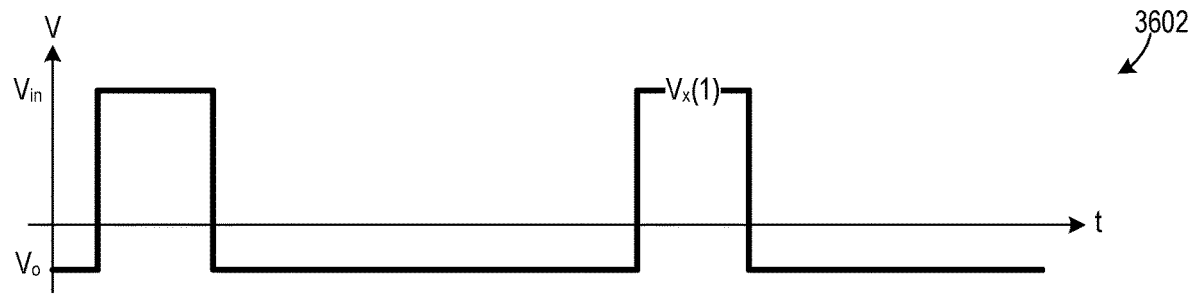
FIGS. 36A-36D are graphs collectively illustrating one example of operation of the FIG. 35 switching power converter.
Figure 36B:
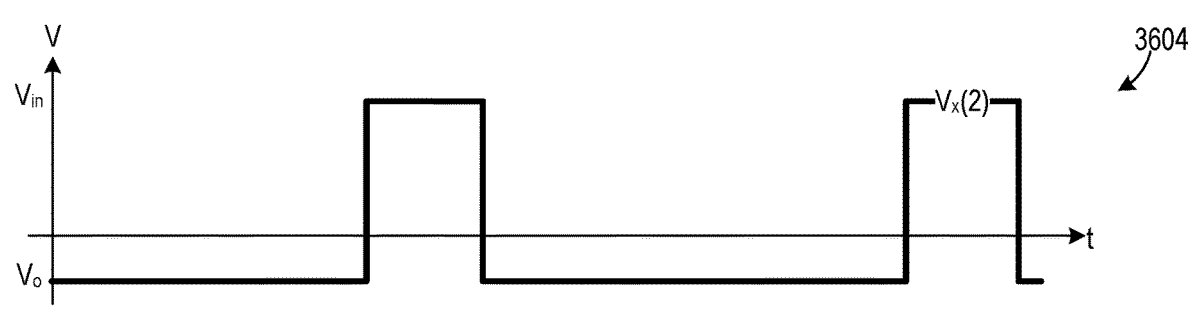
Figure 36C:
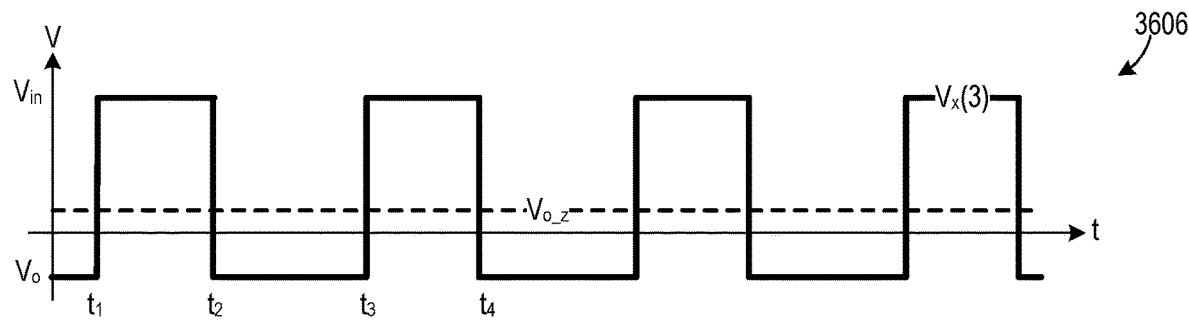
Figure 36D:
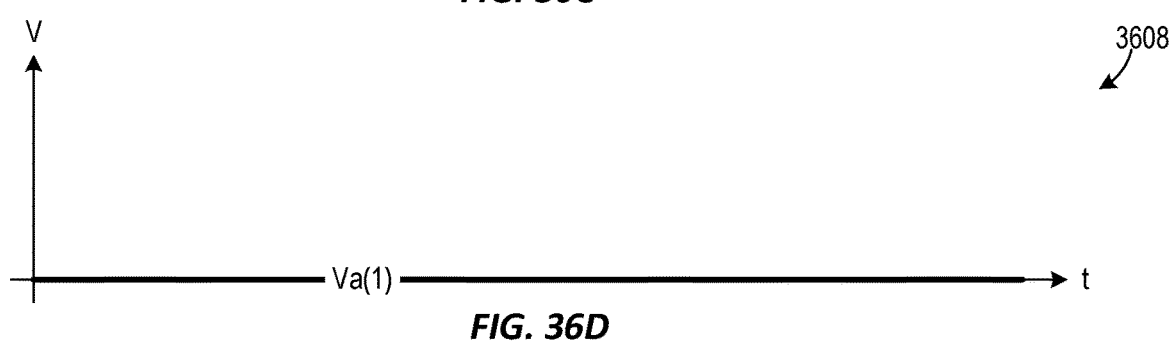

FIGS. 36A-36D are graphs collectively illustrating one example of operation of an embodiment of switching power converter 3500. Graphs 36A-36D assume that the magnetizing inductance value of boosted coupled inductor 228 is much greater than any leakage inductance value of boosted coupled inductor 228. Graph 3602 is a graph of switching node voltage $V_x(1)$ versus time, and graph 3604 is a graph of switching node voltage $V_x(2)$ versus time. As illustrated in FIGS. 36A and 36B, each switching node X(1) and X(2) is repeatedly driven high and low between $V_{in}$ and $V_o$, respectively, and the switching nodes are driven high and low out-of-phase with each other. FIG. 36C is a graph 3606 including a curve representing voltage at the injection switching node X(N+1), which is node X(3) because N is equal to two in this example. FIG. 36C also includes a curve representing voltage $V_{o\_z}$ at injection output node 3522. FIG. 36D is a graph 3608 of voltages $V_a(1)$ across inductor 2508(1).

In the example of FIGS. 36A-36D, controller 3506 controls injection stage 3504 so that injection stage 3504 switches in unison with power stages 3502. Specifically, boost winding 220 is driven high in response to any power transfer winding 210 being driven high, and boost winding 220 is driven low in response to any power transfer winding 210 being driven low, as illustrated in FIGS. 36A-36C. For example, boost winding 220 is driven high at time $t_1$ in response to power transfer winding 210(1) being driven high, and boost winding 220 is driven low at time $t_2$ in response to power transfer winding 210(1) being driven low. As another example, boost winding 220 is driven high at time $t_3$ in response to power transfer winding 210(2) being driven high, and boost winding 220 is driven low at time $t_4$ in response to power transfer winding 210(2) being driven low. Consequently, voltages on both sides of each inductor 2508 (FIG. 25) are largely identical. Therefore, voltages $V_a$ across inductors 2508 remain at a small value, e.g., essentially zero, even as power transfer windings 210 are repeatedly driven between high and low states to regulate one or more parameters of switching power converter 3500. As a result, there is relatively little ripple current associated with leakage inductance of boosted coupled inductor 228, irrespective of operating duty cycle of switching power converter 3500.

The example of FIGS. 36A-36D assumes essentially ideal magnetic coupling of the windings of boosted coupled inductor 228, i.e., that the magnetizing inductance value is much greater than any leakage inductance value. Such assumption may not hold true in practical implementations, and voltages $V_a$ will therefore not necessarily be zero in practical implementations. Nevertheless, injection stage 204 may significantly reduce voltages $V_a$, such that injection stage 204 may significantly reduce ripple current magnitude, even if non-ideal coupling of coupled inductor 228 prevents injection stage 3504 from completely eliminating ripple current associated with leakage inductance of boosted coupled inductor 228. Additionally, FIGS. 36A-36D assume ideal timing, i.e., that injection stage 3504 switches in synchronicity with power stages 3502. While such synchronicity may be desired, it is not required for acceptable operation of switching power converter 3500.

While the injection stages of the new switching power converters achieve significant benefits, they may degrade switching power converter transient response. Accordingly, some embodiments of controllers 206, 3306, and 3506 are configured to disable the injection stage of their respective switching power converter in response to a signal indicating the switching power converter is experiencing a transient event, such as a significant change in load or a significant change in input voltage. In some embodiments, controllers 206, 3306, and 3506 internally generate the signal indicating the power converter is experiencing a transient event, and in some other embodiments, controllers 206, 3306, and 3506 receive such signal from an external source. Alternately, some embodiments of controllers 206, 3306, and 3506 are configured to change timing of the injection stage of their respective switching power converter in response to a signal indicating the switching power converter is experiencing a transient event, such as to help the converter quickly respond to the transient event.

Figure 25:
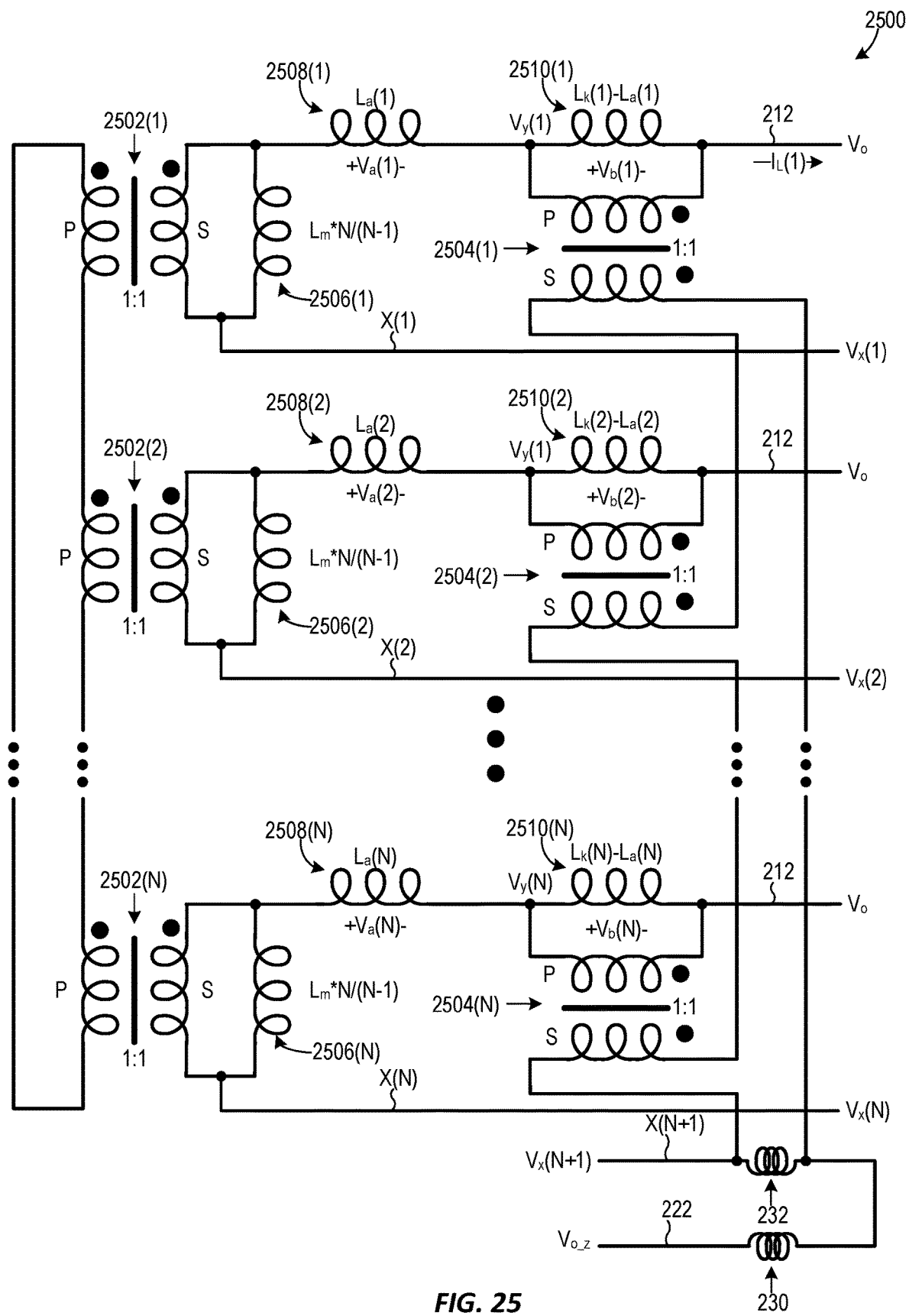
FIG. 25 is an approximate electric model of the boosted coupled inductor of the FIG. 2 switching power converter.
Figure 37:
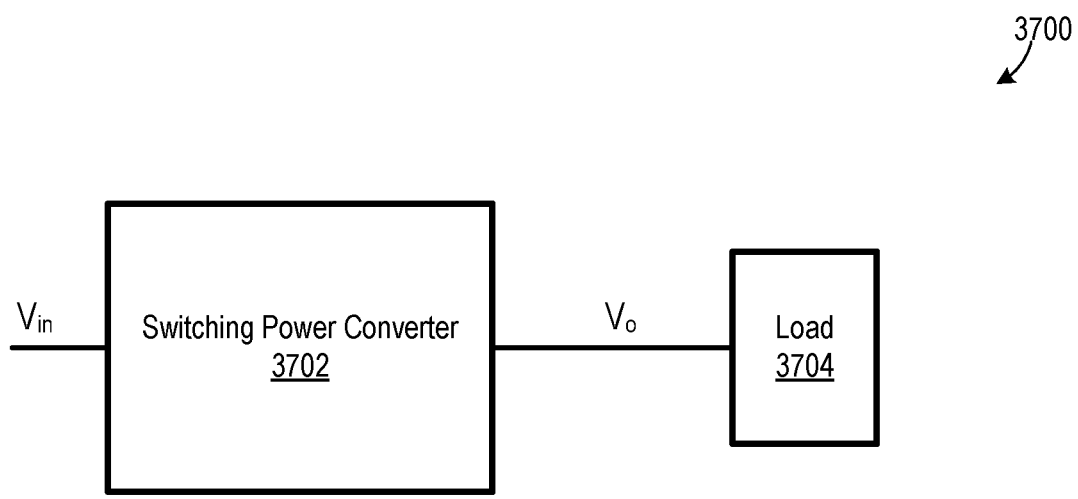
FIG. 37 is a block diagram of an example application of the switching power converters disclosed herein.

FIG. 37 is a block diagram of an electrical system 3700, which is one possible application of the new switching power converters disclosed herein. System 3700 includes a switching power converter 3702 configured to power a load 3704. Switching power converter 3702 may be any one of the new switching power converters disclosed herein. For example, switching power converter 3702 may be any one of switching power converters 200, 2900, 3000, 3100, 3200, 3300, and 3500. Load 3704 includes, for example, one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit Boosted coupled inductor 228 is not limited to being modeled according to electrical model 2500 (FIG. 25). For example, FIG. 38 includes an electrical model 3800 of boosted coupled inductor 228 connected to injection stage 204, where electrical model 3800 is another approximate electrical model of boosted coupled inductor 228. Model 3800 includes N ideal transformers 3802, an ideal transformer 3804, N inductors 3806, N inductors 3808, an inductor 3810, and an inductor 3812. Primary windings P of ideal transformers 3802 and 3804 are electrically coupled in series, and the secondary winding S of each ideal transformer 3802 is electrically coupled between a respective switching node X and a respective inductor 3808. Additionally, a respective inductor 3806 is electrically coupled in parallel with the secondary winding S of each ideal transformer 3802, and each inductor 3806 has an inductance value equal to $L_m*N/(N-1)$, where $L_m$ is magnetizing inductance of boosted coupled inductor 228. Each inductor 3808 is electrically coupled between the secondary winding S of its respective ideal transformer 3802 and output node 212. Each inductor 3808 has a respective inductance $L_a$, which as discussed above with respect to FIG. 25, represents a portion of total leakage inductance $L_k$ of a respective power transfer winding 210 that is associated with leakage magnetic flux that does not couple to boost winding 220.

The secondary winding S of ideal transformer 3804 is electrically coupled between inductor 3812 and injection output node 222, optionally via first tuning inductor 230. As discussed above, the topological location of first tuning inductor 230 in switching power converter 200 may vary without departing from the scope hereof. Additionally, inductor 3810 is electrically coupled in parallel with the secondary winding S of ideal transformer 3804. Inductor 3810 has an inductance equal to $(L_k-L_a)*N$, where $L_k$ is respective total leakage inductance of each power transfer winding 210, as discussed above. Inductor 3812 is electrically coupled between the secondary winding S of ideal transformer 3804 and switching node X(N+1) of injection stage 204. Inductor 3812 has an inductance $L_{a\_bcl}$, where $L_{a\_bcl}$ represents leakage inductance of boost winding 220, i.e. inductance corresponding to magnetic flux generated by an electric current flowing through boost winding 220 that does not couple to any other winding of boosted coupled inductor 228.

Figure 38:
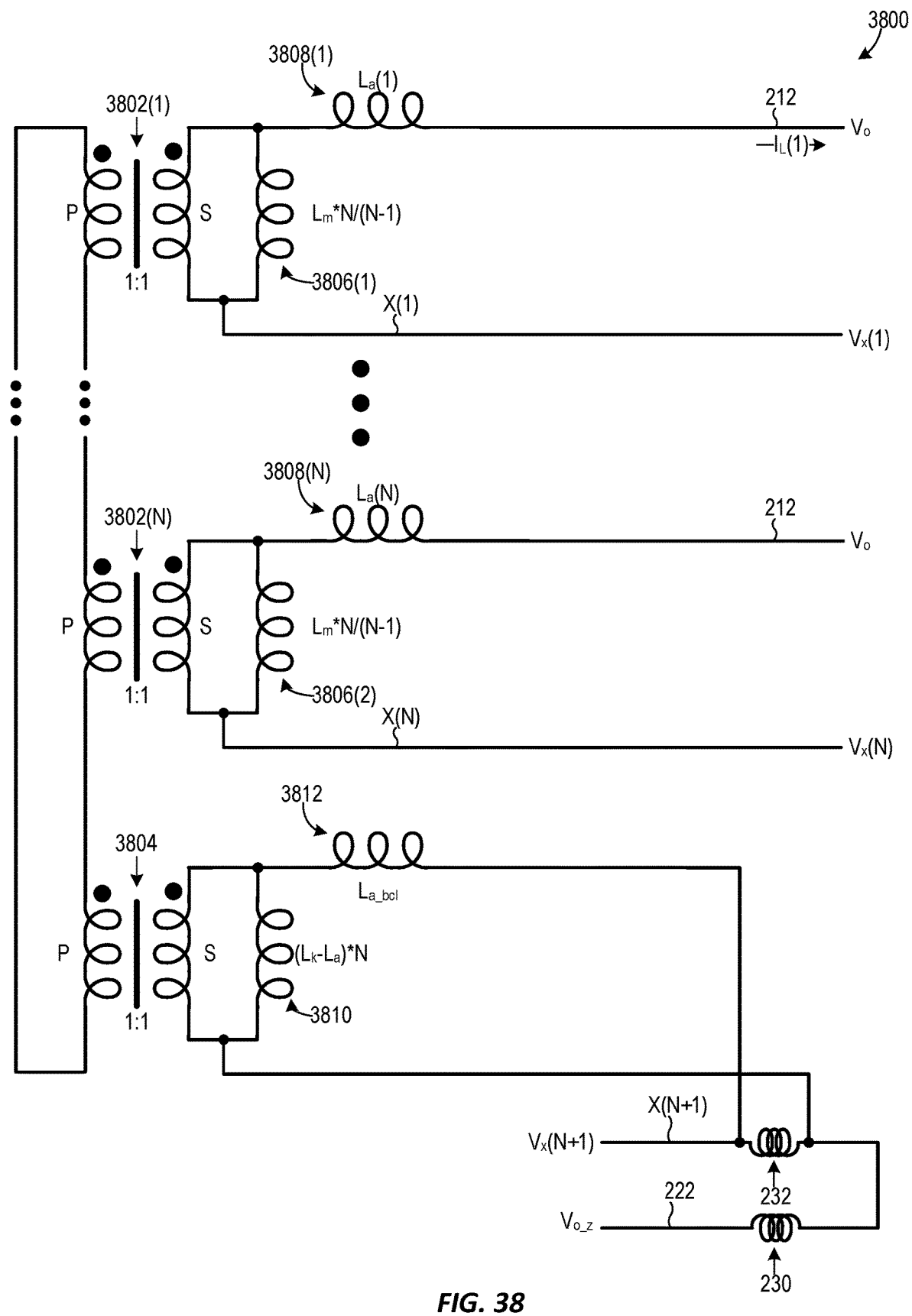
FIG. 38 is another approximate electric model of the boosted coupled inductor of the FIG. 2 switching power converter.
Figure 39A:
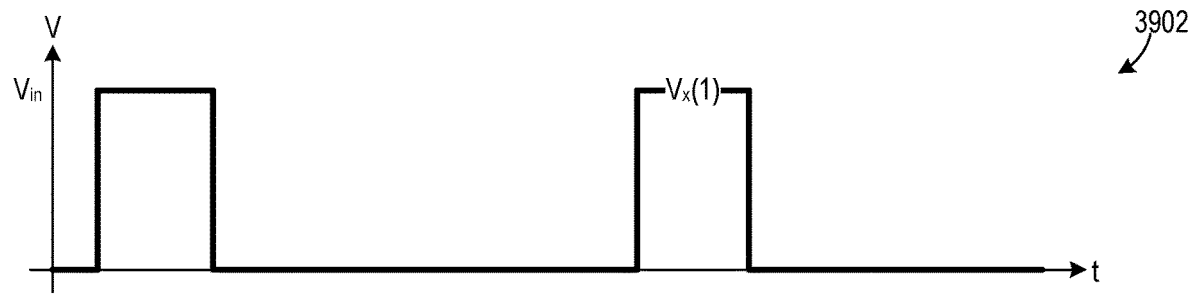
FIGS. 39A-39D are graphs collectively illustrating another example of operation of the FIG. 2 switching power converter.
Figure 39B:
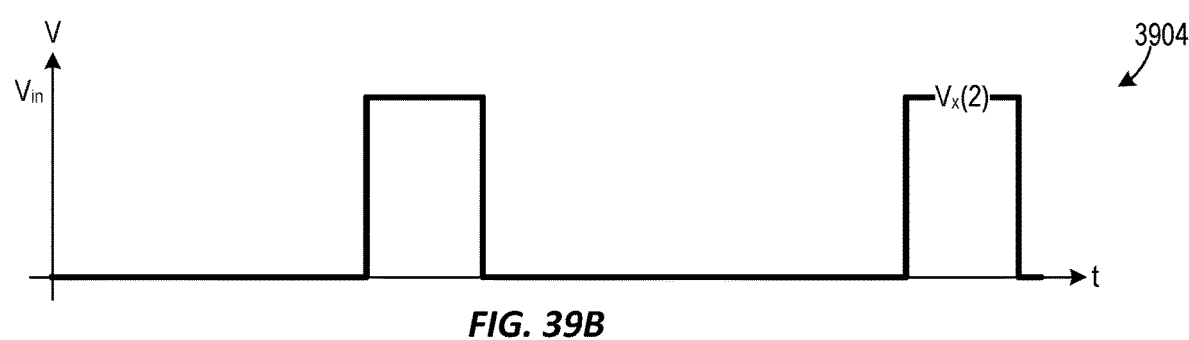
Figure 39C:
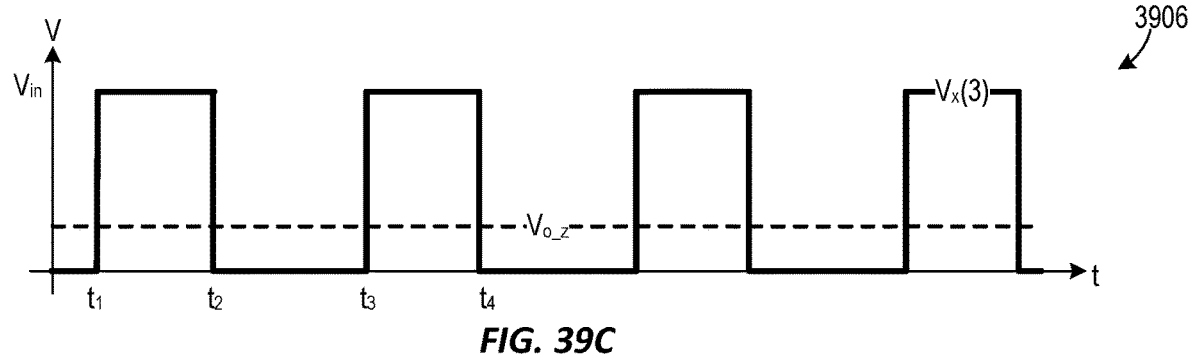
Figure 39D:
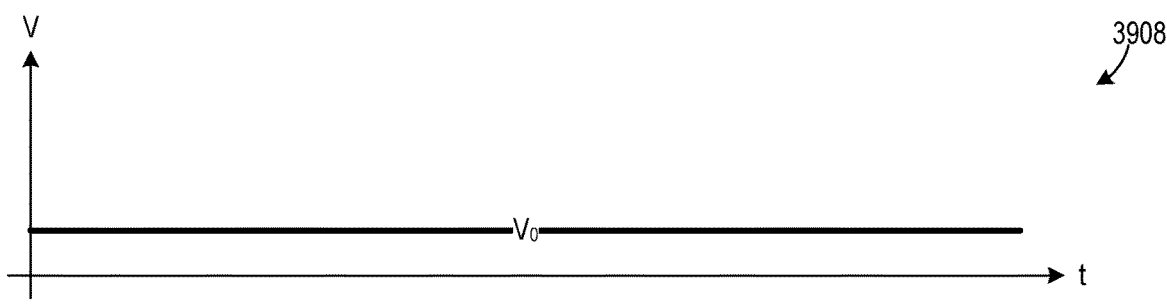

Particular embodiments of controller 206 are configured to generate control signals UI and LI to operate injection stage 204 in a manner that reduces voltage across inductors 3808 of electrical model 3800, thereby helping minimize ripple current associated with leakage inductance of power transfer windings 210, irrespective of operating duty cycle of switching power converter 200, which reduces magnitude of ripple current flowing through power transfer windings 210, as well as magnitude of ripple in output current $I_o$. For example, FIGS. 39A-39D are graphs collectively illustrating one example of operation of an embodiment of switching power converter 200 where N is equal to two, such that switching power converter 200 includes two power stages 202 and one injection stage 204. Graphs 39A-39D assume that boosted coupled inductor 228 is connected to injection stage 204 as illustrated in FIG. 38, and the graphs also assume that the magnetizing inductance value of boosted coupled inductor 228 is much greater than any leakage inductance value of boosted coupled inductor 228. Graph 3902 is a graph of switching node voltage $V_x(1)$ versus time, and graph 3904 is a graph of switching node voltage $V_x(2)$ versus time. As illustrated in FIGS. 39A and 39B, each switching node X(1) and X(2) is repeatedly driven high and low between $V_{in}$ and zero volts, respectively, and the switching nodes are driven high and low out-of-phase with each other. FIG. 39C is a graph 3906 including a curve representing voltage at the injection switching node X(N+1), which is node X(3) because N is equal to two in this example. FIG. 39C also includes a curve representing voltage $V_{o\_z}$ at injection output node 222. FIG. 39D is a graph 3908 of output voltage $V_o$.

In the example of FIGS. 39A-39D, controller 206 controls injection stage 204 so that injection stage 204 switches in unison with power stages 202. Specifically, boost winding 220 is driven high in response to any power transfer winding 210 being driven high, and boost winding 220 is driven low in response to any power transfer winding 210 being driven low, as illustrated in FIGS. 39A-39C. Consequently, voltages on both sides of inductors 3808 are largely identical. Therefore, voltage across each inductor 3808 remains at a small value even as power transfer windings 210 are repeatedly driven between high and low states to regulate one or more parameters of switching power converter 200. As a result, there is relatively little ripple current associated with leakage inductance of boosted coupled inductor 228, irrespective of operating duty cycle of switching power converter 200.

Injection stage 204 polarity could be swapped in any of the switching power converters disclosed herein while still achieving reduction in ripple current associated leakage inductance of power transfer windings 210, with appropriate changes to injection switching stage 218 control. For example, FIG. 40 includes an electrical model 4000 of boosted coupled inductor 228 connected to injection stage 204, where electrical model 4000 is like electrical model 3800 of FIG. 38 but with a different injection stage polarity. In particular, the secondary winding S of ideal transformer 3804 is electrically coupled between inductor 3812 and switching node X(N+1) in electrical model 4000, instead of between inductor 3812 and injection output node 222 as in electrical model 3800. Additionally, inductor 3812 is electrically coupled between the secondary winding S of ideal transformer 3804 and injection output node 222 in electrical model 4000, instead of between inductor 3812 and injection stage switching node X(N+1) as in electrical model 3800. Particular embodiments of controller 206 are configured to generate control signals UI and LI to operate injection stage 204 in a manner that reduces voltages across inductors 3808 in electrical model 4000, thereby helping minimize ripple current associated with leakage inductance of boosted coupled inductor 228, irrespective of operating duty cycle of switching power converter 200.

Figure 40:
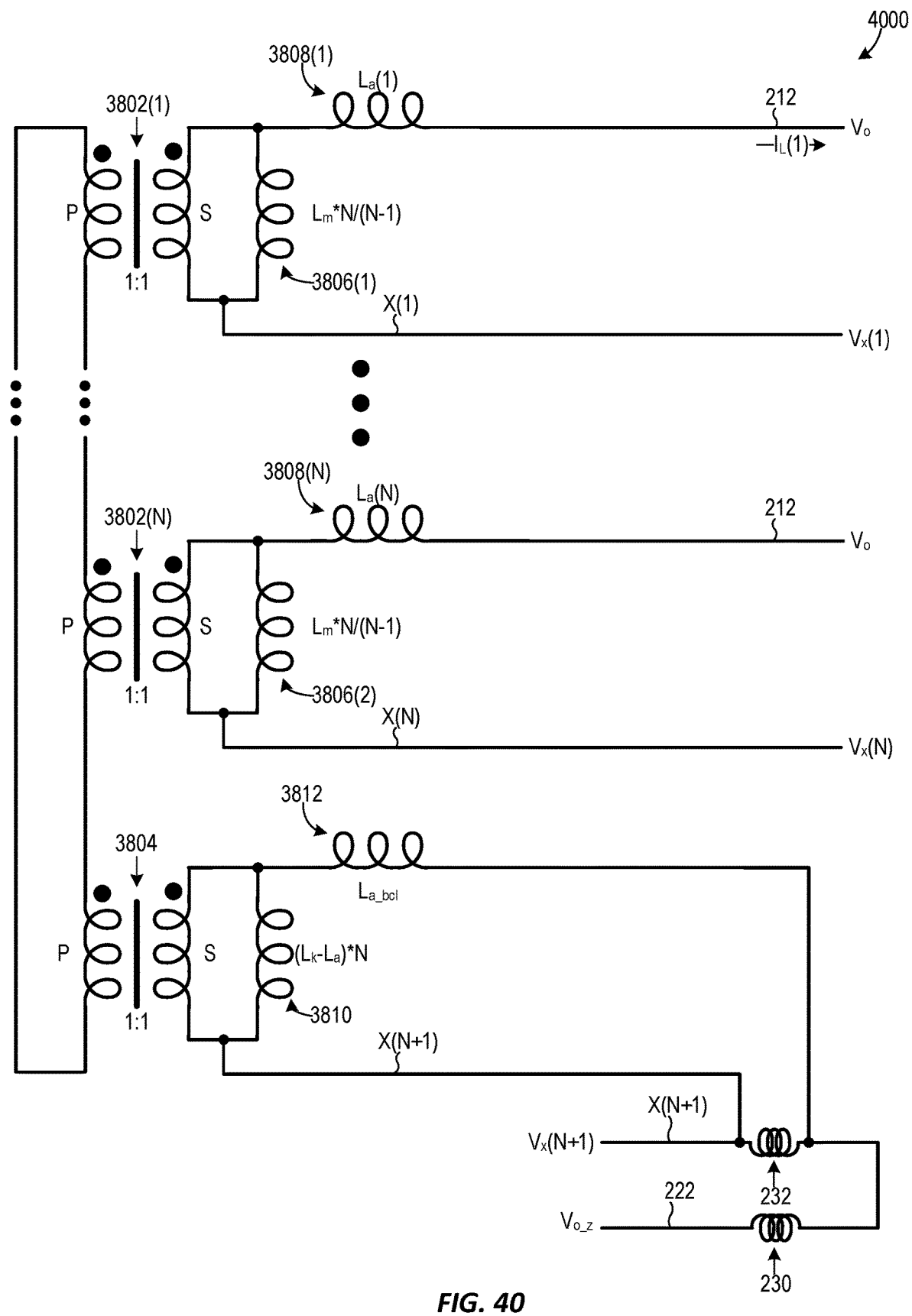
FIG. 40 is additional approximate electric model of the boosted coupled inductor of the FIG. 2 switching power converter, having a different injection stage polarity than the FIG. 38 electrical model.
Figure 41A:
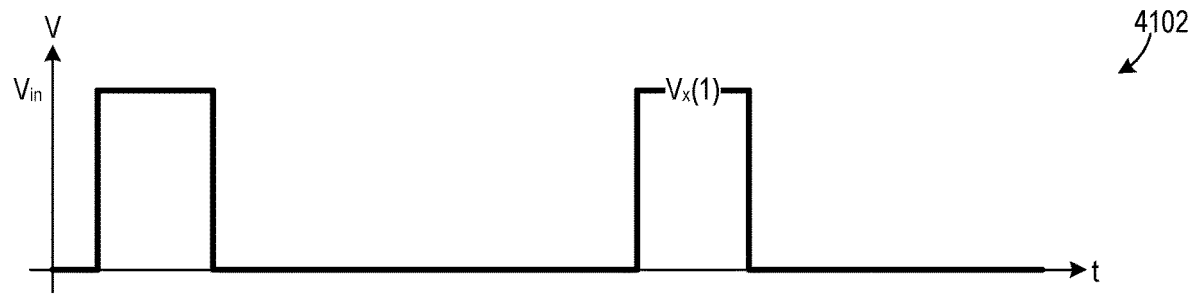
FIGS. 41A-41D are graphs collectively illustrating an example of operation of the FIG. 2 switching power converter with the injection stage polarity of FIG. 40.
Figure 41B:
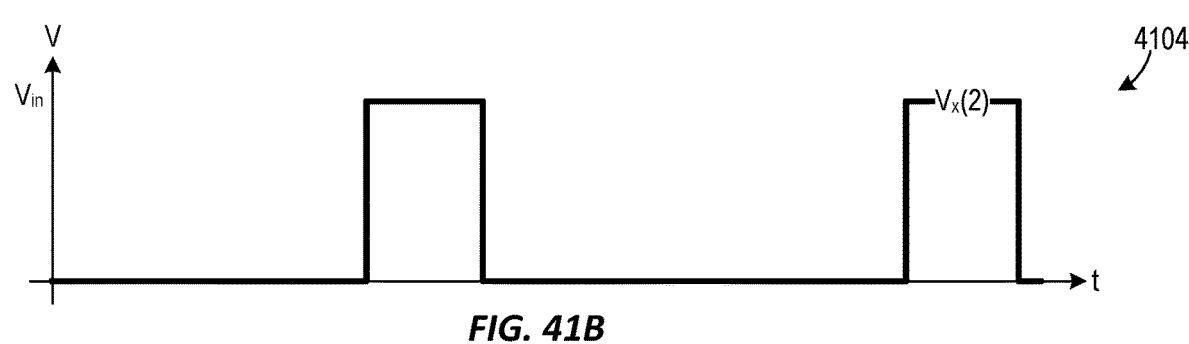
Figure 41C:
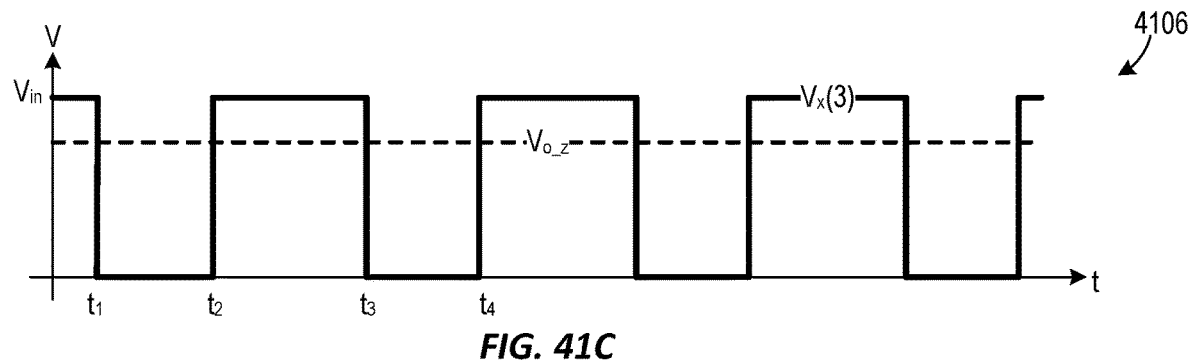
Figure 41D:
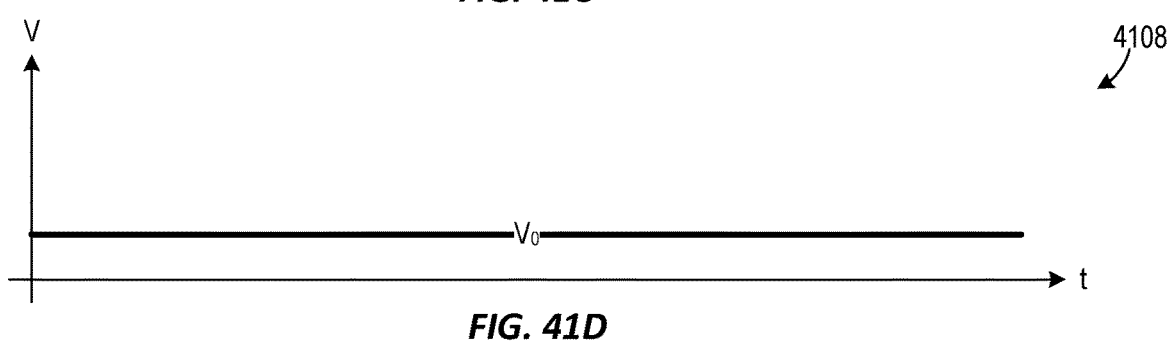

For example, FIGS. 41A-41D are graphs collectively illustrating one example of operation of an embodiment of switching power converter 200 where N is equal to two, such that switching power converter 200 includes two power stages 202 and one injection stage 204. Graphs 41A-41D assume that boosted coupled inductor 228 is connected to injection stage 204 as illustrated in FIG. 40, and the graphs also assume that the magnetizing inductance value of boosted coupled inductor 228 is much greater than any leakage inductance value of boosted coupled inductor 228. Additionally, graphs 41A-41D assume the same operating conditions of switching power converter 200 as graphs 39A-39D. Graph 4102 is a graph of switching node voltage $V_x(1)$ versus time, and graph 4104 is a graph of switching node voltage $V_x(2)$ versus time. As illustrated in FIGS. 41A and 41B, each switching node X(1) and X(2) is repeatedly driven high and low between $V_{in}$ and zero volts, respectively, and the switching nodes are driven high and low out-of-phase with each other. FIG. 41C is a graph 4106 including a curve representing voltage at the injection switching node X(N+1), which is node X(3) because N is equal to two in this example. FIG. 41C also includes a curve representing voltage $V_{o\_z}$ at injection output node 222. FIG. 41D is a graph 4108 of output voltage $V_o$.

In the example of FIGS. 41A-41D, controller 206 controls injection stage 204 so that injection stage 204 switches in unison with power stages 202, but with at least a substantially opposite polarity than that of graphs 39A-39D, to compensate for different injection stage polarity of electrical model 4000 compared to electrical model 3800. Specifically, boost winding 220 is driven low in response to any power transfer winding 210 being driven high, and boost winding 220 is driven high in response to any power transfer winding 210 being driven low, as illustrated in FIGS. 41A-41C. For example, boost winding 220 is driven low at time $t_1$ in response to power transfer winding 210(1) being driven high, and boost winding 220 is driven high at time $t_2$ in response to power transfer winding 210(1) being driven low. As another example, boost winding 220 is driven low at time $t_3$ in response to power transfer winding 210(2) being driven high, and boost winding 220 is driven high at time $t_4$ in response to power transfer winding 210(2) being driven low. Consequently, voltages on both sides of each inductor 3808 are largely identical. Therefore, voltage across each inductor 3808 remains at small value even as power transfer windings 210 are repeatedly driven between high and low states to regulate one or more parameters of switching power converter 200. As a result, there is relatively little ripple current associated with leakage inductance of boosted coupled inductor 228, irrespective of operating duty cycle of switching power converter 200.

The respective examples of FIGS. 39A-39D and FIGS. 41A-41D will achieve at least substantially equal ripple current cancelation. However, voltage $V_{o\_z}$ at injection output node 222 significantly varies between the two examples, as can be appreciated by comparing FIGS. 39C and 41C. Accordingly, in certain embodiments, injection stage polarity is selected at least partially according to desired magnitude of voltage $V_{o\_z}$. For example, a relatively low magnitude of voltage $V_{o\_z}$ may be desired to minimize required voltage rating of capacitor 224, which may lead to selection of the FIG. 38 injection stage polarity over the FIG. 40 injection stage polarity, to help minimize magnitude of voltage $V_{o\_z}$.

Figure 42A:
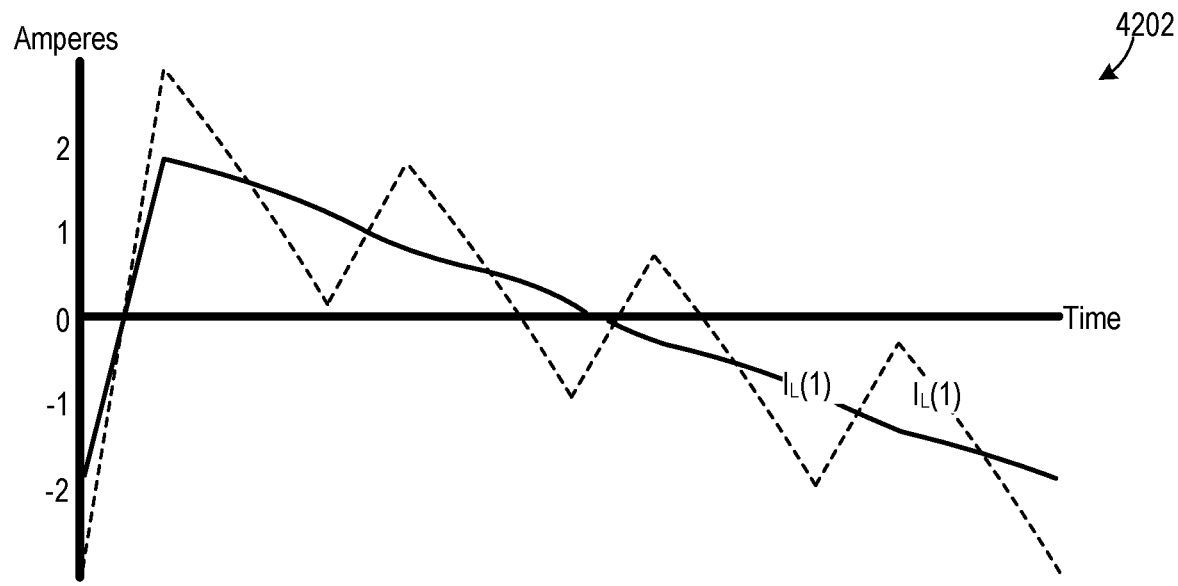
FIGS. 42A and 42B are graphs illustrating magnitude of current flowing through the FIG. 2 switching power converter with two different values of power transfer winding leakage inductance.
Figure 42B:
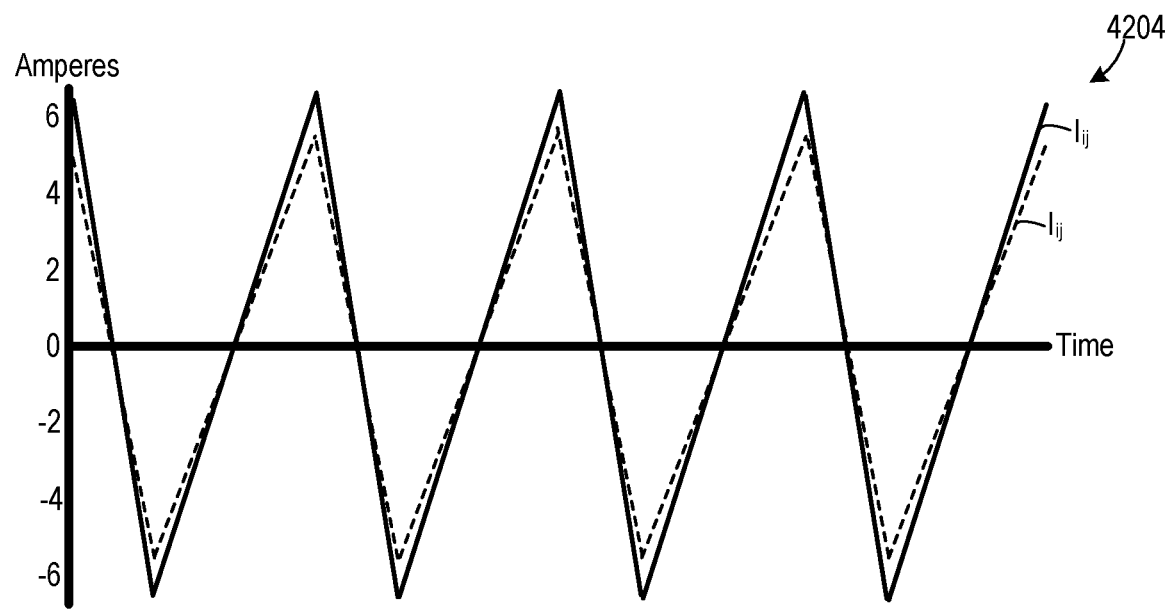

Referring again to FIG. 38, Applicant has determined that ripple current magnitude is not necessarily minimized by minimizing inductance $L_a$ of inductors 3808, or in other words, that ripple current magnitude is not necessarily minimized by maximizing magnetic coupling between boost winding 220 and each power transfer winding 210. For example, FIGS. 42A and 42B are graphs 4202 and 4204, respectively, of simulated current versus time of an embodiment of switching power converter 200 (FIG. 2) where $V_{in}=12$ volts, $V_o=1$ volt, N=4, switching frequency is 500 KHz, $L_k=25$ nanohenrys (nH), $L_m=375$ nH, and $L_{a\_bci}=1$ nH. FIG. 42A includes curves representing current $I_L(1)$ where (a) $L_a=1$ nH (dashed line) and (b) $L_a=5$ nH (solid line). Additionally, FIG. 42B includes curves representing current $I_{ij}$ where (a) $L_a=1$ nH (dashed line) and (b) $L_a=5$ nH (solid line). FIGS. 42A and 42B have a common time base. As evident from FIGS. 42A and 42B, increasing inductance $L_a$ of inductors 3808 from 1 nH to 5 nH significantly decreases magnitude of ripple current flowing through power transfer winding 210(1), with only a small increase in magnitude of ripple current $I_{ij}$ in injection stage 204. A similar decrease in ripple current magnitude would be expected in other power transfer windings 210 in response to increasing inductance $L_a$ of inductors 3808 from 1 nH to 5 nH.

Accordingly, some embodiments of boosted coupled inductor 228 include one or more features to help control leakage inductance $L_a$ of each power transfer windings 210, such as to help achieve a value of leakage inductance $L_a$ of each power transfer winding 210 that helps minimize magnitude of ripple current associated with charging and discharging leakage inductance of boosted coupled inductor 228. Such features include, for example, one or more teeth formed of magnetic material that are configured to affect magnetic coupling of boost winding 220 to each power transfer windings 210, thereby affecting value of $L_a$ of each power transfer windings 210. Discussed below with respect to FIGS. 43-63 are several examples of possible embodiments of boosted coupled inductor including feature to help control leakage inductance $L_a$ of each power transfer winding 210. It is appreciated, though, that features to control leakage inductance $L_a$ of each power transfer winding 210 could be implemented in other manners without departing from the scope hereof.

Figure 43:
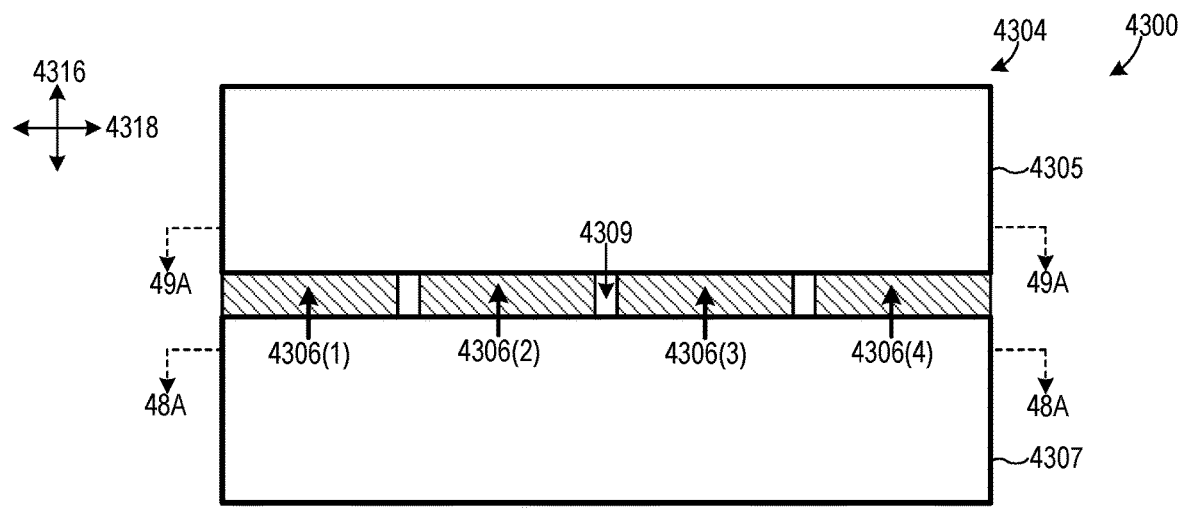
FIG. 43 is a top plan view of a boosted coupled inductor including a plurality of stray inductance teeth, according to an embodiment.
Figure 44:
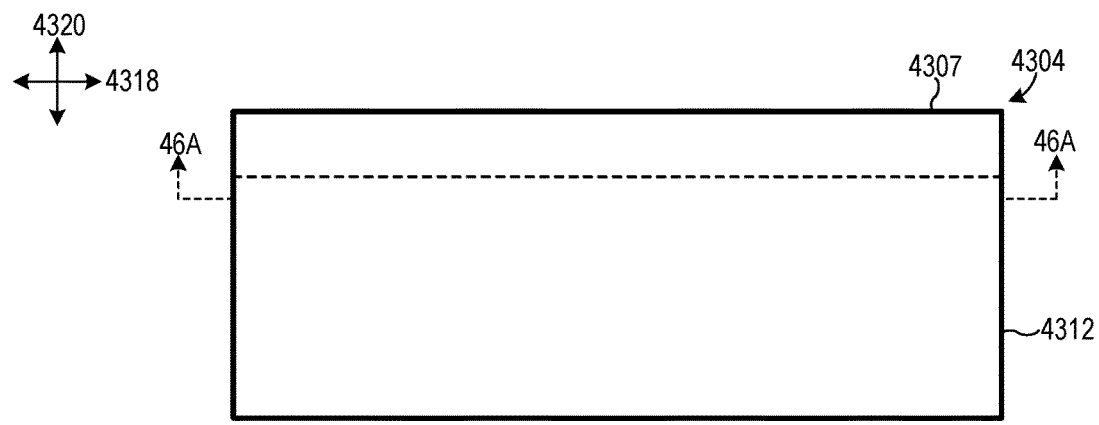
FIG. 44 is a front elevational view of the FIG. 43 boosted coupled inductor.
Figure 45:
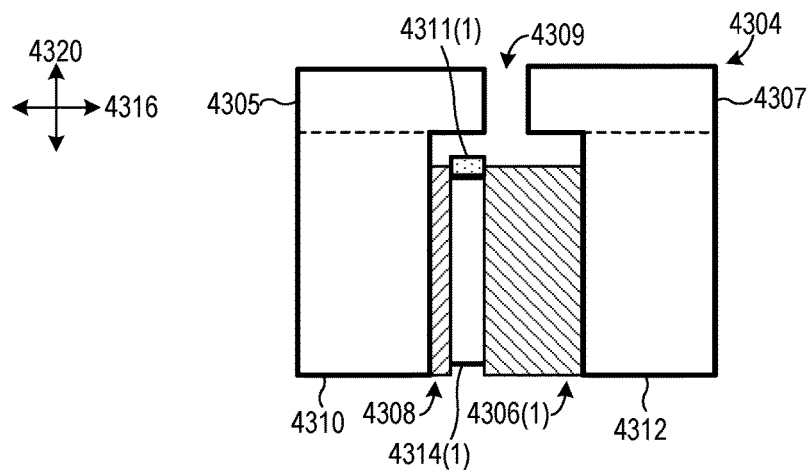
FIG. 45 is a side elevational view of the FIG. 43 boosted coupled inductor.
Figure 46:
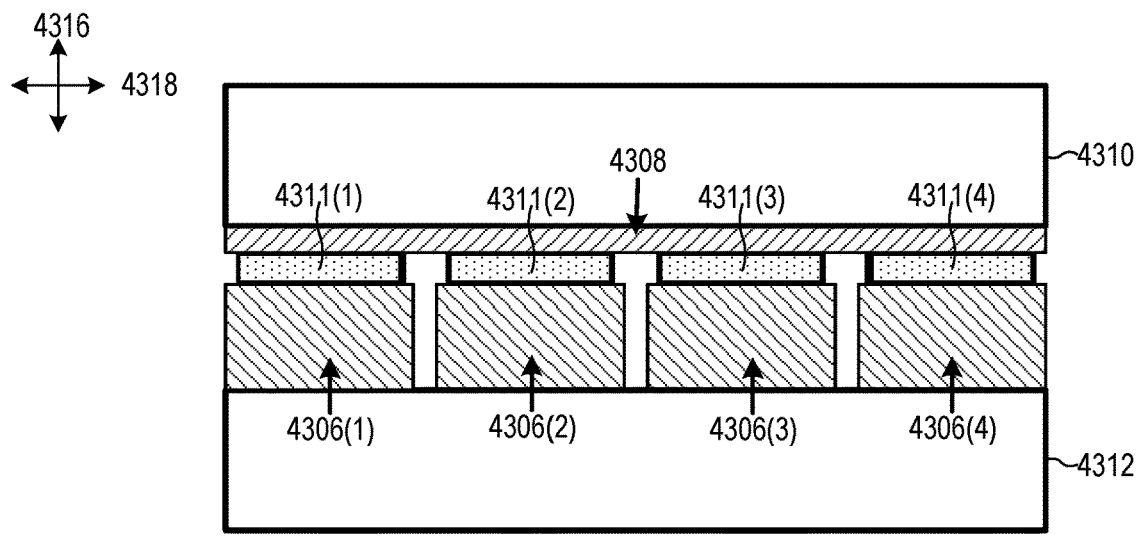
FIG. 46 is a cross-sectional view of the FIG. 43 boosted coupled inductor taken along line 46A-46A of FIG. 44.
Figure 47:
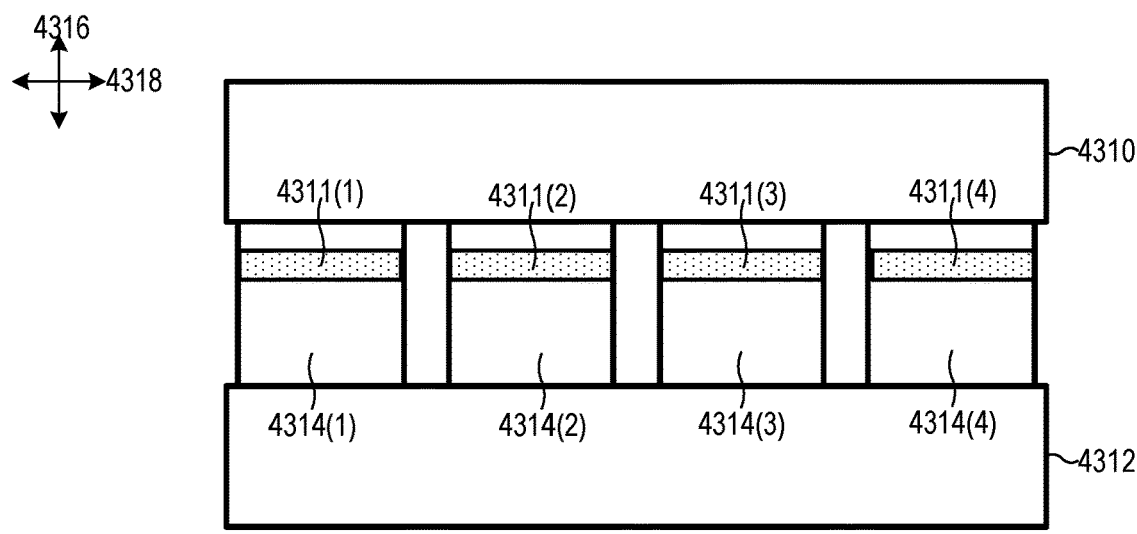
FIG. 47 is the same cross-sectional view of the FIG. 43 boosted coupled inductor as FIG. 46 but with windings omitted to further show magnetic core features.
Figure 48:
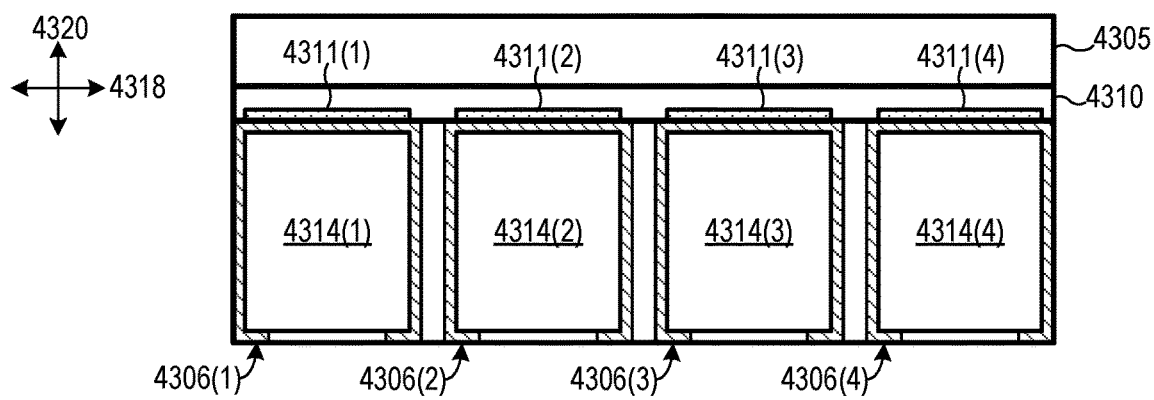
FIG. 48 is a cross-sectional view of the FIG. 43 boosted coupled inductor taken along line 48A-48A of FIG. 43.
Figure 49:
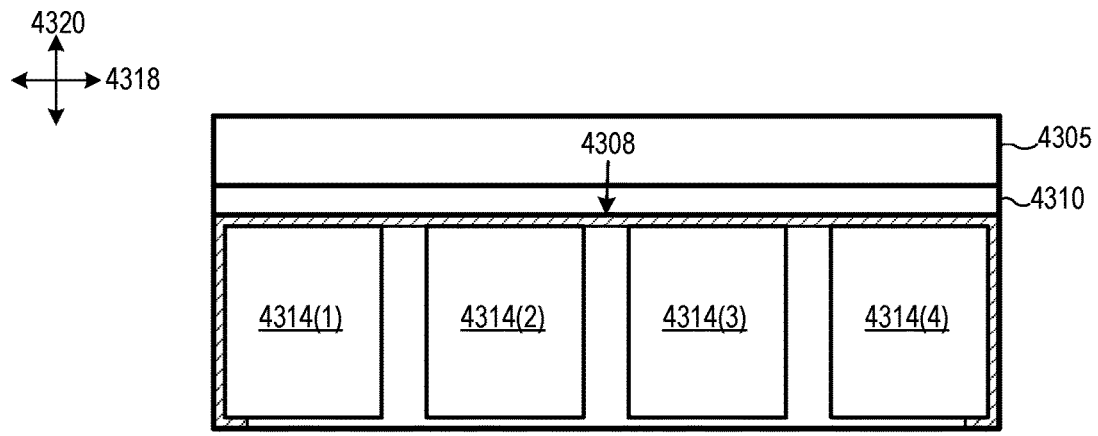
FIG. 49 is a cross-sectional view of the FIG. 43 boosted coupled inductor taken along line 49A-49A of FIG. 43.

FIG. 43 is a top plan view of a boosted coupled inductor 4300, which is a possible embodiment of boosted coupled inductor 228 including features to control leakage inductance $L_a$ of each power transfer winding 210. N is equal to 4 in boosted coupled inductor 4300. FIG. 44 is a front elevational view of boosted coupled inductor 4300, and FIG. 45 is a side elevational view of boosted coupled inductor 4300. FIG. 46 is a cross-sectional view of boosted coupled inductor 4300 taken along line 46A-46A of FIG. 44, and FIG. 47 is the same cross-sectional view of boosted coupled inductor as in FIG. 46 but with windings omitted to further show magnetic core features of boosted coupled inductor 4300. FIG. 48 is a cross-sectional view of boosted coupled inductor 4300 taken along line 48A-48A of FIG. 43, and FIG. 49 is a cross-sectional view of boosted coupled inductor 4300 taken along line 49A-49A of FIG. 43.

Boosted coupled inductor 4300 includes a magnetic core 4304, a plurality of power transfer windings 4306, and a boost winding 4308. Magnetic core 4304 is formed, for example, of a ferrite magnetic material and/or a powdered iron magnetic material. Magnetic core 4304 includes a first rail 4310, a second rail 4312, a plurality of legs 4314, a leakage element 4305, a leakage element 4307, and a plurality of stray inductance teeth 4311. Although magnetic core 4304 is illustrated as including four legs 4314 and four stray inductance teeth 4311, the number of legs 4314 and stray inductance teeth 4311 of magnetic core 4304 will vary with the number of phases supported by boosted coupled inductor 4300. For example, in embodiments of boosted coupled inductor 4300 intended for use with three phases, i.e., with N=3, boosted coupled inductor 4300 will have three legs 4314 and three stray inductance teeth 4311. First rail 4310 and second rail 4312 are separated from each other in a direction 4316, and legs 4314 are disposed between first rail 4310 and second rail 4312 in direction 4316. Legs 4314 are separated from each other in a direction 4318, where direction 4318 is orthogonal to direction 4316. The figures further show a third direction 4320 which is orthogonal to each of directions 4316 and 4318. In some embodiments, legs 4314 join first and second rails 4310 and 4312 in direction 4316, and in some other embodiments, legs 4314 are separated from first rail 4310 and/or second rail 4312 by a respective gap (not shown), such as to help prevent saturation of magnetic core 4304. Each leg 4314 optionally also forms a respective gap (not shown) along direction 4318, such that the leg is broken into two or more portions separated from each other in direction 4316 by the gap.

Leakage element 4305 is joined to first rail 4310, and leakage element 4307 is joined to second rail 4312. Leakage elements 4305 and 4307 extend towards each other in direction 4316 to provide a relatively low reluctance path for leakage magnetic flux to flow between rails 4310 and 4312. Leakage elements 4305 and 4307 are optionally separated by a gap 4309 in direction 4316 where gap 4309 is filled with, for example, air, paper, plastic, adhesive, and/or a magnetic material having a lower magnetic permeability that magnetic material forming leakage elements 4305 and 4307. Gap 4309 can be split into two or more smaller gaps to decrease fringing magnetic flux. The dotted lines delineating leakage elements 4305 and 4307 from rails 4310 and 4312, respectively, are to assist a viewer in distinguishing features of boosted coupled inductor 4300, and these lines do not necessarily represent discontinuities in boosted coupled inductor 4300.

Each stray inductance tooth 4311 is disposed on a respective leg 4314 in direction 4320, and each stray inductance tooth 4311 extends toward leakage element 4305 in direction 4320. Additionally, each stray inductance tooth 4311 is disposed between boost winding 4308 and a respective power transfer winding 4306 in direction 4316. Each stray inductance tooth 4311 contributes to leakage inductance $L_a$ of its respective power transfer winding 4306 by facilitating flow of magnetic flux between its respective leg 4314 and leakage element 4305, thereby reducing magnetic coupling between boost winding 4308 and each power transfer windings 4306. Accordingly, inductance $L_a$ of inductors 3808 (FIG. 38) can be increased by increasing height of stray inductance teeth 4311, i.e., by extending stray inductance teeth 4311 in direction 4320 toward leakage element 4305. Conversely, inductance $L_a$ of inductors 3808 can be decreased by decreasing height of stray inductance teeth 4311, i.e., by reducing extent of stray inductance teeth 4311 in direction 4320 toward leakage element 4305. As such, stray inductance teeth 4311 enable control of leakage inductance $L_a$ of each power transfer windings 4306 in boosted coupled inductor 4300.

Power transfer windings 4306 are embodiments of power transfer windings 210, and boost winding 4308 is an embodiment of boost winding 220. A respective power transfer winding 4306 is wound at least partially around each leg 4314, and boost winding 4308 is wound at least partially around all legs 4314, such that boost winding 4308 forms a common turn around all legs 4314. Accordingly, boost winding 4308 is strongly magnetically coupled to each power transfer winding 4306, albeit with such coupling reduced by stray inductance teeth 4311. Boost winding 4308 is electrically isolated from power transfer windings 4306. Although each power transfer winding 4306 and boost winding 4308 is depicted as being a single-turn winding formed of electrically conductive foil, such as copper foil, the configurations of power transfer windings 4306 and boost winding 4308 may vary. For example, one or more of these windings may form a plurality of turns, and/or one or more of these windings may be formed of wire instead of electrically conductive foil.

Figure 50:
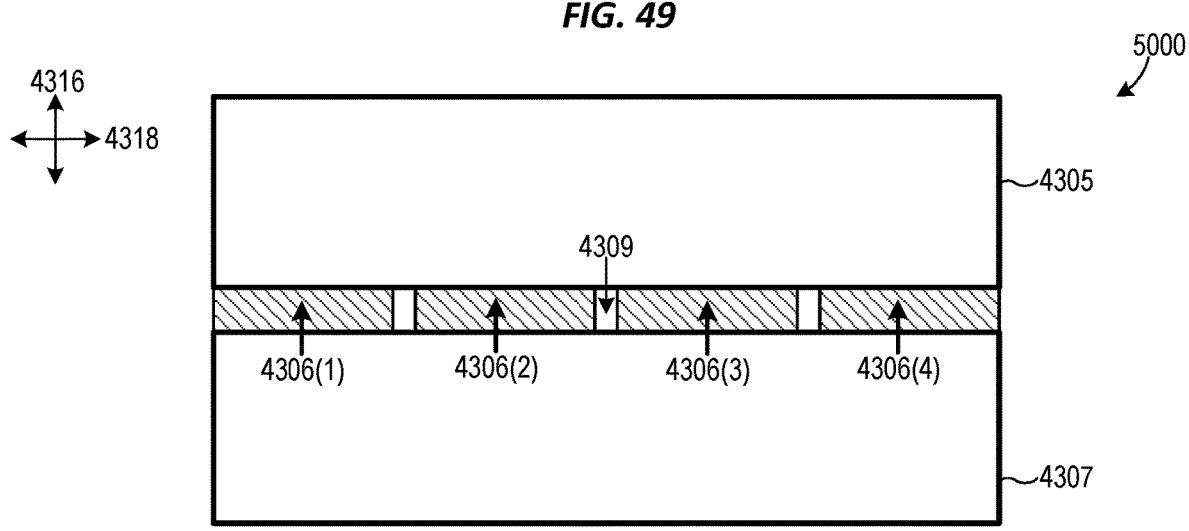
FIG. 50 is a top plan view of an alternate embodiment of the FIG. 43 boosted coupled inductor.
Figure 51:
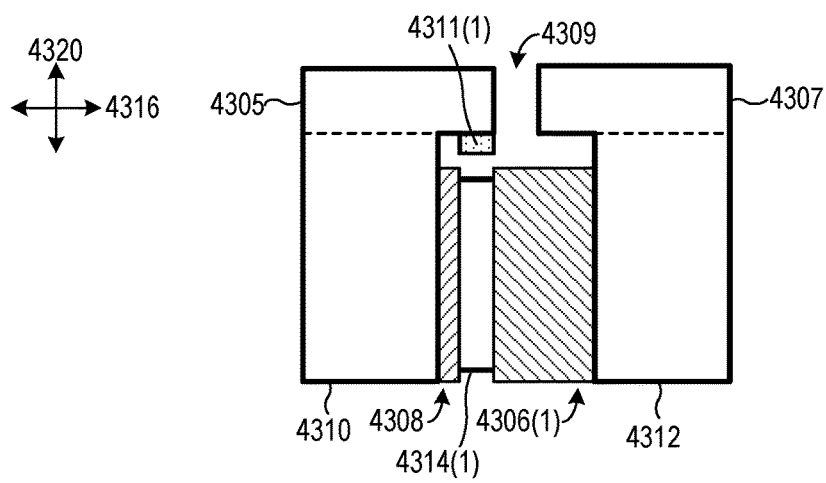
FIG. 51 is a side elevational view of the FIG. 50 boosted coupled inductor.

The configuration and/or quantity of stray inductance teeth, leakage elements, and/or gaps of boosted coupled inductor 4300 may vary. For example, FIG. 50 is a top plan view of a boosted coupled inductor 5000, and FIG. 51 is a side elevational view of boosted coupled inductor 5000. Boosted coupled inductor 5000 is an alternate embodiment of boosted coupled inductor 4300 where stray inductance teeth 4311 are disposed on leakage element 4305 in direction 4320, instead of being disposed on legs 4314 in direction 4320. Each stray inductance tooth 4311 extends toward a respective leg 4314 in direction 4320, in boosted coupled inductor 5000. In a manner analogous to that discussed above with respect to boosted coupled inductor 4300, inductance $L_a$ of inductors 3808 can be increased by extending stray inductance teeth 4311 in direction 4320 toward legs 4314, and inductance $L_a$ of inductors 3808 can be decreased by reducing extent of stray inductance teeth 4311 in direction 4320 toward legs 4314. Boosted coupled inductor 5000 could be modified to include a respective instance of stray inductance teeth 4311 on each leg 4314 as well as on leakage element 4305.

Figure 52:
FIG. 52 is a top plan view of another alternate embodiment of the FIG. 43 boosted coupled inductor.
Figure 53:
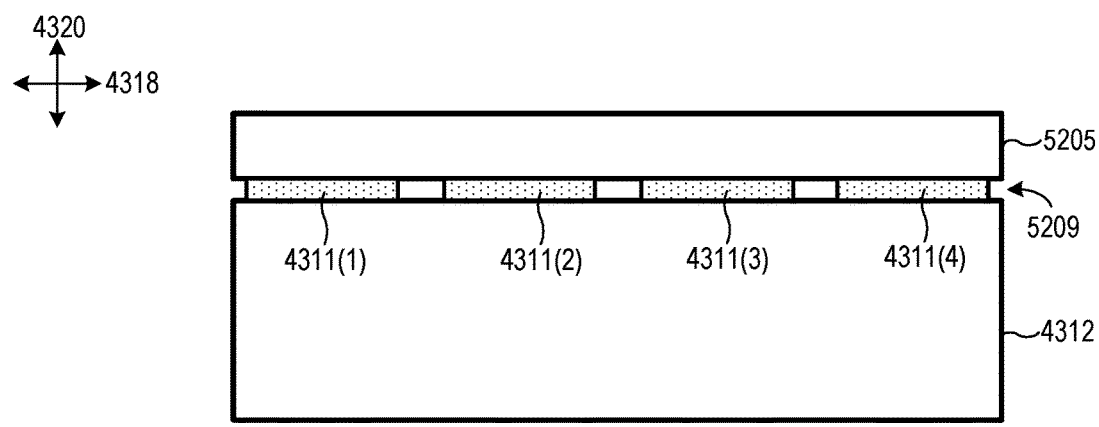
FIG. 53 is a front elevational view of the FIG. 52 boosted coupled inductor.
Figure 54:
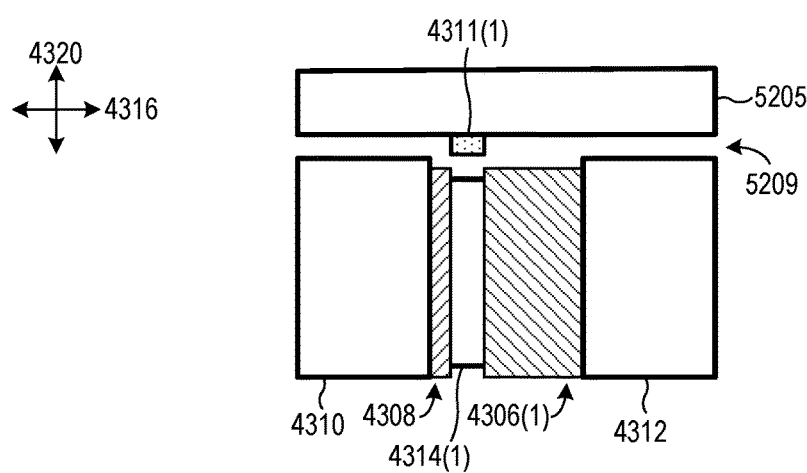
FIG. 54 is a side elevational view of the FIG. 52 boosted coupled inductor.

As another example, FIG. 52 is a top plan view of a boosted coupled inductor 5200, FIG. 53 is a front elevational view of boosted coupled inductor 5200, and FIG. 54 is a side elevational view of boosted coupled inductor 5200. Boosted coupled inductor 5200 is an alternate embodiment of boosted coupled inductor 5000 (FIGS. 50 and 51) with dual leakage elements 4305 and 4307 replaced with a single leakage element 5205 disposed over each of first rail 4310 and second rail 4312 in direction 4320, such that leakage element 5205 provides a path for magnetic flux between first rail 4310 and second rail 4312. Leakage element 5205 is separated from each of first rail 4310 and second rail 4312 by a gap 5209 in direction 4320. Gap 5209 is filled with, for example, air, paper, plastic, adhesive, and/or a magnetic material having a lower magnetic permeability than magnetic material forming leakage element 5205. Although gap 5209 is depicted as being uniform, gap 5209 could alternately be nonuniform, e.g., gap 5209 could have a varying thickness in direction 4320. Stray leakage teeth 4311 operate in boosted coupled inductor 5200 in a manner analogous to that of boosted coupled inductor 5000.

Figure 64:
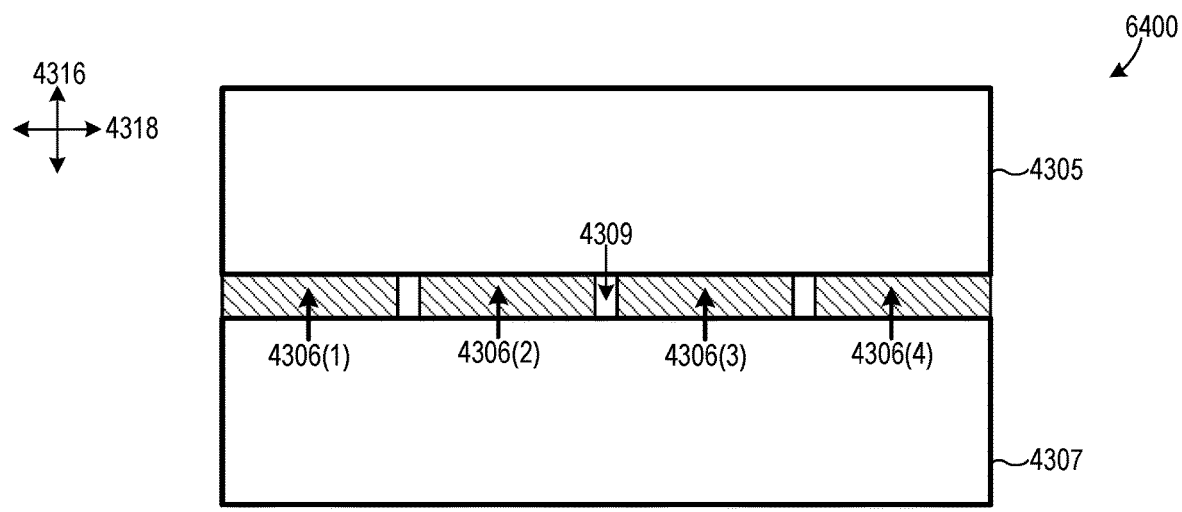
FIG. 64 is a top plan view of another alternate embodiment of the FIG. 43 boosted coupled inductor.
Figure 65:
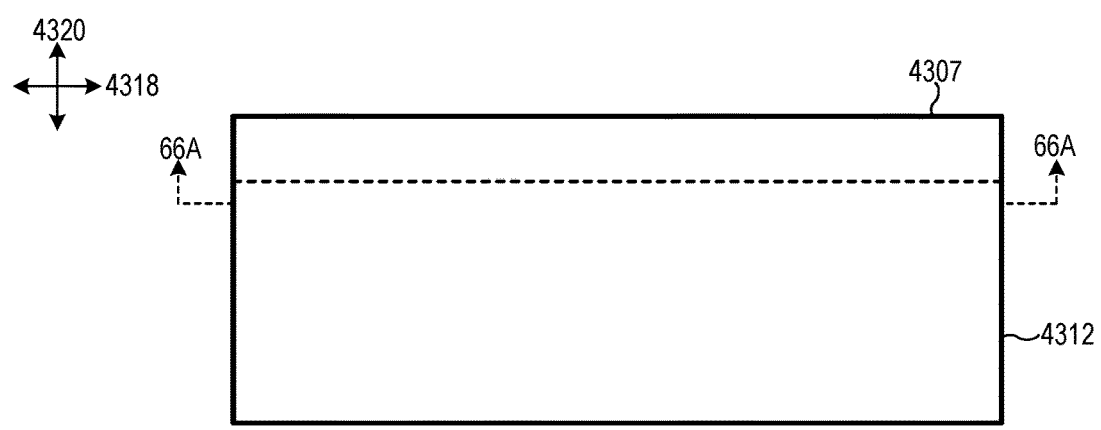
FIG. 65 is a front elevational view of the FIG. 64 boosted coupled inductor.
Figure 66:
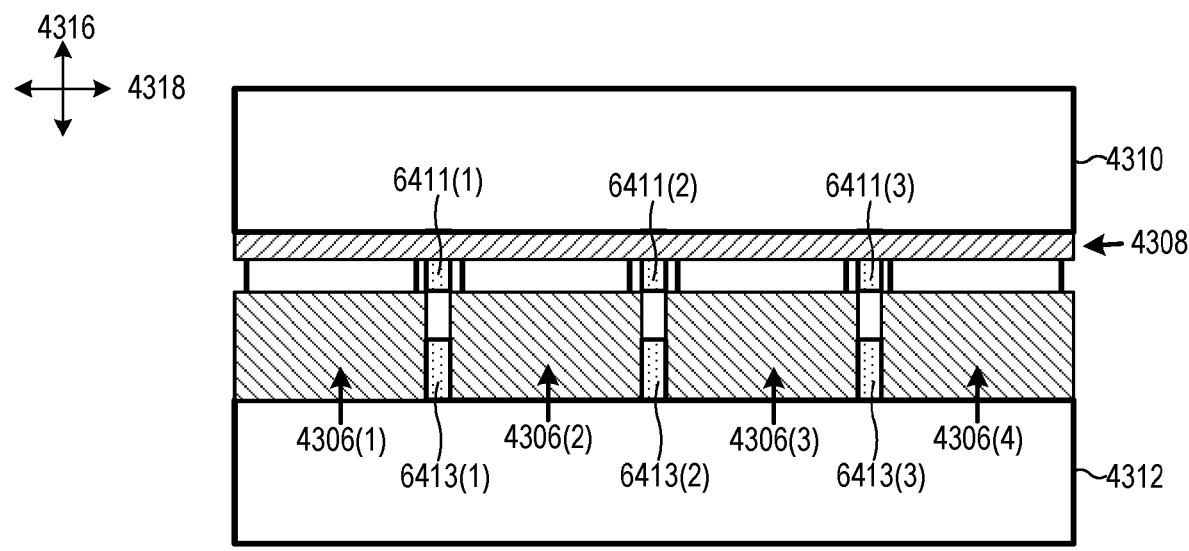
FIG. 66 is a cross-sectional view of the FIG. 64 boosted coupled inductor taken along line 66A-66A of FIG. 65.
Figure 67:
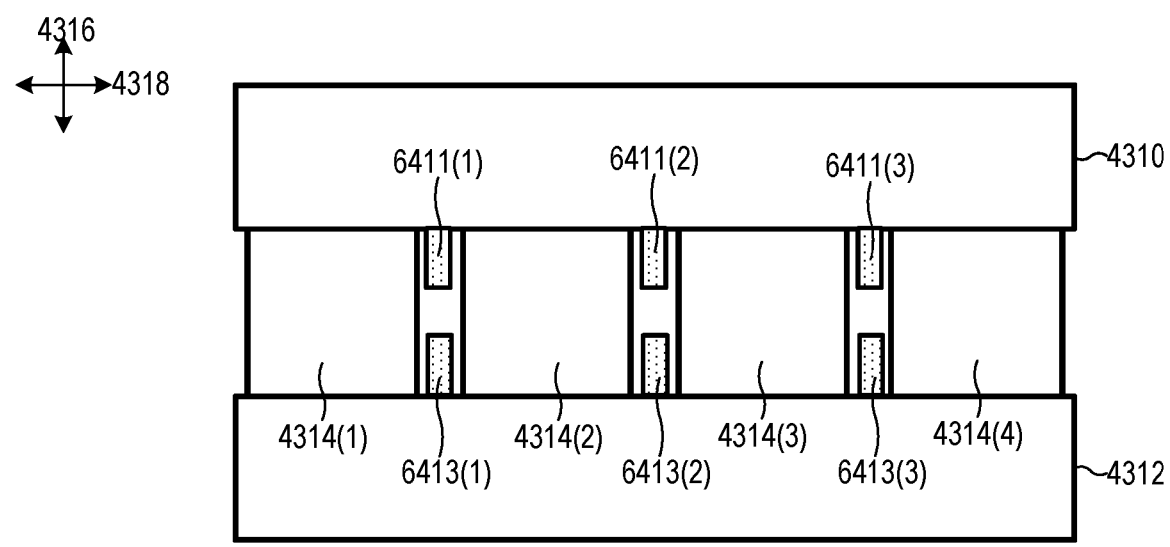
FIG. 67 is the same cross-sectional view of the FIG. 64 boosted coupled inductor as FIG. 66 but with windings omitted to further show magnetic core features.

As an additional example, FIG. 64 is a top plan view of a boosted coupled inductor 6400, FIG. 65 is a front elevational view of boosted coupled inductor 6400, and FIG. 66 is a cross-sectional view of boosted coupled inductor 6400 taken along lines 66A-66A of FIG. 65. FIG. 67 is a cross-sectional view of boosted coupled inductor 6400 like that of FIG. 66 but windings omitted to further show magnetic core features. Boosted coupled inductor 6400 is an alternate embodiment of boosted coupled inductor 4300 where stray inductance teeth 4311 are replaced with stray inductance teeth 6411 and stray inductance teeth 6413. Stray inductance teeth 6411 are disposed on first rail 4310 in direction 4316, and stray inductance teeth 6411 extend toward second rail 4312 in direction 4316. Stray inductance teeth 6413, in contrast, are disposed on second rail 4312 in direction 4316, and stray inductance teeth 6413 extend toward first rail 4310 in direction 4316. It should be noted that stray inductance teeth 6411 and 6413 are within boost winding 4308, as seen when boosted coupled inductor 6400 is viewed cross-sectionally in direction 4316, so that net magnetic flux flowing through boost winding 4308, and associated with the stray inductance teeth, is zero under steady state conditions. Stray inductance teeth 6413 could be omitted while retaining stray inductance teeth 6411, or vice versa. Additionally, there need not be stray inductance teeth between each pair of adjacent legs 4314.

Figure 55:
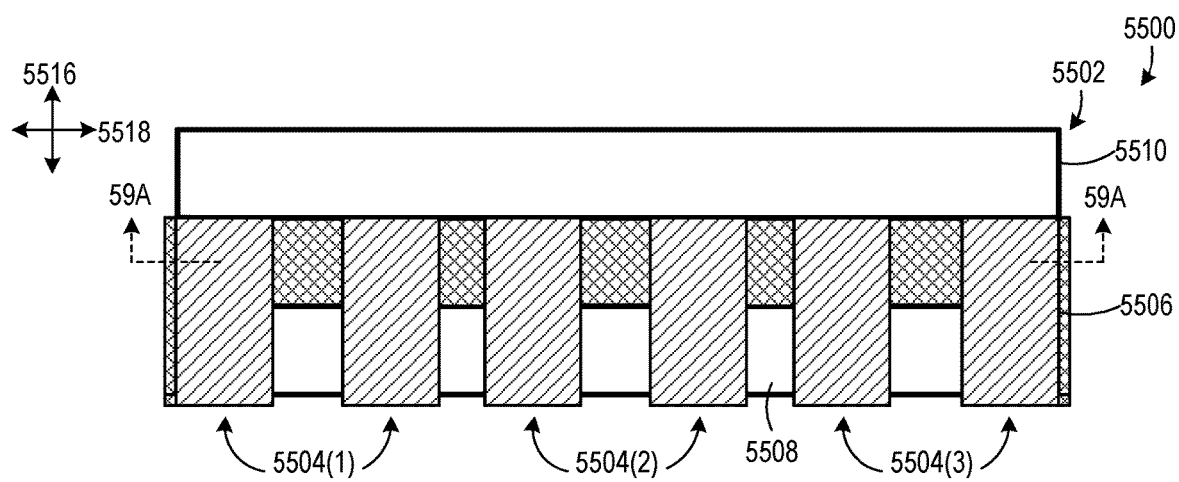
FIG. 55 is a front elevational view of another boosted coupled inductor including a plurality of stray inductance teeth, according to an embodiment.
Figure 56:
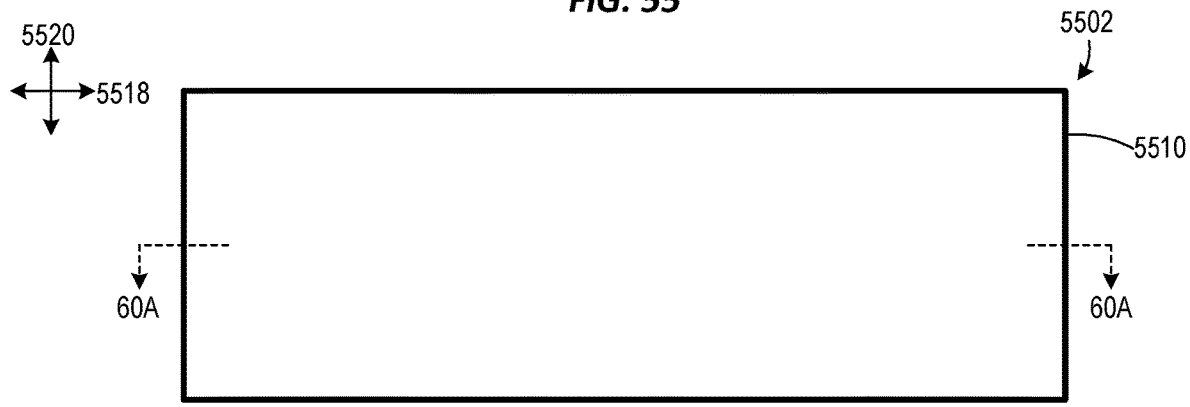
FIG. 56 is a top plan view of the FIG. 56 boosted coupled inductor.
Figures 57, 58:
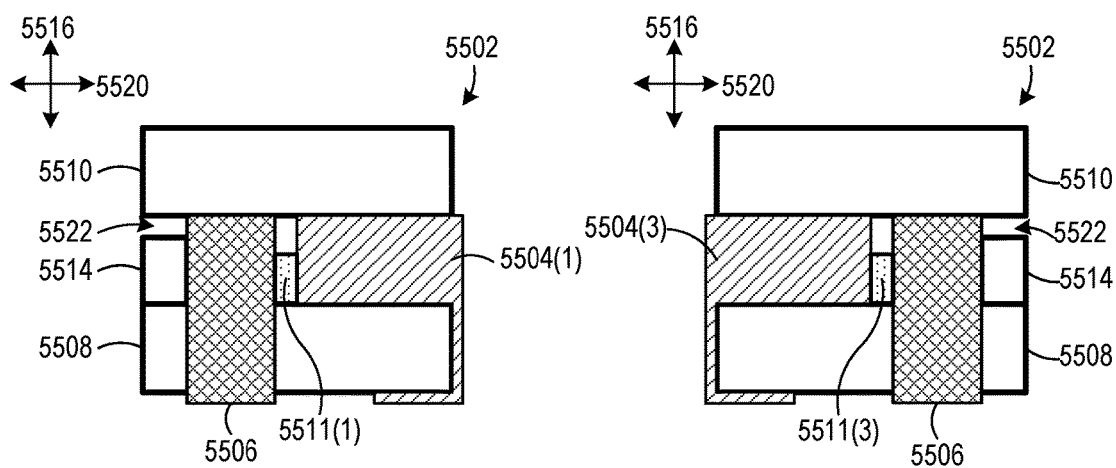
FIG. 57 is a left side elevational view of the FIG. 56 boosted coupled inductor.
FIG. 58 is a right side elevational view of the FIG. 56 boosted coupled inductor.
Figure 59:
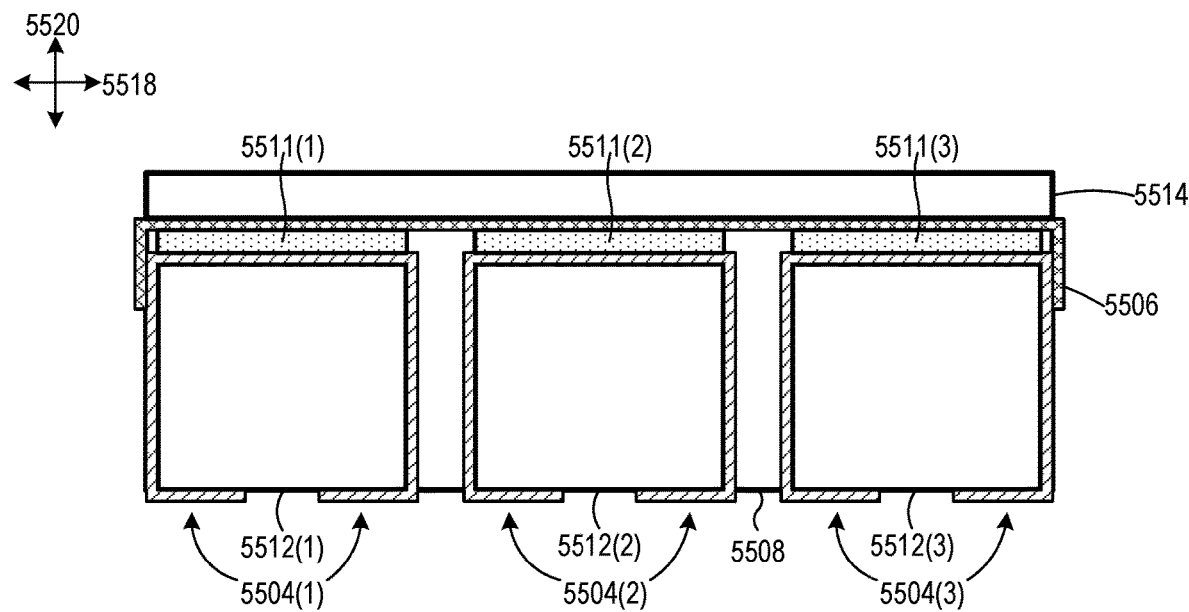
FIG. 59 is a cross-sectional view of the FIG. 55 boosted coupled inductor taken along line 59A-59A of FIG. 55.
Figure 60:
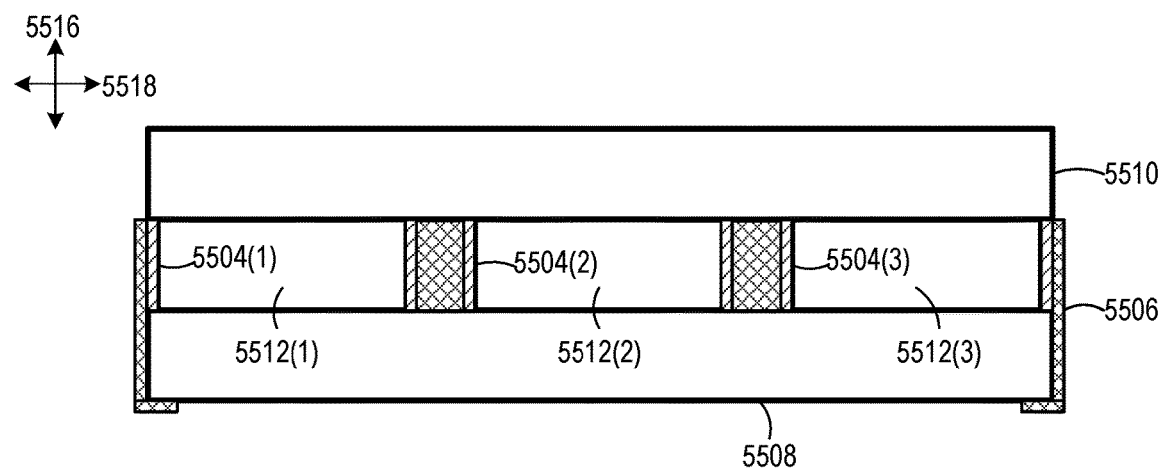
FIG. 60 is a cross-sectional view of the FIG. 55 boosted coupled inductor taken along line 60A-60A of FIG. 56.

FIG. 55 is a front elevational view of a boosted coupled inductor 5500, which is another possible embodiment of boosted coupled inductor 228 including features to control leakage inductance $L_a$ of each power transfer windings 210. FIG. 56 is a top plan view of boosted coupled inductor 5500, FIG. 57 is a left side elevational view of boosted coupled inductor 5500, and FIG. 58 is a right side elevational view of boosted coupled inductor 5000. FIG. 59 is a cross-sectional view of boosted coupled inductor 5500 taken along line 59A-59A of FIG. 55, and FIG. 60 is a cross-sectional view of boosted coupled inductor 5500 taken along line 60A-60A of FIG. 56. Boosted coupled inductor 5500 includes a magnetic core 5502, a plurality of power transfer windings 5504, and a boost winding 5506. N is equal to three in boosted coupled inductor 5500.

Magnetic core 5502 is formed, for example, of a ferrite magnetic material and/or a powdered iron material. Magnetic core 5502 includes a first rail 5508, a second rail 5510, a plurality of legs 5512, a leakage element 5514, and a plurality of stray inductance teeth 5511. Although magnetic core 5502 is illustrated as including three legs 5512 and three corresponding stray inductance teeth 5511, magnetic core 5502 could be modified to have any number of legs 5512 and corresponding stray inductance teeth 5511, as long as magnetic core 5502 has at least two legs 5512 and corresponding stray inductance teeth 5511. First rail 5508 and second rail 5510 are separated from each other in a direction 5516, and legs 5512 are disposed between first rail 5508 and second rail 5510 in direction 5516. Legs 5512 are separated from each other in a direction 5518, where direction 5518 is orthogonal to direction 5516. In some embodiments, legs 5512 join first and second rails 5508, 5510 in direction 5516, and in some other embodiments, legs 5512 are separated from first rail 5508 and/or second rail 5510 by a respective gap (not shown), such as to help prevent saturation of magnetic core 5502. Leakage element 5514 is also disposed between first rail 5508 and second rail 5510 in direction 5516, such that leakage element 5514 is disposed over boost winding 5506 in a direction 5520, where direction 5520 is orthogonal to each of directions 5516 and 5518. In some embodiments, leakage element 5514 is attached to first rail 5508, and leakage element 5514 is separated from second rail 5510 in direction 5516 by a gap 5522. Gap 5522 includes, for example, air, plastic, paper, adhesive, or a magnetic material having a lower magnetic permeability than leakage element 5514.

Each stray inductance tooth 5511 is disposed on a first rail 5508 in direction 5516, and each stray inductance tooth 5511 extends toward second rail 5510 in direction 5516. Additionally, each stray inductance tooth 5511 is disposed between boost winding 5506 and a respective power transfer winding 5504 in direction 5520. Each stray inductance tooth 5511 contributes to leakage inductance $L_a$ of its respective power transfer winding 5504 by facilitating flow of magnetic flux between first rail 5508 and second rail 5510, thereby reducing magnetic coupling between boost winding 5506 and power transfer windings 5504. Accordingly, inductance $L_a$ of inductors 3808 (FIG. 38) can be increased by increasing height of stray inductance teeth 5511, i.e., by extending stray inductance teeth 5511 in direction 5516 toward second rail 5510. Conversely, inductance $L_a$ of inductors 3808 can be decreased by decreasing height of stray inductance teeth 5511, i.e., by reducing extent of stray inductance teeth 5511 in direction 5516 toward second rail 5510. As such, stray inductance teeth 5511 enable control of leakage inductance $L_a$ of power transfer windings 5504 in boosted coupled inductor 5500. Leakage teeth 5511 could alternately or additionally be disposed on second rail 5510.

Power transfer windings 5504 are embodiments of power transfer windings 210, and boost winding 5506 is an embodiment of boost winding 220. A respective power transfer winding 5504 is wound at least partially around each leg 5512. Accordingly, each power transfer winding 5504 is at least partially surrounded by boost winding 5506, as seen when boosted coupled inductor 5500 is viewed cross-sectionally in direction 5520 (see, e.g., FIGS. 59 and 60). Mutual magnetic flux and significant leakage magnetic flux generated by current flowing through power transfer windings 5504 flow through the turn formed by boost winding 5506. Consequently, boost winding 5506 is strongly magnetically coupled to each power transfer winding 5504, albeit with such coupling reduced by stray inductance teeth 5511.

Figure 63:
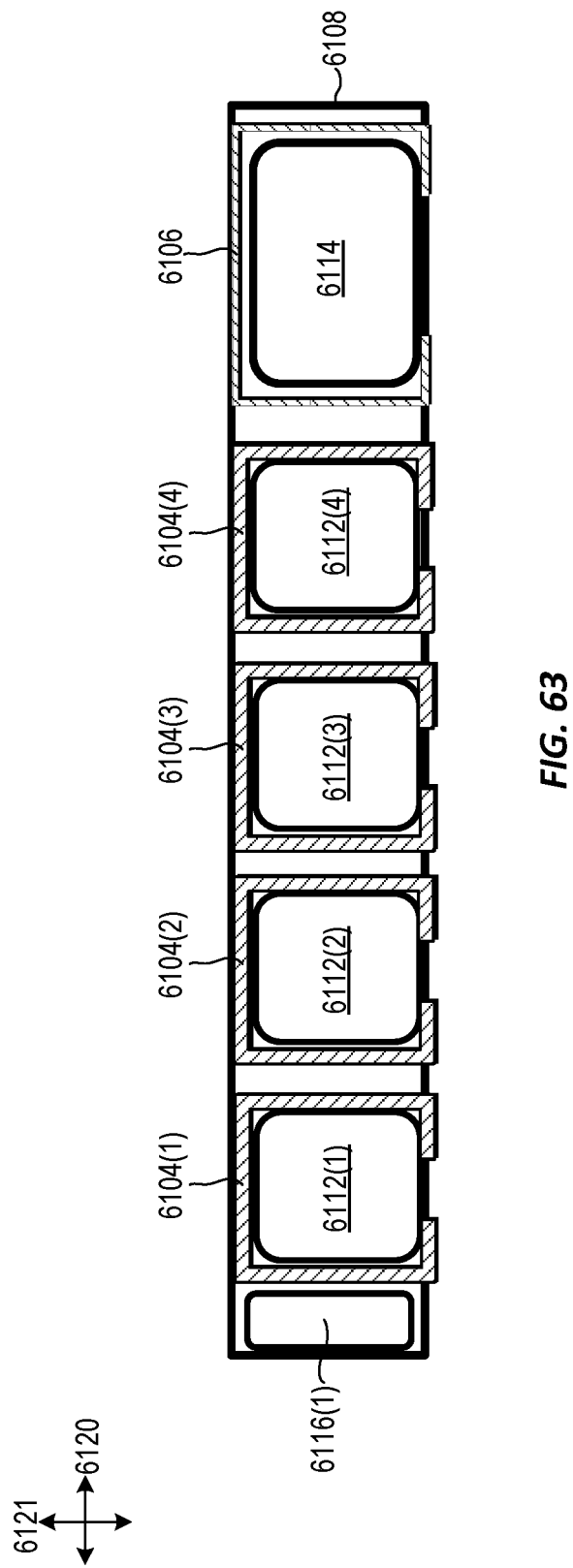
FIG. 63 is a cross-sectional view of the FIG. 61 boosted coupled inductor taken along line 63A-63A of FIG. 61.

Influence of the configuration of boosted coupled inductor 228 on leakage inductances $L_k$ and $L_a$ may be further considered in view FIGS. 61-63, which illustrate a boosted coupled inductor 6100, which is another embodiment of boosted coupled inductor 228 including features to control leakage inductance $L_a$ of each power transfer windings 210. Boosted coupled inductor 6100 includes a magnetic core 6102, a plurality of power transfer windings 6104, and a boost winding 6106, where N is equal to 4. Power transfer windings 6104 are embodiments of power transfer windings 210, and boost winding 6106 is an embodiment of boost winding 220. FIG. 61 is a top plan view of boosted coupled inductor 6100, or a size plan view of boosted coupled inductor 6100, depending on the orientation of boosted coupled inductor 6100. FIG. 62 illustrates boosted coupled inductor 6100 with power transfer windings 6104 and boost winding 6106 omitted to further show features of magnetic core 6102. FIG. 63 is a cross-sectional view of boosted coupled inductor 6100 taken along lines 63A-63A of FIG. 61.

Magnetic core 6102 includes a first rail 6108, a second rail 6110, a plurality of legs 6112, a leakage element 6114, and two stray inductance teeth 6116. Magnetic core 6102 is formed, for example, of a ferrite magnetic material and/or a powered iron magnetic material. First rail 6108 and second rail 6110 are separated from each other in a direction 6118. Each leg 6112 is disposed between first rail 6108 and second rail 6110 in direction 6118. Each leg 6112 is separated from each other leg 6112 in a direction 6120 that is orthogonal to direction 6118. FIG. 63 also illustrates a direction 6121 that is orthogonal to each of directions 6118 and 6120. Each leg 6112 forms a respective gap 6122 separating two portions of the leg in direction 6118. However, the quantity, size, and location of gaps in legs 6112 may vary. Magnetizing inductance $L_m$ of boosted coupled inductor 6100 decreases with increasing thickness of gaps 6122 in direction 6118.

Leakage element 6114 forms a gap "$L_k$ gap" separating two portions of leakage element 6114 in direction 6118. However, the size and location of $L_k$ gap in leakage element 6114 may vary, and $L_k$ gap may alternately be collectively embodied by a plurality of gaps in leakage element 6114. Thickness of $L_k$ gap in direction 6118 may be adjusted to adjust total leakage inductance $L_k$ of each power transfer winding 6104. Specifically, increasing thickness of $L_k$ gap in direction 6118 decreases total leakage inductance $L_k$ of each power transfer winding 6104, while decreasing thickness of $L_k$ gap in direction 6118 increase total leakage inductance $L_k$ of each power transfer winding 6104.

Stray inductance tooth 6116(1) is disposed on first rail 6108 such that stray inductance tooth 6116(1) faces second rail 6110 in direction 6118. Additionally, stray inductance tooth 6116(2) is disposed on second rail 6110 such that stray inductance tooth 6116(2) faces first rail 6108 in direction 6118. The two stray inductance teeth 6116 are separated from each other in direction 6118 by a gap "$L_a$ gap." Thickness of $L_a$ gap in direction 6118 may be adjusted to adjust leakage inductance $L_a$ of each power transfer winding 6104. Specifically, increasing thickness of $L_a$ gap in direction 6118 decreases leakage inductance $L_a$ of each power transfer winding 6104, while decreasing thickness of $L_a$ gap in direction 6118 increase leakage inductance $L_a$ of each power transfer winding 6104. As discussed above, leakage inductance $L_a$ of a given power transfer winding is a portion of a total leakage inductance $L_k$ of the power transfer winding that corresponds to leakage magnetic flux that does not couple to a boost winding.

A respective power transfer winding 6104 is wound around each leg 6112, and boost winding 6106 is wound around leakage element 6114. The quantity and location of legs 6112 in boosted coupled inductor 6100 may vary. Additionally, boosted coupled inductor 6100 may include one or more additional instances of leakage element 6114, and locations of leakage element(s) 6114 in boosted coupled inductor 6100 may vary. Furthermore, the quantity and location of stray inductance teeth 6116 in boosted coupled inductor 6100 may vary. For example, boosted coupled inductor 6100 could be modified to include a second pair of stray inductance teeth 6116 to increase leakage inductance $L_a$ of each power transfer winding 6104.

Combinations of Features

Features described above may be combined in various ways without departing from the scope hereof. The following examples illustrate some possible combinations.

(A1) A method for operating a switching power converter to reduce ripple current magnitude includes (1) controlling duty cycle of a plurality of power stages of the switching power converter to regulate at least one parameter of the switching power converter, each power stage including a respective power transfer winding, and (2) controlling an injection stage of the switching power converter to reduce voltage across leakage inductance of each power transfer winding, the injection stage of the switching power converter including a boost winding forming at least one turn around a respective leakage magnetic flux path of each power transfer winding.

(A2) In the method denoted as (A1), each power transfer winding and the boost winding may be part of a common coupled inductor.

(A3) In either one of the methods denoted as (A1) or (A2), the boost winding may be configured such that mutual magnetic flux associated with each power transfer winding flows through the at least one turn of the boost winding.

(A4) In either one of the methods denoted as (A1) or (A2), (1) the boost winding and each power transfer winding may be wound around a common magnetic core, and (2) the boost winding may form the at least one turn around a leakage element of the common magnetic core, where the leakage element is within a respective leakage magnetic flux path of each power transfer winding while being outside of mutual magnetic flux paths of each power transfer winding.

(A5) In any one of the methods denoted as (A1) through (A4), controlling the injection stage of the switching power converter to reduce voltage across leakage inductance of each power transfer winding may include driving the boost winding high in response to one of the power transfer windings being driven high.

(A6) In any one of the methods denoted as (A1) through (A5), controlling the injection stage of the switching power converter to reduce voltage across leakage inductance of each power transfer winding may include driving the boost winding low in response to one of the power transfer windings being driven low.

(A7) Any one of the methods denoted as (A1) through (A6) may further include causing the plurality of power stages to switch out-of-phase with respect to each other.

(A8) Any one of the methods denoted as (A1) through (A7) may further include disabling the injection stage in response to a signal indicating that the switching power converter is experiencing a transient event.

(A9) In any one of the methods denoted as (A1) through (A8), the at least one parameter of the switching power converter may include one of magnitude of a voltage and magnitude of a current.

(A10) In any one of the methods denoted as (A1) through (A9), the switching power converter may have a topology selected from the group consisting of a multi-phase buck-type topology, a multi-phase boost-type topology, and a multi-phase buck-boost-type topology.

(A11) In any one of the methods denoted as (A1) through (A10), two or more of the plurality of power stages may be part of different respective power sub-converters.

(B1) A switching power converter includes (1) a plurality of power stages, each power stage including a respective power transfer winding, (2) a boost winding forming at least one turn around a respective leakage magnetic flux path of each power transfer winding, (3) an injection stage electrically coupled to the boost winding, and (4) a controller configured to (a) control duty cycle of the plurality of power stages to regulate at least one parameter of the switching power converter and (b) control the injection stage to reduce voltage across leakage inductance of each power transfer winding.

(B2) In the switching power converter denoted as (B1), each power transfer winding and the boost winding may be part of a common coupled inductor.

(B3) In either one of the switching power converters denoted as (B1) or (B2), the boost winding may form the at least one turn such that mutual magnetic flux associated with each power transfer winding flows through the at least one turn of the boost winding.

(B4) In either one of the switching power converters denoted as (B1) or (B2), the boost winding may form the at least one turn such that respective mutual magnetic flux associated with each power transfer winding does not flow through the at least one turn of the boost winding.

(B5) In any one of the switching power converters denoted as (B1) through (B4), the injection stage may include a tuning inductor electrically coupled in series with the boost winding.

(B6) In any one of the switching power converters denoted as (B1) through (B5), the injection stage may include a tuning inductor electrically coupled in parallel with the boost winding.

(B7) In any one of the switching power converters denoted as (B1) through (B6), (1) each power stage may further include a respective power switching stage electrically coupled to the power transfer winding of the power stage, each power switching stage being at least partially controlled by the controller, and (2) the injection stage may include an injection switching stage electrically coupled to the boost winding, the injection switching stage being at least partially controlled by the controller.

(B8) In the switching power converter denoted as (B7), the injection stage may further include a capacitor electrically coupled in series with the boost winding.

(B9) In either one of the switching power converters denoted as (B7) or (B8), the injection stage may further include a transformer, a primary winding to the transformer being electrically coupled to the injection switching stage, and a secondary winding of the transformer being electrically coupled to the boost winding.

(B10) In the switching power converter denoted as (B9), the injection stage may further include a tuning inductor electrically coupled in series with the primary winding of the transformer.

(B11) In any one of the switching power converters denoted as (B1) through (B10), the injection stage may be powered from a different power node than the plurality of power stages.

(B12) In any one of the switching power converters denoted as (B1) through (B11), the controller may be further configured to control the injection stage to reduce voltage across leakage inductance of each power transfer winding by driving the boost winding high in response to one of the power transfer windings being driven high.

(B13) In any one of the switching power converters denoted as (B1) through (B12), the controller may be further configured to control the injection stage to reduce voltage across leakage inductance of each power transfer winding by driving the boost winding low in response to one of the power transfer windings being driven low.

(B14) In any one of the switching power converters denoted as (B1) through (B13), the switching power converter may have a topology selected from the group consisting of a multi-phase buck-type topology, a multi-phase boost-type topology, and a multi-phase buck-boost-type topology.

(B15) In any one of the switching power converters denoted as (B1) through (B14), two or more of the plurality of power stages may be part of different respective power sub-converters.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for operating a switching power converter to reduce ripple current magnitude, comprising:
    Controlling a duty cycle of a plurality of power stages of the switching power converter to regulate at least one parameter of the switching power converter, each power stage including a respective power transfer winding and a power stage switching node voltage;
    actively switching an injection stage of the switching power converter to reduce voltage across leakage inductance of each power transfer winding, the injection stage of the switching power converter including an injection stage switching node voltage and a boost winding forming at least one turn to capture a respective leakage magnetic flux path of each power transfer winding; and
    controlling the active switching of the injection stage such that, in combination with switching of the plurality of power stages, a sum of the switching node voltages of the power stages and the injection stage, each adjusted by a respective turns ratio between the boost winding and the power transfer windings, is constant over time.

2. The method of claim 1, wherein each power transfer winding and the boost winding are part of a common coupled inductor.

3. The method of claim 1, wherein the boost winding is configured such that mutual magnetic flux associated with each power transfer winding flows through the at least one turn of the boost winding.

4. The method of claim 1, wherein:
    the boost winding and each power transfer winding are wound around a common magnetic core; and
    the boost winding forms the at least one turn to capture a leakage element of the common magnetic core, the leakage element being within a respective leakage magnetic flux path of each power transfer winding while being outside of mutual magnetic flux paths of each power transfer winding.

5. The method of claim 1, wherein controlling the injection stage of the switching power converter to reduce voltage across leakage inductance of each power transfer winding comprises driving the boost winding high in response to one of the power transfer windings being driven high.

6. The method of claim 5, wherein controlling the injection stage of the switching power converter to reduce voltage across leakage inductance of each power transfer winding comprises driving the boost winding low in response to one of the power transfer windings being driven low.

7. The method of claim 1, further comprising causing the plurality of power stages to switch out-of-phase with respect to each other.

8. The method of claim 1, further comprising disabling the injection stage in response to a signal indicating that the switching power converter is experiencing a transient event.

9. The method of claim 1, wherein the at least one parameter of the switching power converter comprises one of magnitude of a voltage and magnitude of a current.

10. The method of claim 1, wherein the switching power converter has a topology selected from the group consisting of a multi-phase buck-type topology, a multi-phase boost-type topology, and a multi-phase buck-boost-type topology.

11. The method of claim 1, wherein two or more of the plurality of power stages are part of different respective power sub-converters.

12. A switching power converter, comprising:
- a plurality of power stages, each power stage including a respective power transfer winding and a power stage switching node voltage;
- a boost winding forming at least one turn to capture a respective leakage magnetic flux path of each power transfer winding;
- an injection stage electrically coupled to a boost winding and including an injection stage switching node voltage; and
- a controller configured to:
  - control a duty cycle of the plurality of power stages to regulate at least one parameter of the switching power converter, and
  - actively switch the injection stage to reduce voltage across leakage inductance of each power transfer winding; and
  - control the active switching of the injection stage such that, in combination with the switching of the plurality of power stages, a sum of the switching node voltages of the power stages and the injection stage, each adjusted by a respective turns ratio between the boost winding and the power transfer windings, is constant over time.

13. The switching power converter of claim 12, wherein each power transfer winding and the boost winding are part of a common coupled inductor.

14. The switching power converter of claim 12, wherein the boost winding forms the at least one turn such that mutual magnetic flux associated with each power transfer winding flows through the at least one turn of the boost winding.

15. The switching power converter of claim 12, wherein the boost winding forms the at least one turn such that respective mutual magnetic flux associated with each power transfer winding does not flow through the at least one turn of the boost winding.

16. The switching power converter of claim 12, wherein the injection stage comprises a tuning inductor electrically coupled in series with the boost winding.

17. The switching power converter of claim 12, wherein the injection stage comprises a tuning inductor electrically coupled in parallel with the boost winding.

18. The switching power converter of claim 12, wherein:
- each power stage further includes a respective power switching stage electrically coupled to the power transfer winding of the power stage, each power switching stage being at least partially controlled by the controller; and
- the injection stage comprises an injection switching stage electrically coupled to the boost winding, the injection switching stage being at least partially controlled by the controller.

19. The switching power converter of claim 12, wherein the switching power converter has a topology selected from the group consisting of a multi-phase buck-type topology, a multi-phase boost-type topology, and a multi-phase buck-boost-type topology.

20. The switching power converter of claim 12, wherein two or more of the plurality of power stages are part of different respective power sub-converters.

* * * * *